(12) United States Patent
Uimonen

(10) Patent No.: US 10,899,410 B2
(45) Date of Patent: Jan. 26, 2021

(54) TRIFOLD BICYCLE FRAME

(71) Applicant: Mobility Holdings, Limited, Hong Kong (HK)

(72) Inventor: Joakim Uimonen, Turku (FI)

(73) Assignee: Mobility Holdings Ltd., Hong Kong (HK)

( * ) Notice: Subject to any disclaimer, the term of this patent is extended or adjusted under 35 U.S.C. 154(b) by 0 days.

(21) Appl. No.: 15/442,600

(22) Filed: Feb. 24, 2017

(65) Prior Publication Data

US 2017/0247076 A1    Aug. 31, 2017

Related U.S. Application Data

(60) Provisional application No. 62/300,754, filed on Feb. 26, 2016, provisional application No. 62/300,753, filed on Feb. 26, 2016.

(51) Int. Cl.
| | |
|---|---|
| *B62K 15/00* | (2006.01) |
| *B62K 3/02* | (2006.01) |
| *B62K 21/12* | (2006.01) |

(52) U.S. Cl.
CPC .............. *B62K 15/008* (2013.01); *B62K 3/02* (2013.01); *B62K 21/12* (2013.01); *B62K 2015/003* (2013.01)

(58) Field of Classification Search
CPC ..... B62K 15/00; B62K 15/006; B62K 15/008
See application file for complete search history.

(56) References Cited

U.S. PATENT DOCUMENTS

| | | | | |
|---|---|---|---|---|
| 5,193,834 | A * | 3/1993 | Strozyk | B62K 15/008 |
| | | | | 280/278 |
| 6,702,312 | B1 * | 3/2004 | Miksik | B62J 1/04 |
| | | | | 280/278 |
| 9,321,500 | B2 * | 4/2016 | Wang | B62K 15/008 |
| 9,340,251 | B2 * | 5/2016 | Thompson | B62K 15/008 |
| 9,873,477 | B2 * | 1/2018 | Wunderlin | B62M 7/12 |
| 9,896,148 | B2 * | 2/2018 | Baba | B62J 1/00 |
| 9,963,186 | B2 * | 5/2018 | Beistegui Chirapozu | |
| | | | | B62K 15/008 |
| 10,150,529 | B2 * | 12/2018 | Augustinoy | B62K 15/006 |
| 2011/0254252 | A1 * | 10/2011 | Hsieh | B62K 15/006 |
| | | | | 280/639 |
| 2016/0339981 | A1 * | 11/2016 | Vermeulen | B60B 1/003 |
| 2017/0066496 | A1 * | 3/2017 | Ochner | B62K 3/002 |

(Continued)

FOREIGN PATENT DOCUMENTS

| | | | |
|---|---|---|---|
| CN | 2321695 | B1 | 6/1999 |
| CN | 2639153 | B1 | 8/2004 |
| CN | 200985068 | B1 | 12/2007 |

(Continued)

OTHER PUBLICATIONS

PCT International Search Report, ISA/CN, in counterpart application PCT/CN2017/075023, dated May 7, 2017.

*Primary Examiner* — Kevin Hurley

(57) ABSTRACT

Disclosed herein is a folding bicycle comprising a handlepost joint and two joints in the mainbeam forward of the seat tube, wherein the pins of the hinges in the two mainbeam joints (i) are located on opposite sides of the mainbeam when viewed in a top view, and (ii) when the bicycle in folded, place the front wheel parallel to rear wheel and the wheel axles inline on the same lateral axis or on parallel lateral axes, wherein the wheels roll in parallel track.

7 Claims, 66 Drawing Sheets

20" CWr Persp.

(56) References Cited

U.S. PATENT DOCUMENTS

2019/0031271 A1* 1/2019 Zhang ................... B62J 1/08
2019/0337333 A1* 11/2019 Vermeulen ............ B60B 1/0215

FOREIGN PATENT DOCUMENTS

JP     2011073665 A  *  4/2011  .......... B62K 15/008
WO    2010122565 A1    10/2010

* cited by examiner

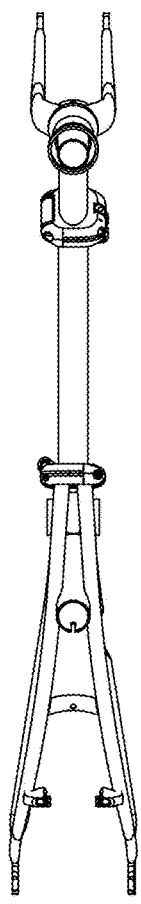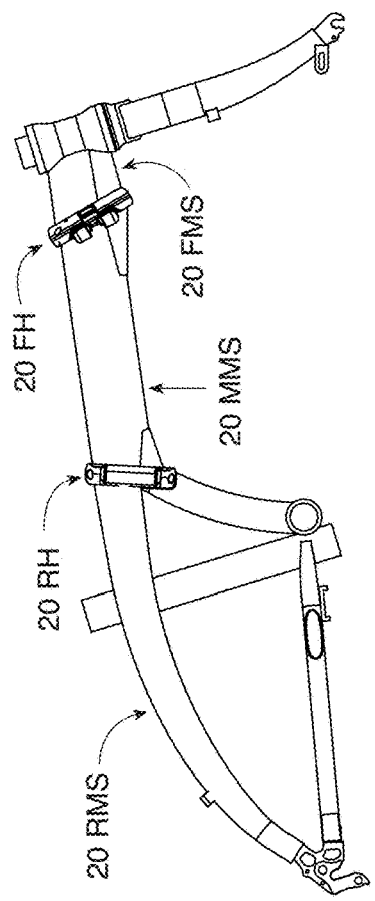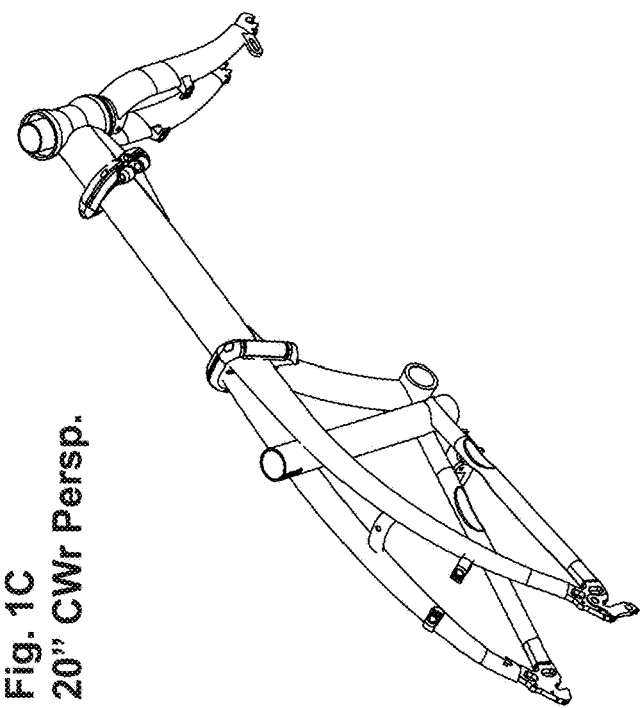

20" CWr Top Persp.

20" CWr Rear

20" CWr Top Persp.

20" CWr Side

20" CWr Side

20" CWr Persp.

20" CWr Top

20" CWr Rear

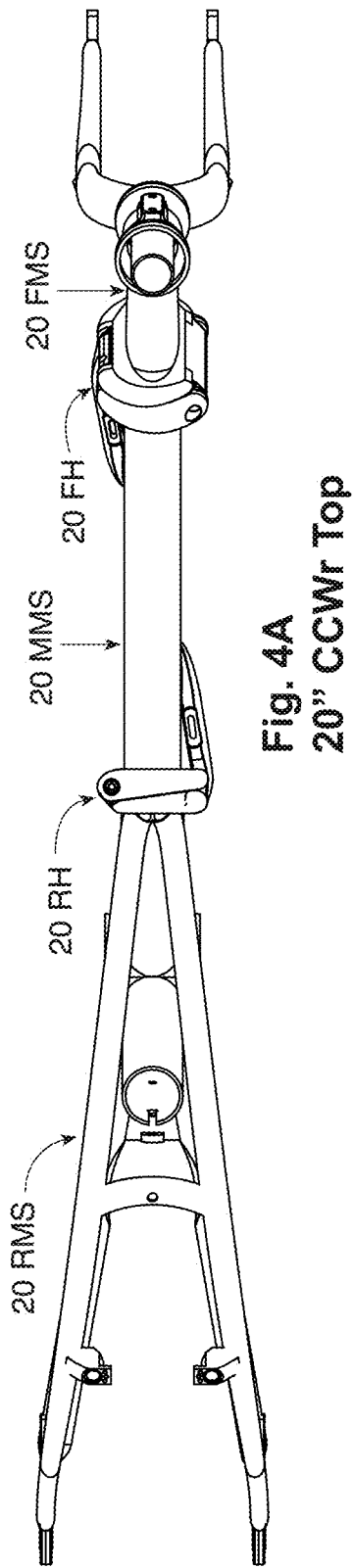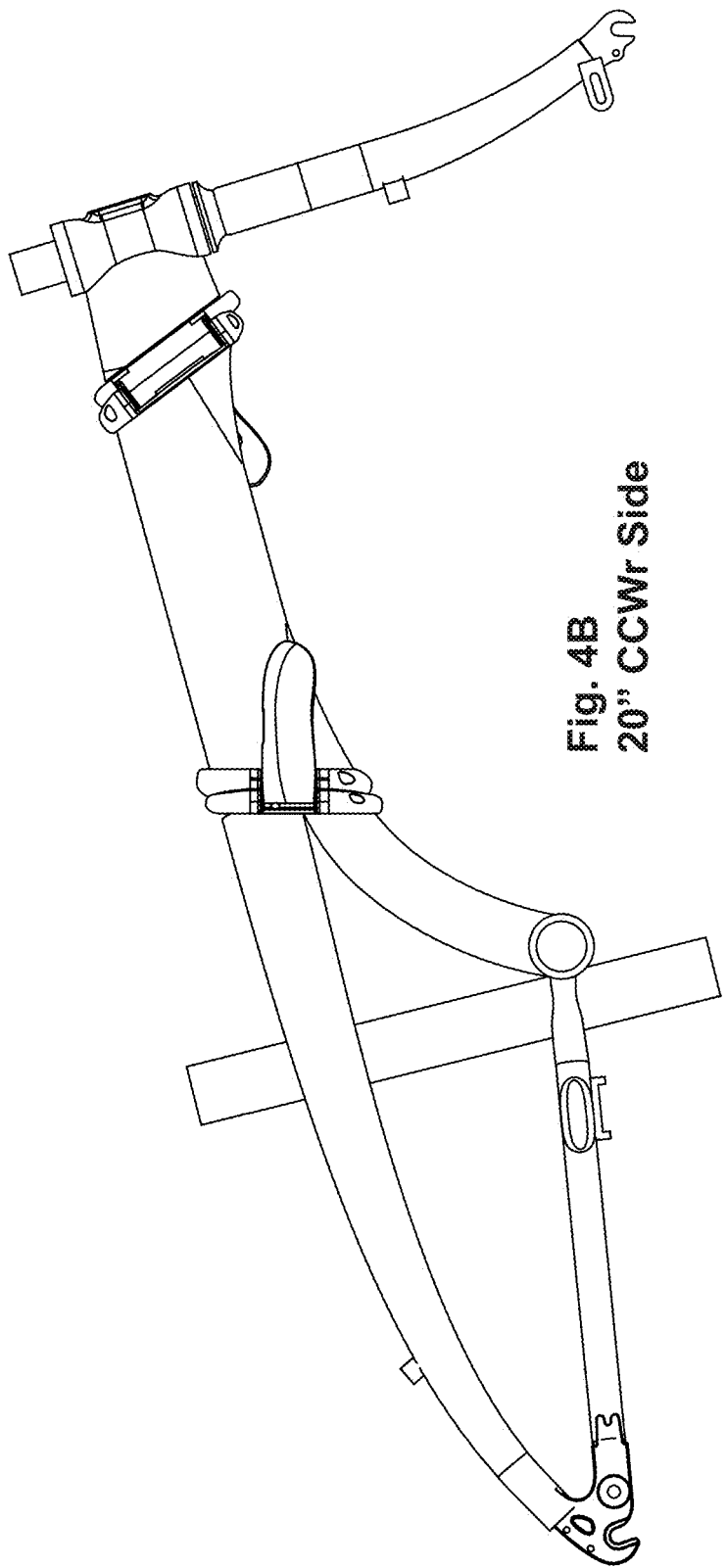
Fig. 4A
20" CCWr Top
Fig. 4B
20" CCWr Side

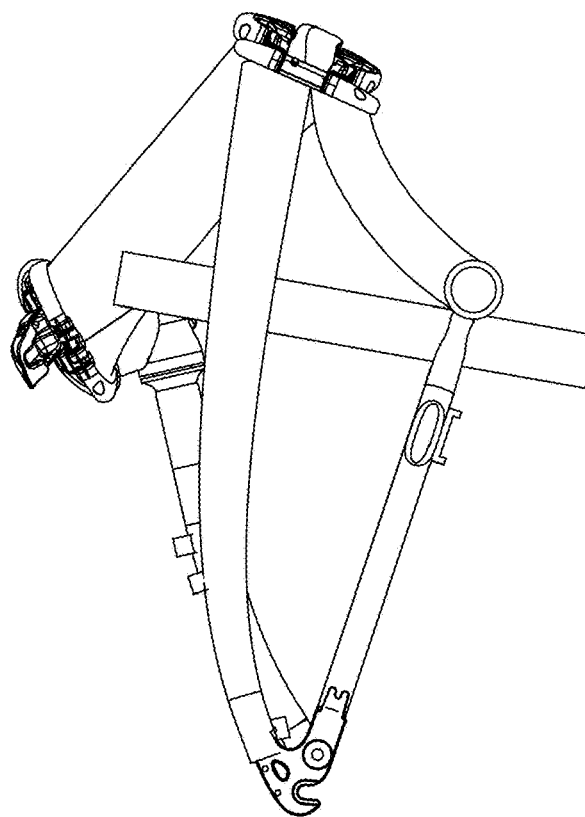
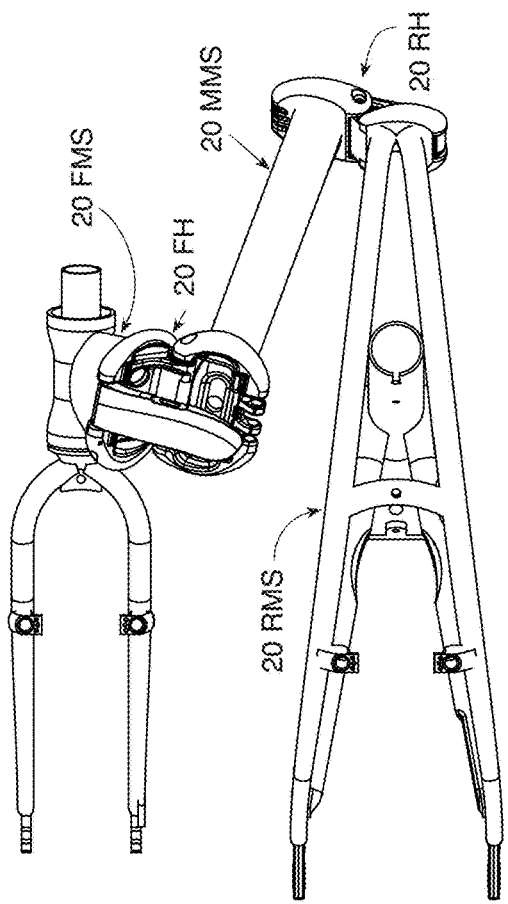
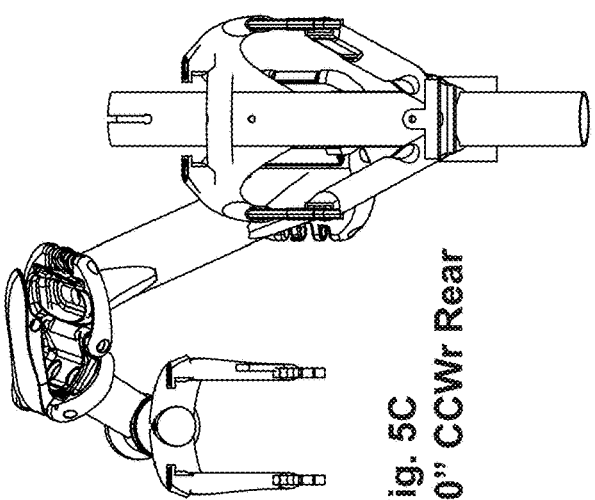
Fig. 5A
20" CCWr Top
Fig. 5B
20" CCWr Side
Fig. 5C
20" CCWr Rear 20" CCWr Rear 20" CCWr Side

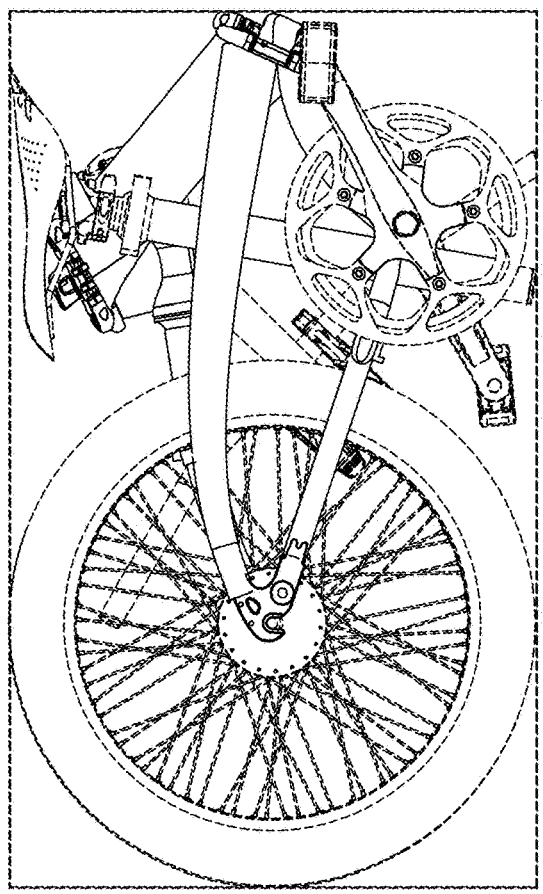
Fig. 6B
20" CCWr Side
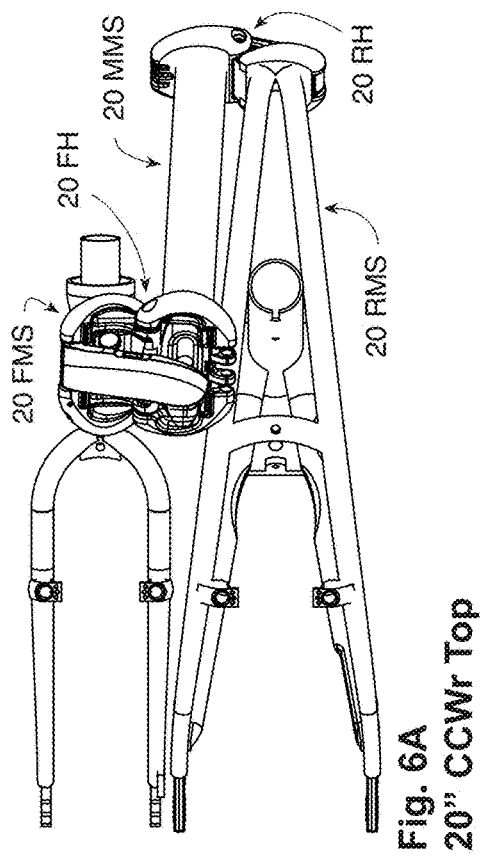
Fig. 6A
20" CCWr Top
Fig. 6C
20" CCWr Rear
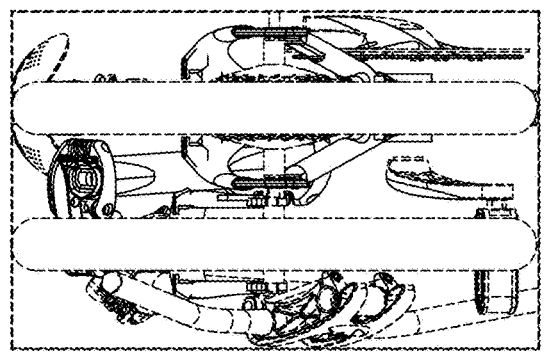

20" CCWr Rear

20" CCWr Side

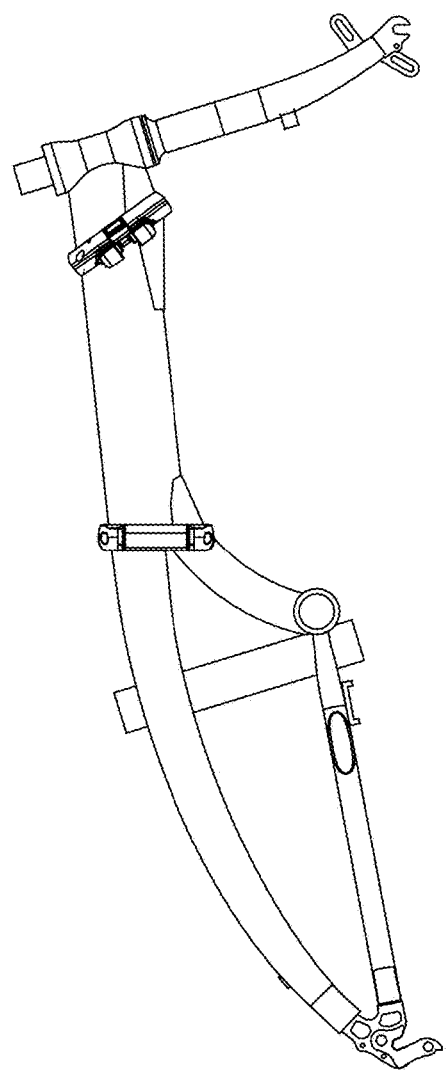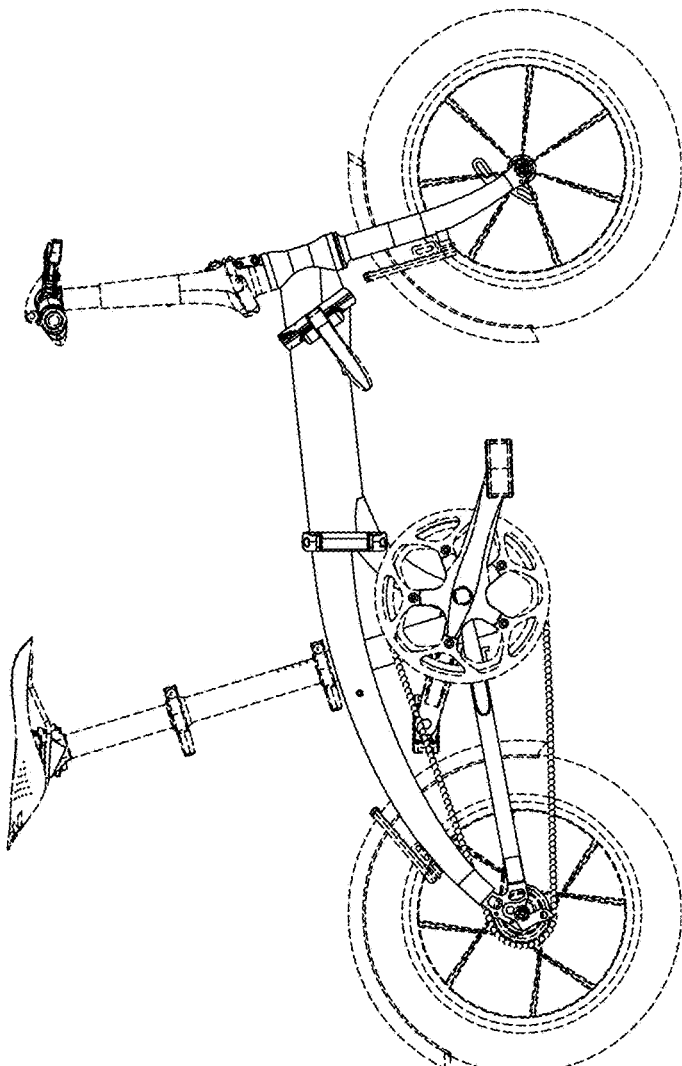

16" CWr Side

16" CWr Rear

16" CWr Top

16" CWr Side

16" CWr Top

16" CWr Rear

16" CWr Rear

16" CWr Side

16" CWr Top

16" CWr Rear

16" CWr Side

16" CWr Top

24" CWr Side

24" CWr Side

24" CWr Top

24" CWr Rear

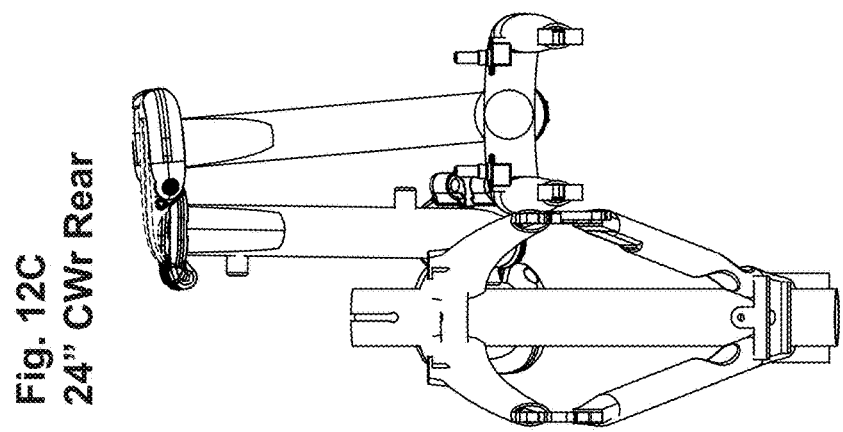
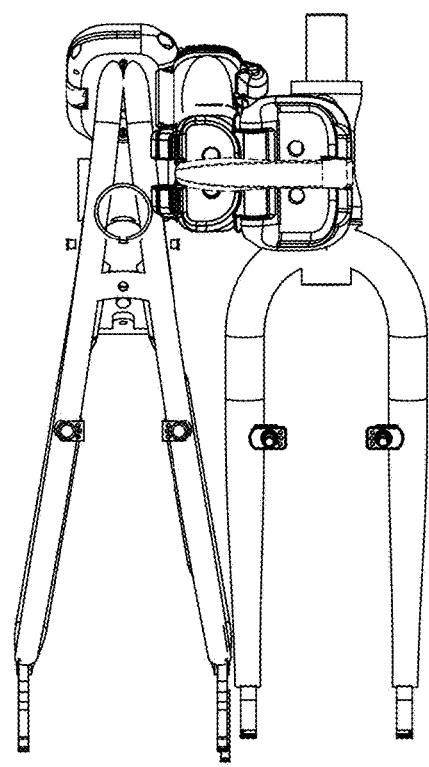
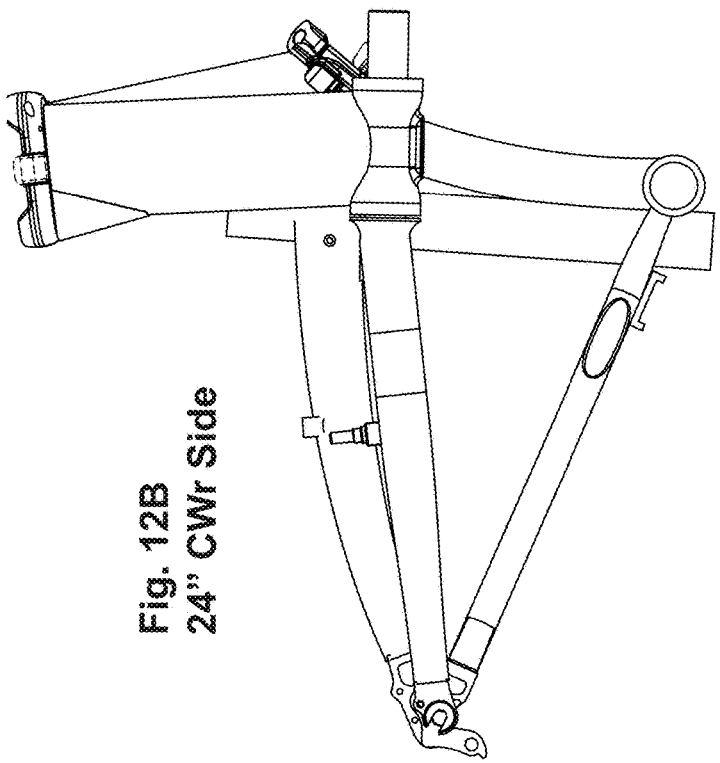

24" CWr Side

24" CWr Top

24" CWr Rear
Max Z

24" CWr Rear
Min. Z

28" CWr Side

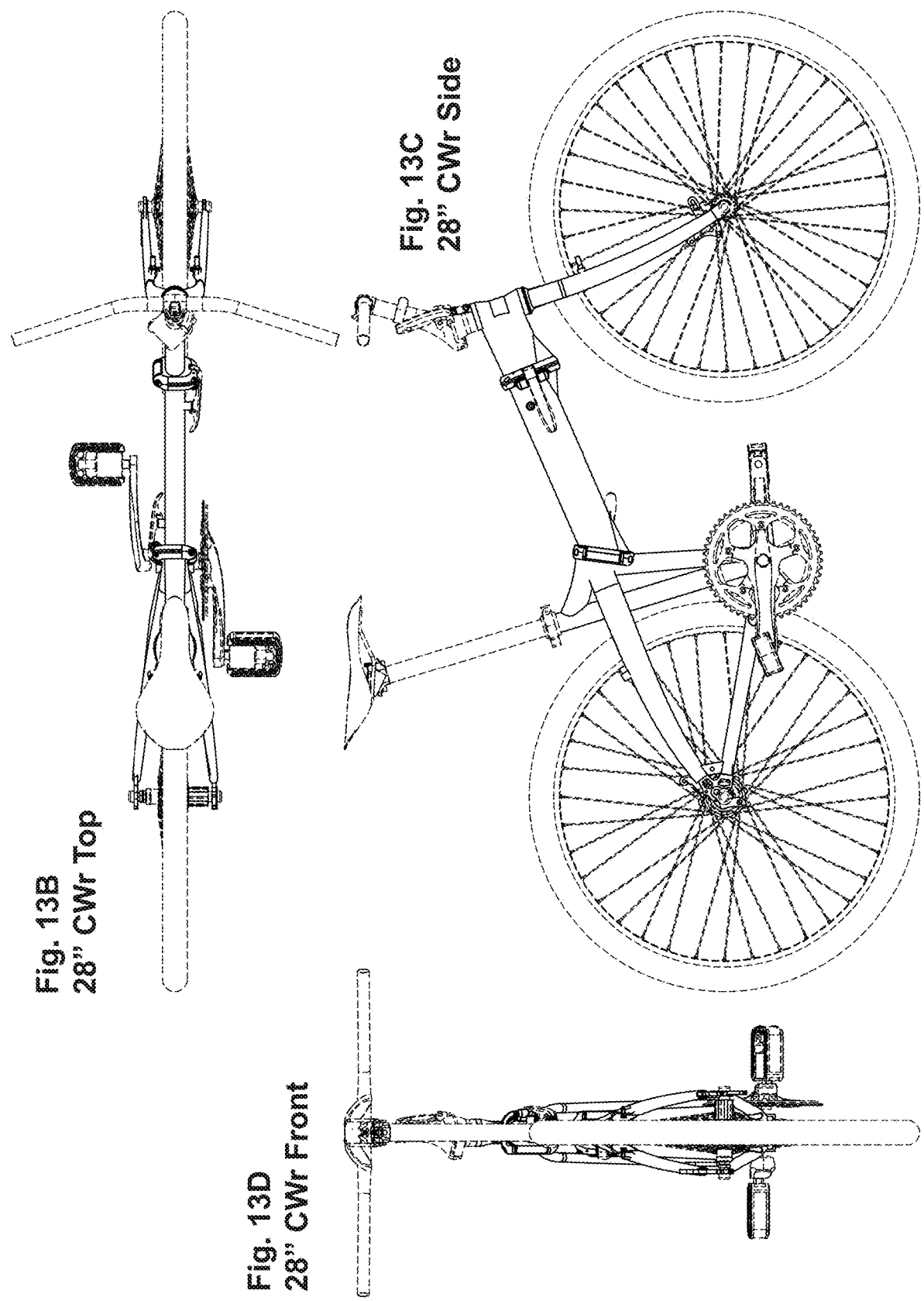

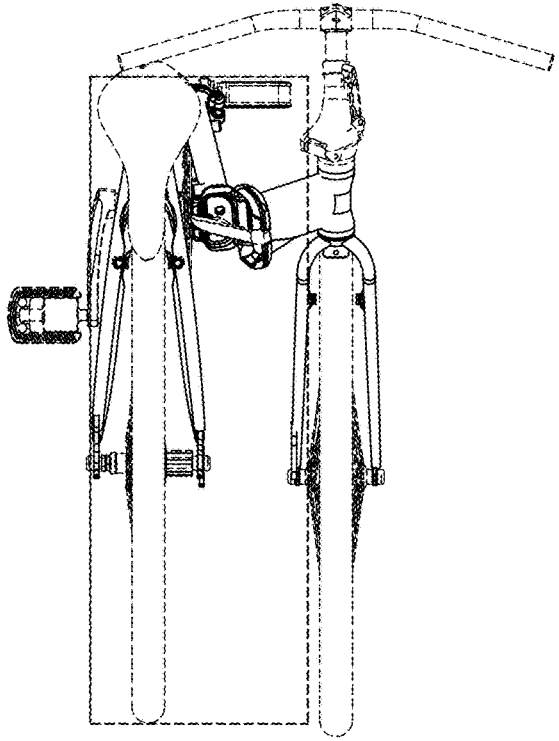
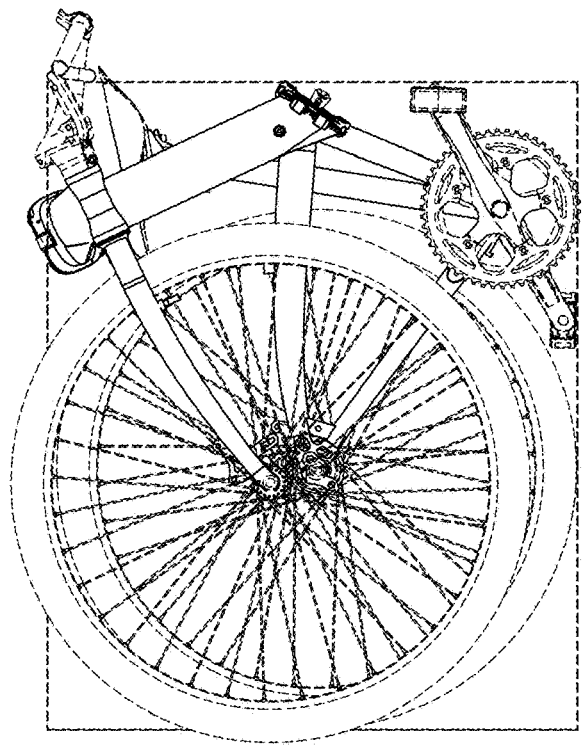
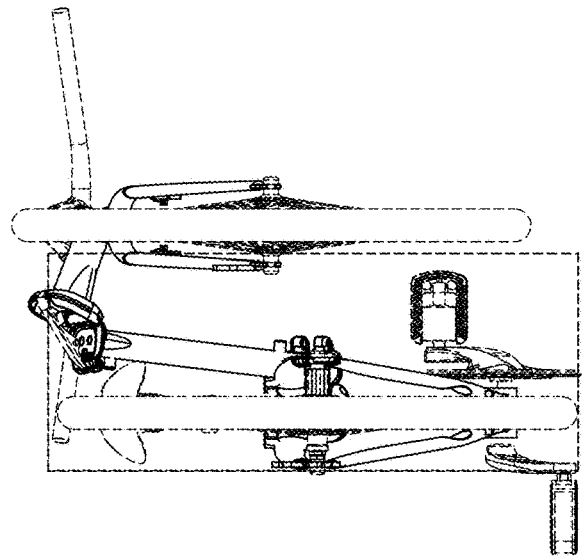
Fig. 14A
28" CWr Top
Fig. 14B
28" CWr Side
Fig. 14C
28" CWr Rear 28" CWr Rear 28" CWr Top 28" CWr Side 28" CWr Rear 28" CWr Top 28" CWr Side 28" CWr Side 28" CWr Side 28" CWr Side 28" CWr Side

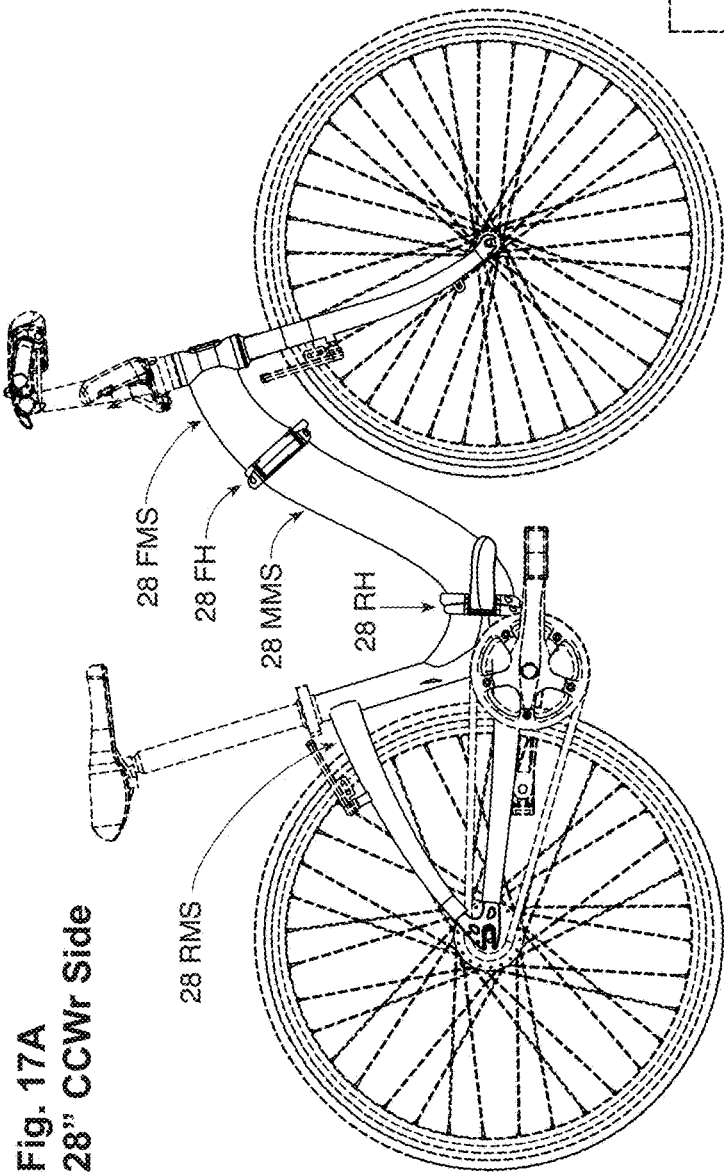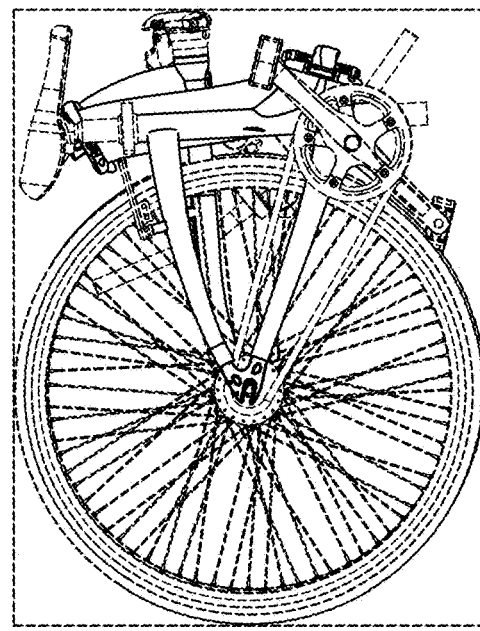

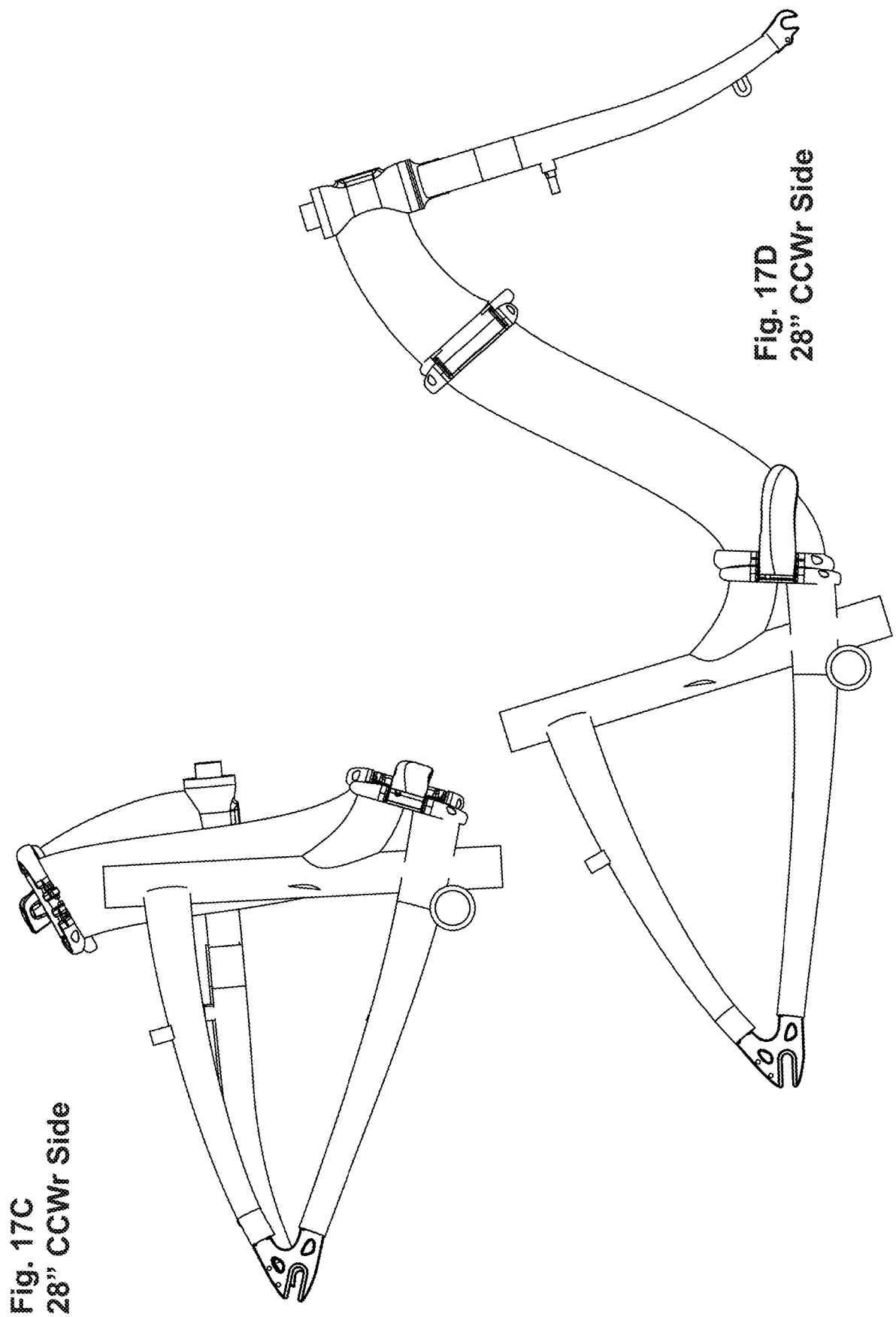

20" CWr Side

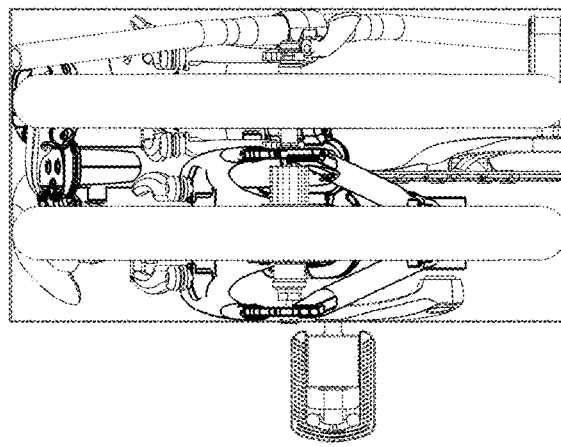
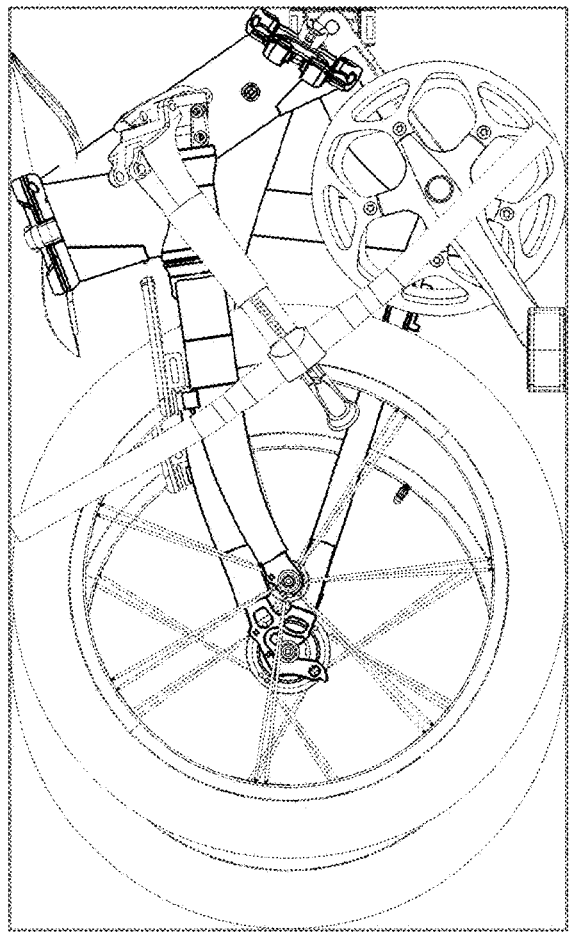
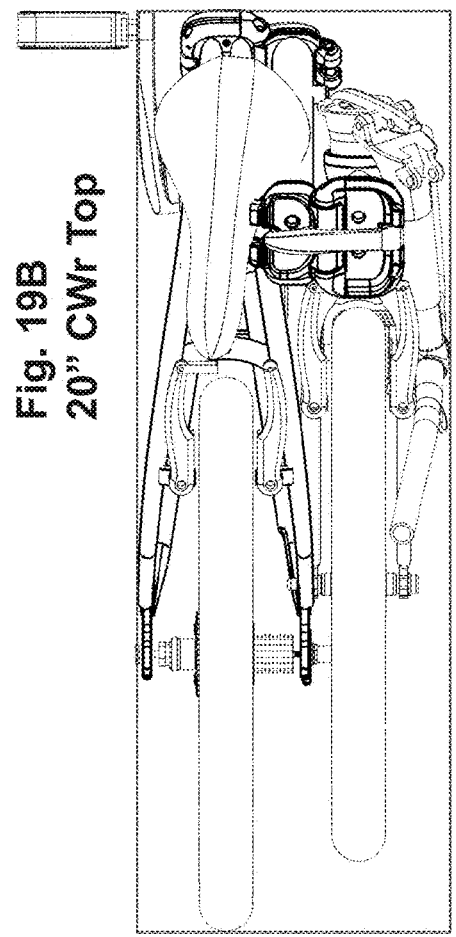

20" CWr Rear

20" CWr Side

20" CWr Top

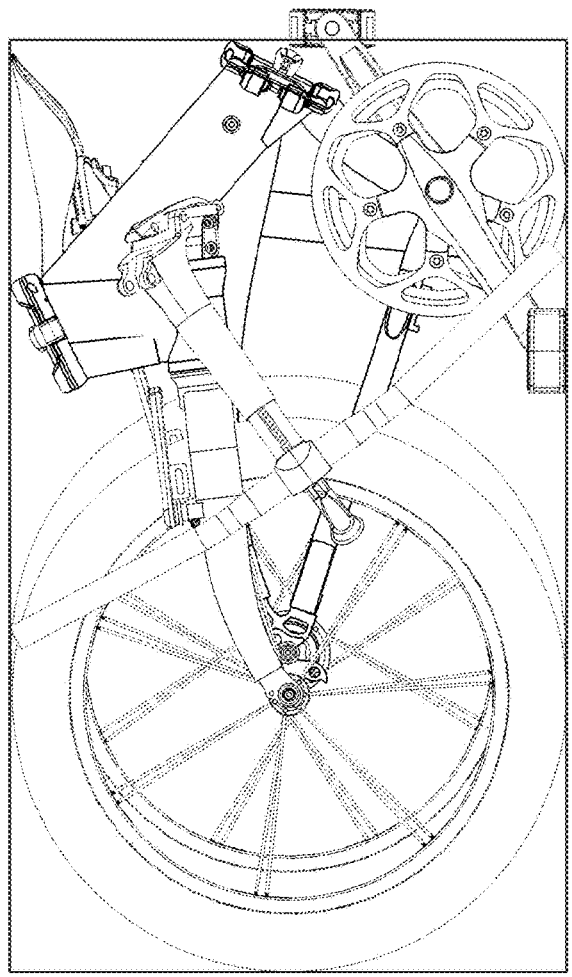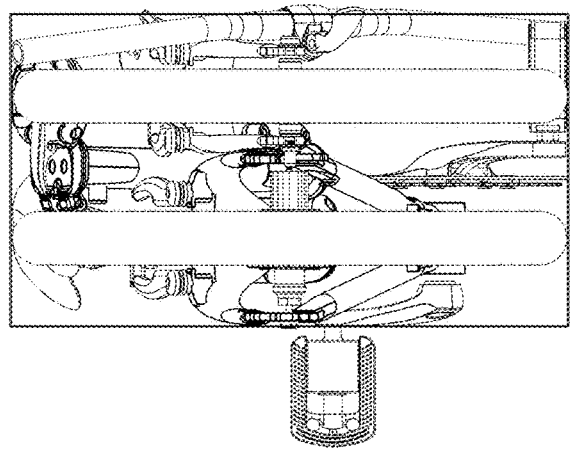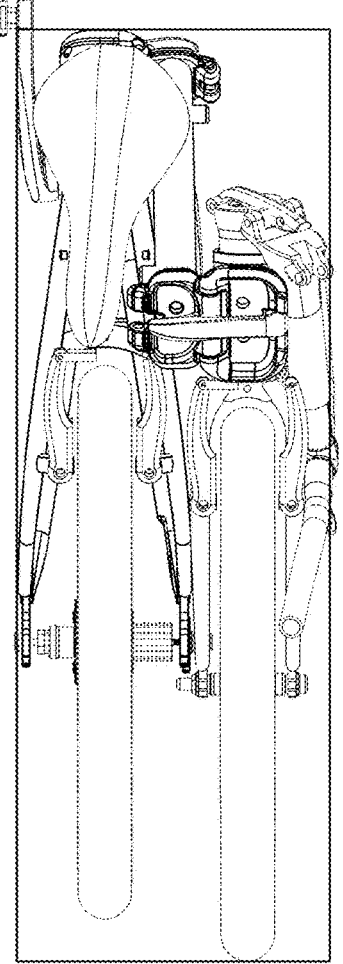

20" CWr Rear

20" CWr Side

20" CWr Top

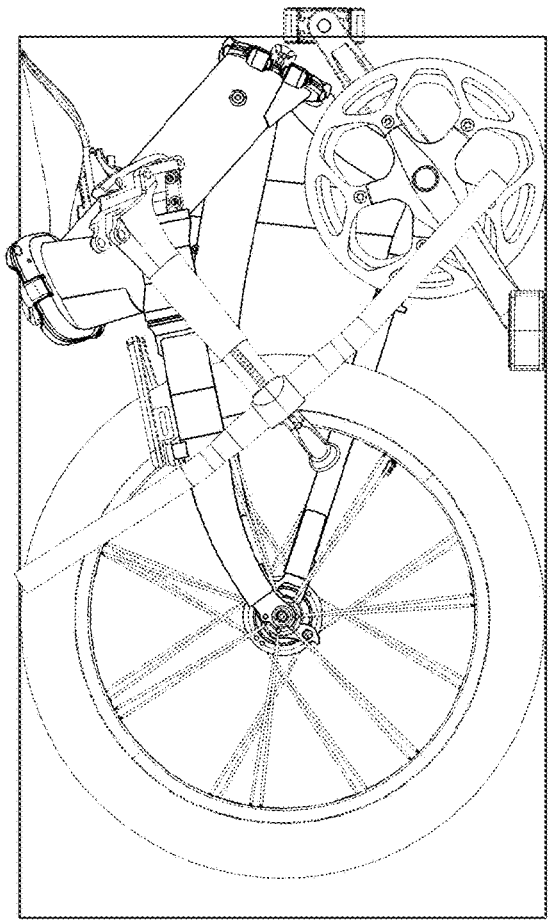
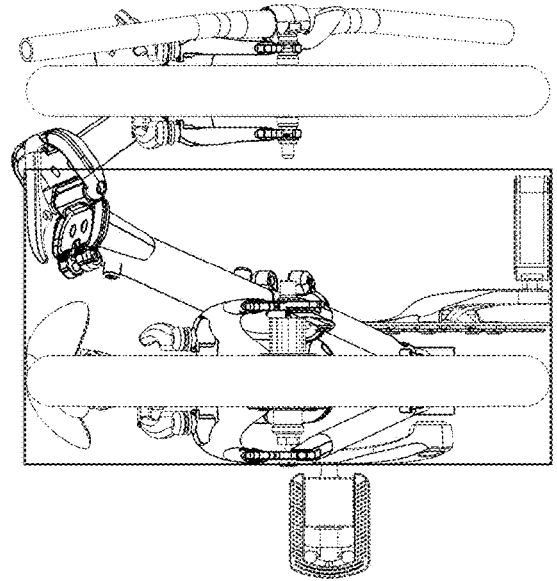
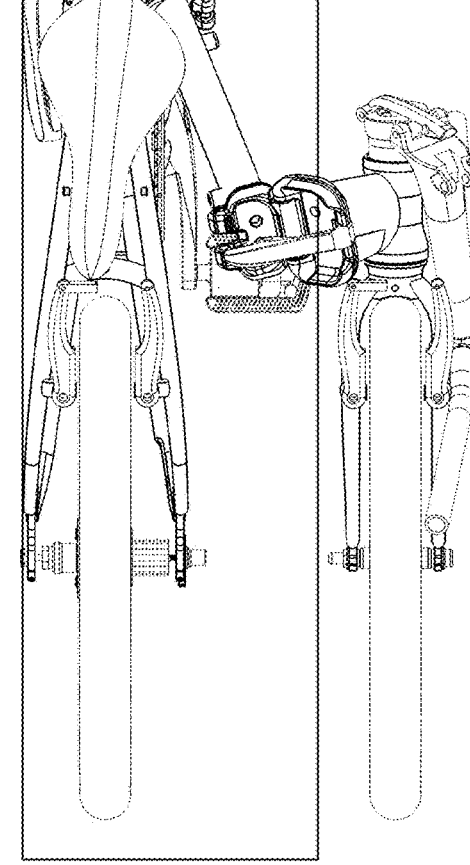
Fig. 21A
20" CWr Side
Fig. 21B
20" CWr Top
Fig. 21C
20" CWr Rear

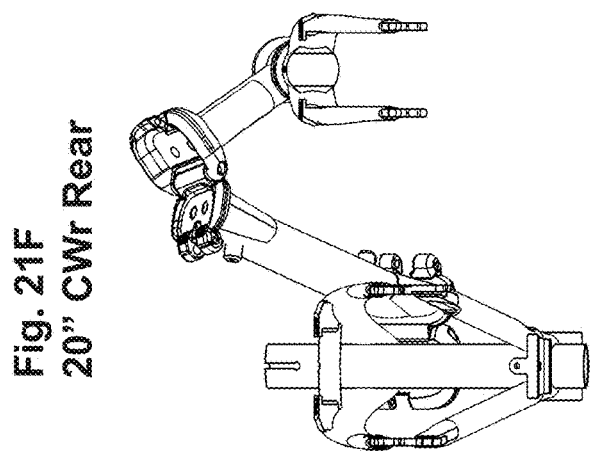
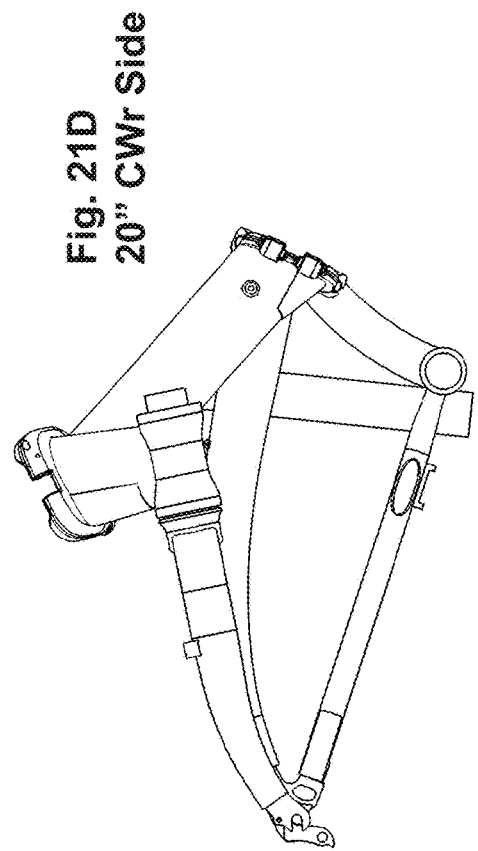
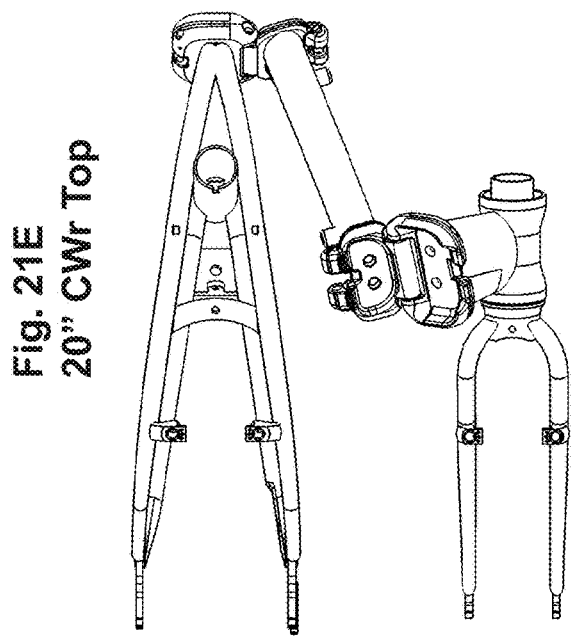

Fig. 22C
Table 1
| WS | FD | WEX | RHA | FHA | HTA | MS | RS | FS | RHD | FHD | RHAD | FHAD | FL | FO | WB | CS | FCHD | BB | FHW | RHW | STH | HTH |
|---|---|---|---|---|---|---|---|---|---|---|---|---|---|---|---|---|---|---|---|---|---|---|
| 28" | CWr | 710 | 94.6° | 69.0° | 72° | 363 | 459 | 80 | 444 | 444 | 30 | 30 | 397 | 51 | 1073 | 440 | 230 | 70 | 100 | 135 | 81 | 98 |
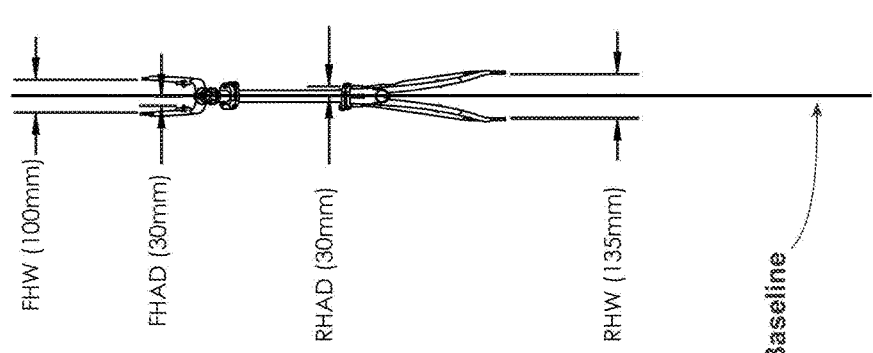
Fig. 22B
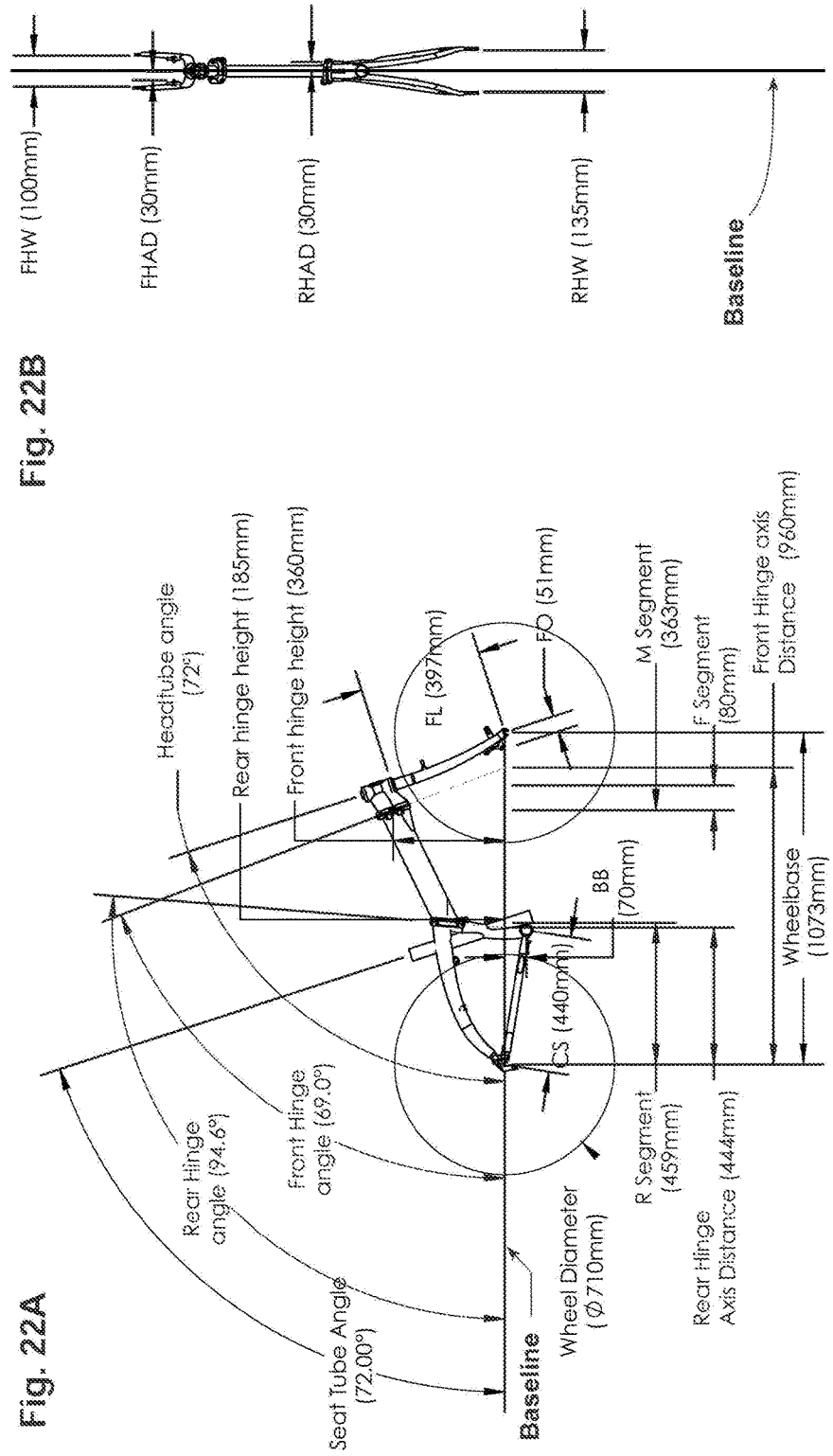
Fig. 22A Fig. 22D
Table 2
Legends used in Tables 1, 3A, and 3B

| WS | FD | WEX | RHA | FHA | HTA | RS | MS | FS | STH | HTH |
|---|---|---|---|---|---|---|---|---|---|---|
| Wheel size ref (inches) | Folding direction (Rear Hinge) (same angles can work in both FDs) | Wheel external diameter, includes tire (mm) | Rear hinge angle (deg) | Front hinge angle (deg) | Head tube Angle (Deg) | R Segment (mm) | M Segment (mm) | F Segment (mm) | Axial distance, top of head tube to top of folded handlepost joint (mm) | Axial distance, bottom of head tube to top of headtube (mm) |

| RHD | RHH | RHAD | FHD | FHH | FHAD | FL | FO | WB | CS | FCHD | BB | FHW | RHW |
|---|---|---|---|---|---|---|---|---|---|---|---|---|---|
| Rear hinge axis distance, projected on baseline, center of rear dropout to center of RH long axis (mm) | Rear hinge height from baseline to center of RH long axis (mm) | Rear Hinge Axis distance from bikes vertical center plane (mm) | Front hinge axis distance, projected on baseline, center of rear dropout to center of FH long axis (mm) | Front hinge height from baseline to center of FH long axis (mm) | Front Hinge Axis distance from bikes vertical center plane (mm) | Fork Length (mm) | Fork Offset (mm) | Wheelbase (mm) | Chain Stay Length (mm) | Front Chain Ring diameter (mm) | BB height (mm) | Front Hub width (mm) | Rear hub width (mm) |

Fig. 22E
TABLE 3A
TRIFOLD GEOMETRY

| | Version | WS | FD | WEX | RHA | FHA | HTA | RS | MS | FS | STH |
|---|---|---|---|---|---|---|---|---|---|---|---|
| 1 | v20 A | 20" | CWr | 500 | 93.00° | 60.00° | 73.00° | 488 | 319 | 110 | 81 |
| 2 | v20 A1 | 20" | CWr | 500 | 93.00° | 60.00° | 73.00° | 488 | 319 | 109 | 81 |
| 3 | v20 A2 | 20" | CWr | 500 | 93.00° | 60.00° | 73.00° | 488 | 319 | 109 | 81 |
| 4 | v20 B | 20" | CWr | 500 | 109.60° | 63.50° | 73.00° | 424 | 211 | 281 | 81 |
| 5 | v20 C | 20" | CWr | 500 | 121.80° | 64.00° | 73.00° | 479 | 71 | 366 | 81 |
| 6 | v20 D | 20" | CWr | 500 | 121.80° | 64.00° | 73.00° | 416 | 239 | 261 | 81 |
| 7 | v20 E | 20" | CWr | 500 | 121.80° | 64.00° | 73.00° | 323 | 352 | 241 | 81 |
| 8 | v20 F | 20" | CWr | 500 | 91.10° | 53.00° | 73.00° | 226 | 527 | 163 | 81 |
| 9 | v20 G | 20" | CWr | 500 | 91.10° | 53.00° | 73.00° | 509 | 295 | 113 | 81 |
| 10 | v20 H | 20" | CWr | 500 | 88.80° | 56.00° | 73.00° | 507 | 308 | 101 | 81 |
| 11 | v20 I | 20" | CWr | 500 | 83.90° | 41.00° | 73.00° | 531 | 324 | 61 | 81 |
| 12 | v20 J | 20" | CWr | 500 | 74.80° | 15.00° | 73.00° | 569 | 262 | 85 | 81 |
| 13 | v20 K | 20" | CWr | 500 | 72.00° | 7.00° | 73.00° | 578 | 202 | 136 | 81 |
| 14 | v20 L | 20" | CWr | 500 | 78.30° | 22.00° | 73.00° | 571 | 186 | 159 | 81 |
| 15 | v20 M | 20" | CWr | 500 | 95.10° | 64.00° | 73.00° | 573 | 213 | 130 | 81 |
| 16 | v20 N | 20" | CWr | 500 | 94.20° | 70.00° | 73.00° | 459 | 341 | 116 | 81 |
| 17 | v20 O | 20" | CWr | 500 | 96.30° | 77.00° | 73.00° | 451 | 380 | 85 | 81 |
| 18 | v20 P | 20" | CWr | 500 | 93.60° | 67.00° | 73.00° | 393 | 385 | 139 | 81 |
| 19 | v20 Q | 20" | CWr | 500 | 93.00° | 120.00° | 73.00° | 467 | 367 | 83 | 81 |
| 20 | v20 W1 | 20" | CWr | 500 | 40.00° | 60.00° | 73.00° | 488 | 319 | 109 | 81 |
| 21 | v20 W2 | 20" | CWr | 500 | 150.00° | 60.00° | 73.00° | 488 | 319 | 109 | 81 |
| 22 | v20 W3 | 20" | CWr | 500 | 150.00° | 30.00° | 73.00° | 488 | 319 | 109 | 81 |
| 23 | v20 W4 | 20" | CWr | 500 | 90.00° | 54.00° | 73.00° | 489 | 295 | 89 | 81 |
| 24 | v03A | 16" | CWr | 420 | 91.90° | 63.00° | 73.00° | 465 | 338 | 70 | 81 |
| 25 | v03B | 16" | CWr | 420 | 119.30° | 63.00° | 73.00° | 441 | 92 | 340 | 81 |
| 26 | v03C | 16" | CWr | 420 | 109° | 65.50° | 73.00° | 402 | 226 | 249 | 61 |
| 27 | v09a | 24" | CWr | 574 | 97.8° | 60.0° | 73.00° | 445 | 298 | 134 | 61 |
| 28 | v09b | 24" | CWr | 574 | 120.1° | 59.0° | 73.00° | 440 | 138 | 299 | 61 |
| 29 | v09c | 24" | CWr | 574 | 97.5° | 66.0° | 72° | 439 | 333 | 130 | 61 |
| 30 | v10a | 28" | CWr | 710 | 101.5° | 39.0° | 72° | 497 | 134 | 271 | 61 |
| 31 | v10b | 28" | CWr | 710 | 94.6° | 69.0° | 72° | 459 | 363 | 80 | 61 |
| 32 | v10c | 28" | CWr | 710 | | | | | | | |

Fig. 22F
TABLE 3B
TRIFOLD GEOMETRY

| | Version | RHD | RHH | RH AD | FHD | FHH | FH AD | FL | FO | WB | CS | FC HD | BB | FH W | RH W | HTH |
|---|---|---|---|---|---|---|---|---|---|---|---|---|---|---|---|---|
| 1 | v20 A | 475 | 250 | 30 | 980 | 300 | 30 | 302 | 40 | 1043 | 440 | 230 | 38 | 74 | 135 | 98 |
| 2 | v20 A1 | 475 | 250 | 30 | 980 | 300 | 30 | 302 | 40 | 1043 | 440 | 230 | 38 | 74 | 135 | 98 |
| 3 | v20 A2 | 479 | 168 | 30 | 985 | 308 | 30 | 302 | 40 | 1043 | 440 | 230 | 38 | 74 | 135 | 98 |
| 4 | v20 B | 342 | 230 | 30 | 770 | 270 | 30 | 302 | 40 | 1043 | 440 | 230 | 38 | 74 | 135 | 98 |
| 5 | v20 C | 317 | 262 | 30 | 680 | 265 | 30 | 302 | 40 | 1043 | 440 | 230 | 38 | 74 | 135 | 98 |
| 6 | v20 D | 317 | 160 | 30 | 680 | 50 | 30 | 302 | 40 | 1043 | 440 | 230 | 38 | 74 | 135 | 98 |
| 7 | v20 E | 317 | 10 | 30 | 680 | 10 | 30 | 302 | 40 | 1043 | 440 | 230 | 38 | 74 | 135 | 98 |
| 8 | v20 F | 317 | -147 | 30 | 680 | -150 | 30 | 302 | 40 | 1043 | 440 | 230 | 38 | 74 | 135 | 98 |
| 9 | v20 G | 506 | 190 | 30 | 1020 | 287 | 30 | 302 | 40 | 1043 | 440 | 230 | 38 | 74 | 135 | 98 |
| 10 | v20 H | 506 | 83 | 30 | 1020 | 272 | 30 | 302 | 40 | 1043 | 440 | 230 | 38 | 74 | 135 | 98 |
| 11 | v20 I | 535 | 170 | 30 | 1065 | 310 | 30 | 302 | 40 | 1043 | 440 | 230 | 38 | 74 | 135 | 98 |
| 12 | v20 J | 578 | 80 | 30 | 1165 | 290 | 30 | 302 | 40 | 1043 | 440 | 230 | 38 | 74 | 135 | 98 |
| 13 | v20 K | 600 | 80 | 30 | 1650 | 233 | 30 | 302 | 40 | 1043 | 440 | 230 | 38 | 74 | 135 | 98 |
| 14 | v20 L | 597 | 80 | 30 | 2500 | 214 | 30 | 302 | 40 | 1043 | 440 | 230 | 38 | 74 | 135 | 98 |
| 15 | v20 M | 590 | 80 | 30 | 1380 | 240 | 30 | 302 | 40 | 1043 | 440 | 230 | 38 | 74 | 135 | 98 |
| 16 | v20 N | 442 | 190 | 30 | 940 | 287 | 30 | 302 | 40 | 1043 | 440 | 230 | 38 | 74 | 135 | 98 |
| 17 | v20 O | 436 | 210 | 30 | 940 | 297 | 30 | 302 | 40 | 1043 | 440 | 230 | 38 | 74 | 135 | 98 |
| 18 | v20 P | 370 | 210 | 30 | 844 | 289 | 30 | 302 | 40 | 1043 | 440 | 230 | 38 | 74 | 135 | 98 |
| 19 | v20 Q | 454 | 210 | 30 | 960 | 297 | 30 | 302 | 40 | 1043 | 440 | 230 | 38 | 74 | 135 | 98 |
| 20 | v20 W1 | 475 | 250 | 30 | 633.8 | 300 | 30 | 302 | 40 | 1043 | 440 | 230 | 38 | 74 | 135 | 98 |
| 21 | v20 W2 | 786 | 250 | 30 | 980.2 | 300 | 30 | 302 | 40 | 1043 | 440 | 230 | 38 | 74 | 135 | 98 |
| 22 | v20 W3 | 55 | 250 | 30 | 980.2 | 300 | 30 | 302 | 40 | 1043 | 440 | 230 | 38 | 74 | 135 | 98 |
| 23 | v20 W4 | 55 | 250 | 30 | 1326.6 | 300 | 30 | 302 | 40 | 1043 | 440 | 230 | 38 | 74 | 135 | 98 |
| 24 | v03A | 489 | 233 | 30 | 979 | 269 | 30 | 263 | 32 | 980 | 425 | 215 | 78 | 74 | 135 | 98 |
| 25 | v03B | 459 | 175 | 30 | 940 | 269 | 30 | 263 | 32 | 980 | 425 | 215 | 78 | 74 | 135 | 98 |
| 26 | v03C | 306 | 240 | 30 | 655 | 240 | 30 | 263 | 32 | 980 | 425 | 215 | 78 | 74 | 135 | 98 |
| 27 | v09a | 326 | 220 | 30 | 756 | 282 | 30 | 357 | 45 | 1024 | 415 | 230 | -20 | 100 | 135 | 98 |
| 28 | v09b | 419 | 190 | 30 | 890 | 255 | 30 | 357 | 45 | 1024 | 440 | 230 | -20 | 100 | 135 | 98 |
| 29 | v09c | 347 | 160 | 30 | 680 | 170 | 30 | 357 | 45 | 1024 | 440 | 230 | -20 | 100 | 135 | 98 |
| 30 | v10a | 419 | 150 | 30 | 419 | 337 | 30 | 397 | 51 | 1073 | 440 | 230 | 70 | 100 | 135 | 98 |
| 31 | v10b | 476 | 105 | 30 | 476 | 200 | 30 | 397 | 51 | 1073 | 440 | 230 | 70 | 100 | 135 | 98 |
| 32 | v10c | 444 | 185 | 30 | 444 | 360 | 30 | 397 | 51 | 1073 | 440 | 230 | 70 | 100 | 135 | 98 |

Trifold Folding Sequence
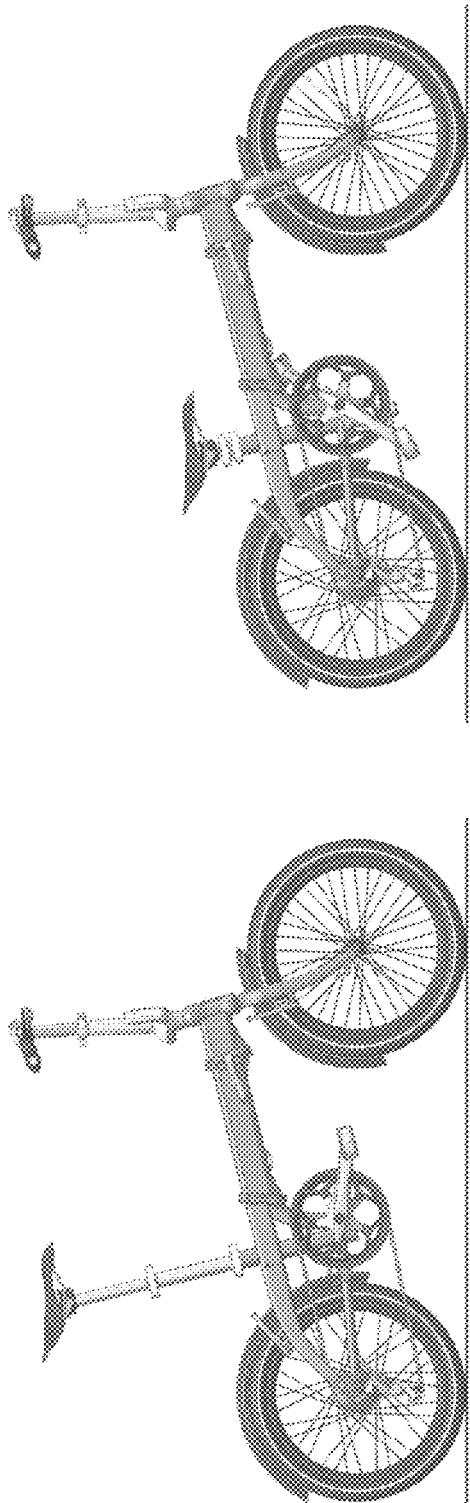
Fig. 23A
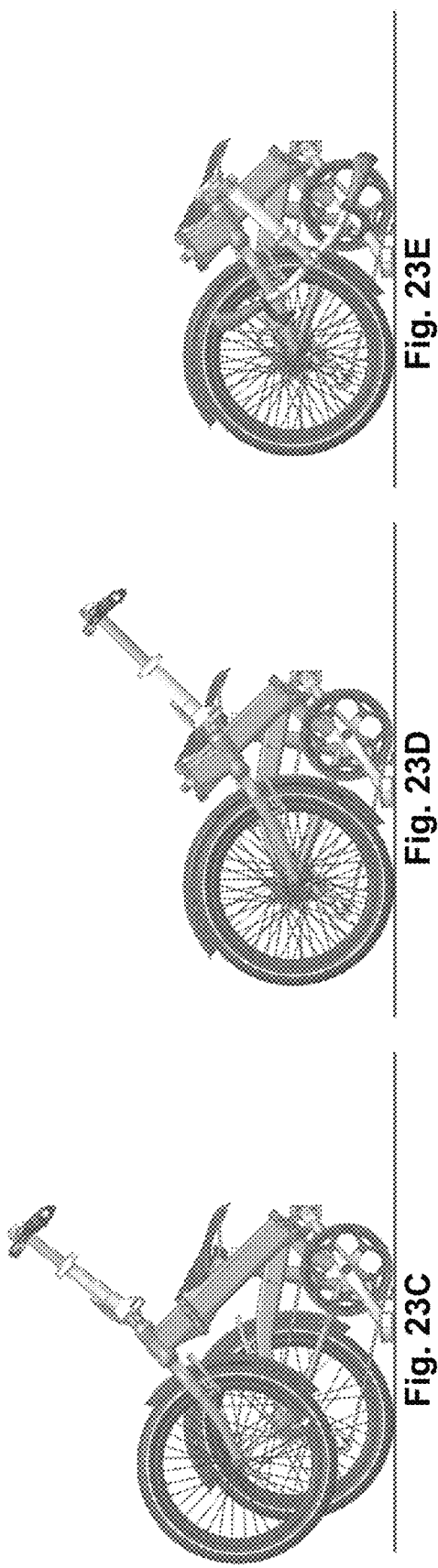
Fig. 23B
Fig. 23C
Fig. 23D
Fig. 23E Folding with Reversed Fork vs. Non-Reversed Fork

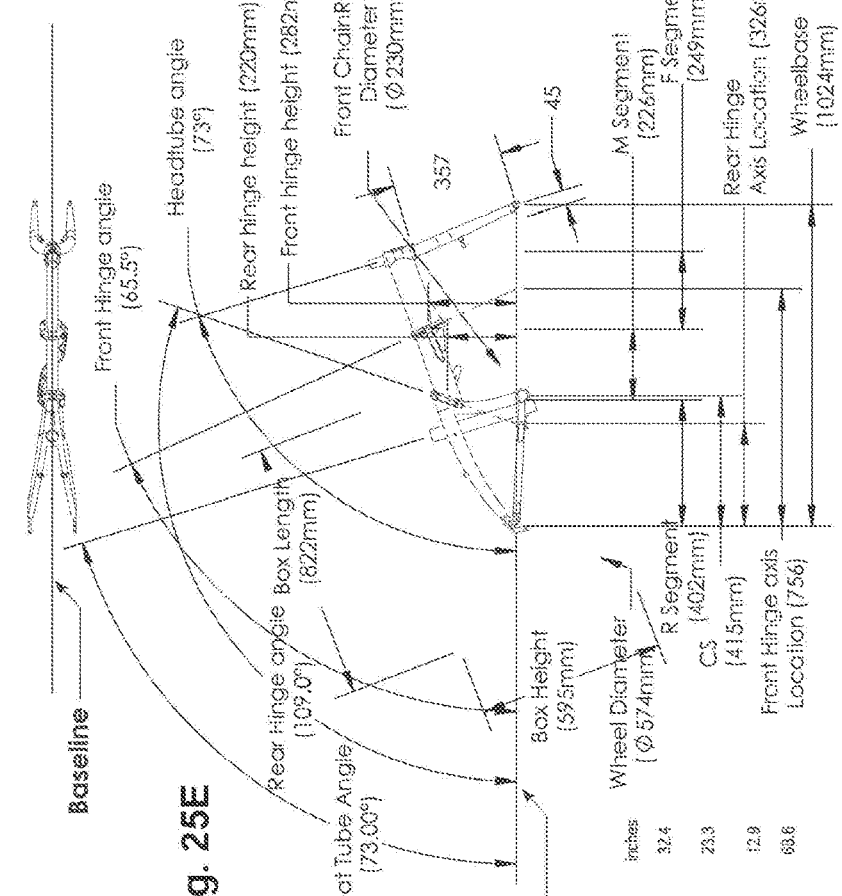
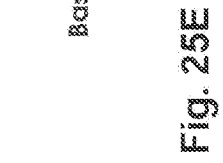
Fig. 25A
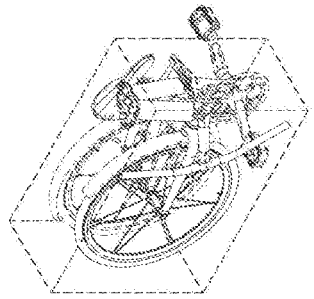
Fig. 25B
Fig. 25D
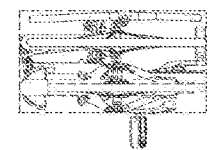
Fig. 25C
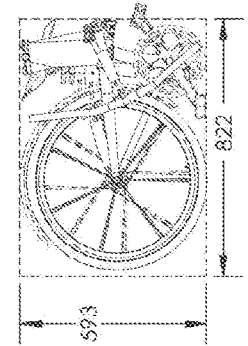
Fig. 25E
Fig. 25F
| WS | FD | WEX | RHA | FHA | HTA | RS | MS | FS | RHD | RHH | RHAD | FL | FQ | WB | CS | FCHD | BB | FHW | RHW | STH | HTH |
|---|---|---|---|---|---|---|---|---|---|---|---|---|---|---|---|---|---|---|---|---|---|
| 24" | GW | 574 | 109.0° | 65.5° | 73° | 402 | 226 | 249 | 326 | 220 | 30 | 357 | 45 | 1024 | 415 | 230 | -20 | 74 | 135 | 81 | 98 |

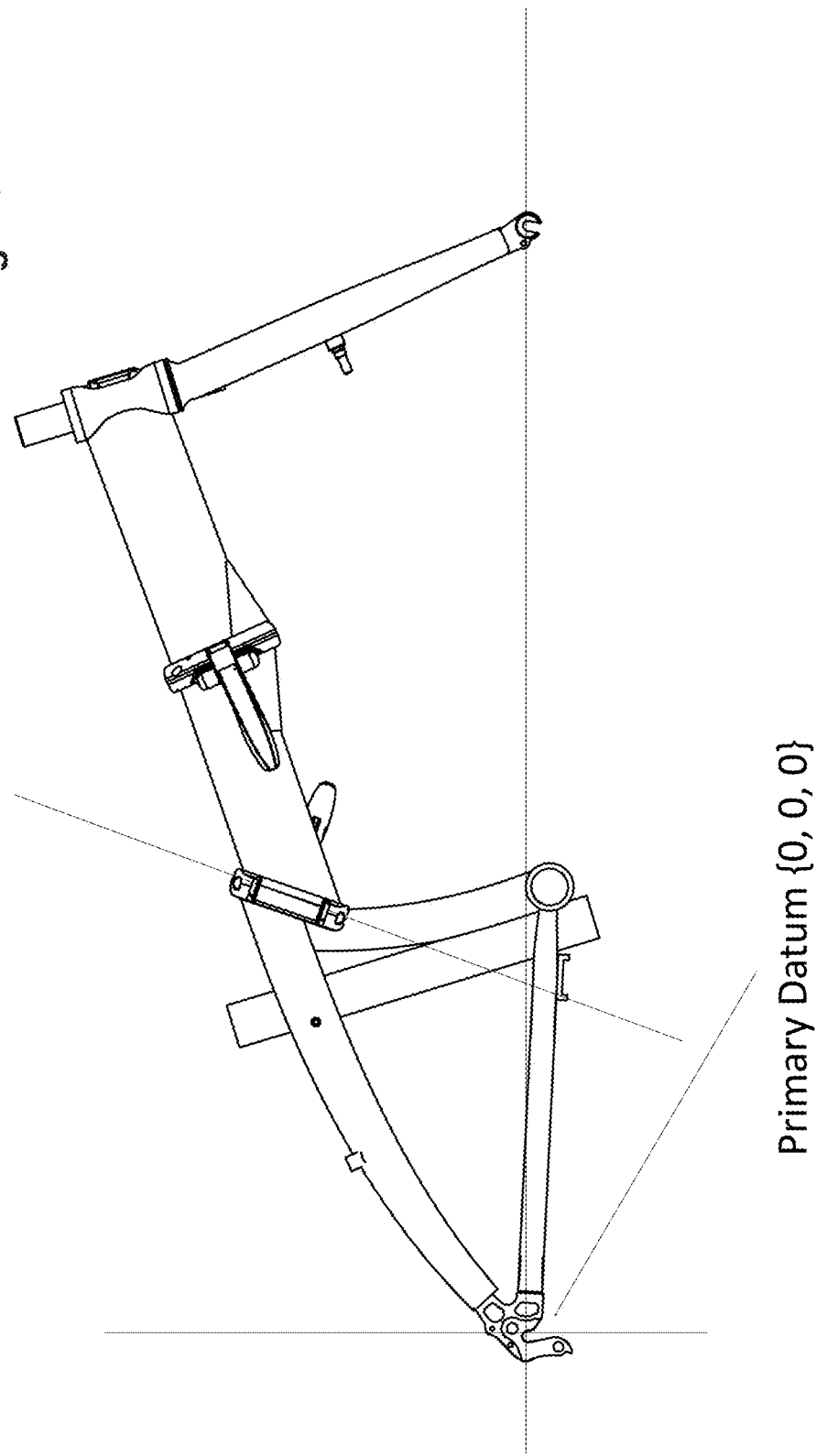

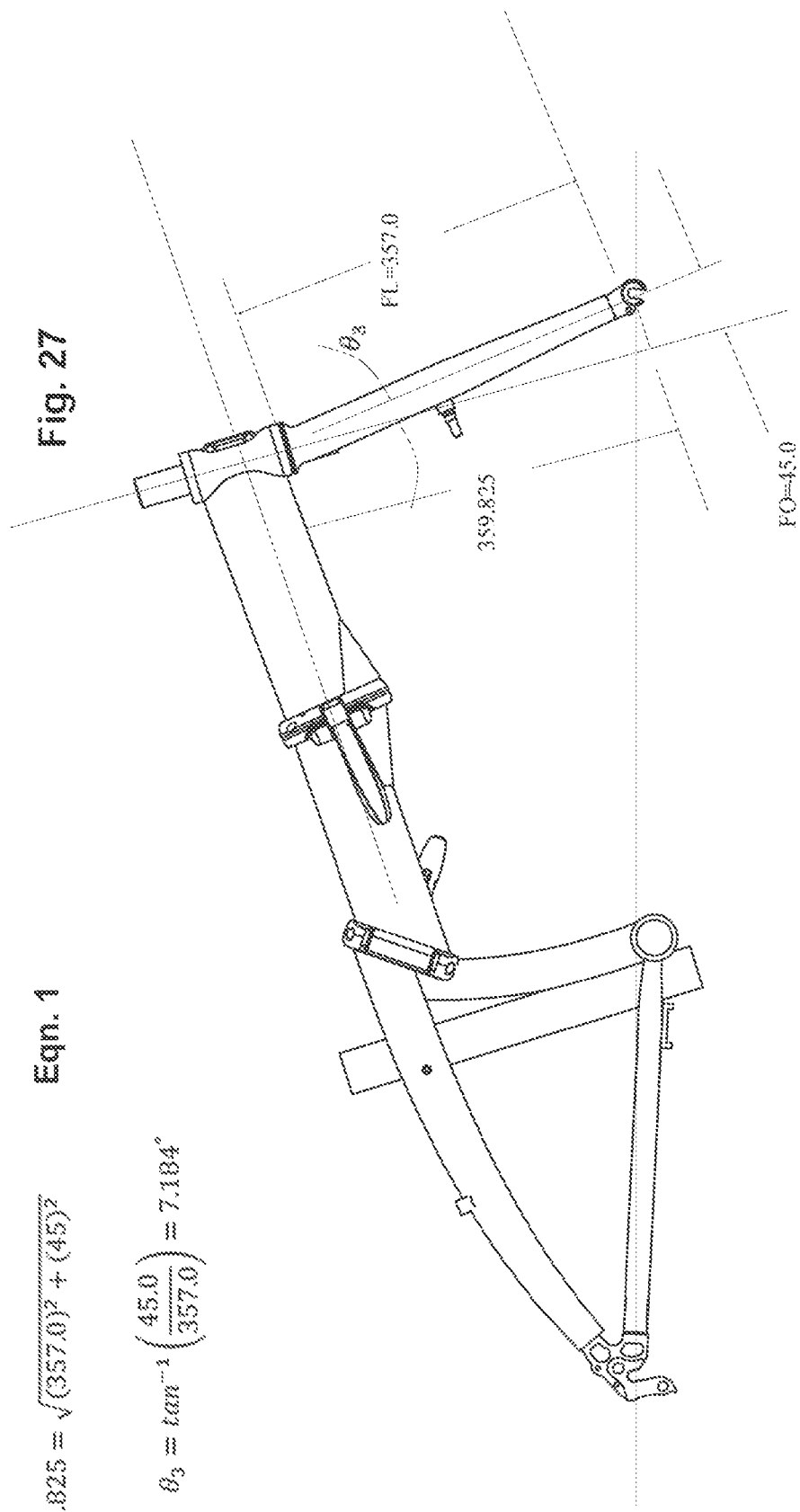

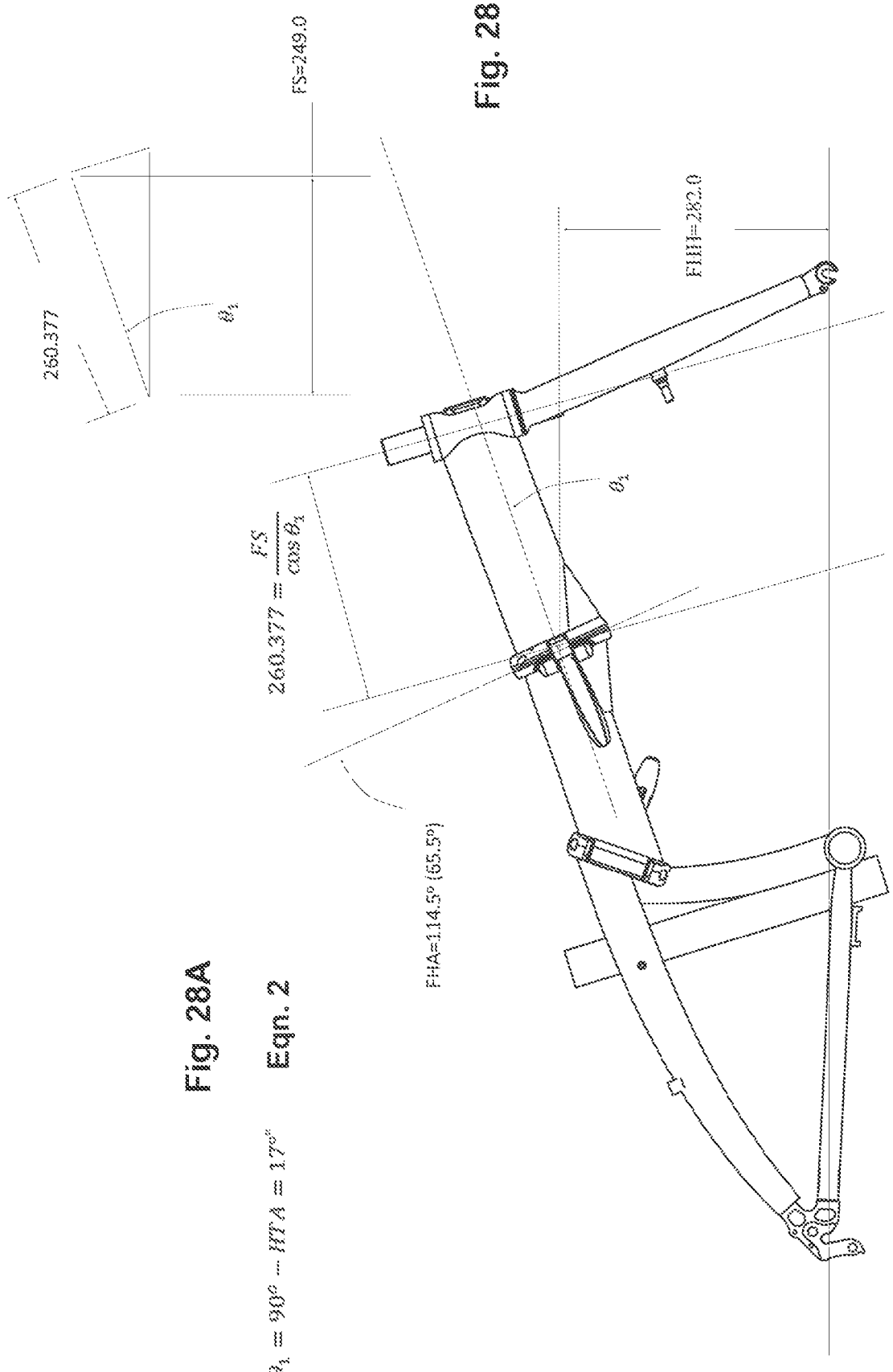

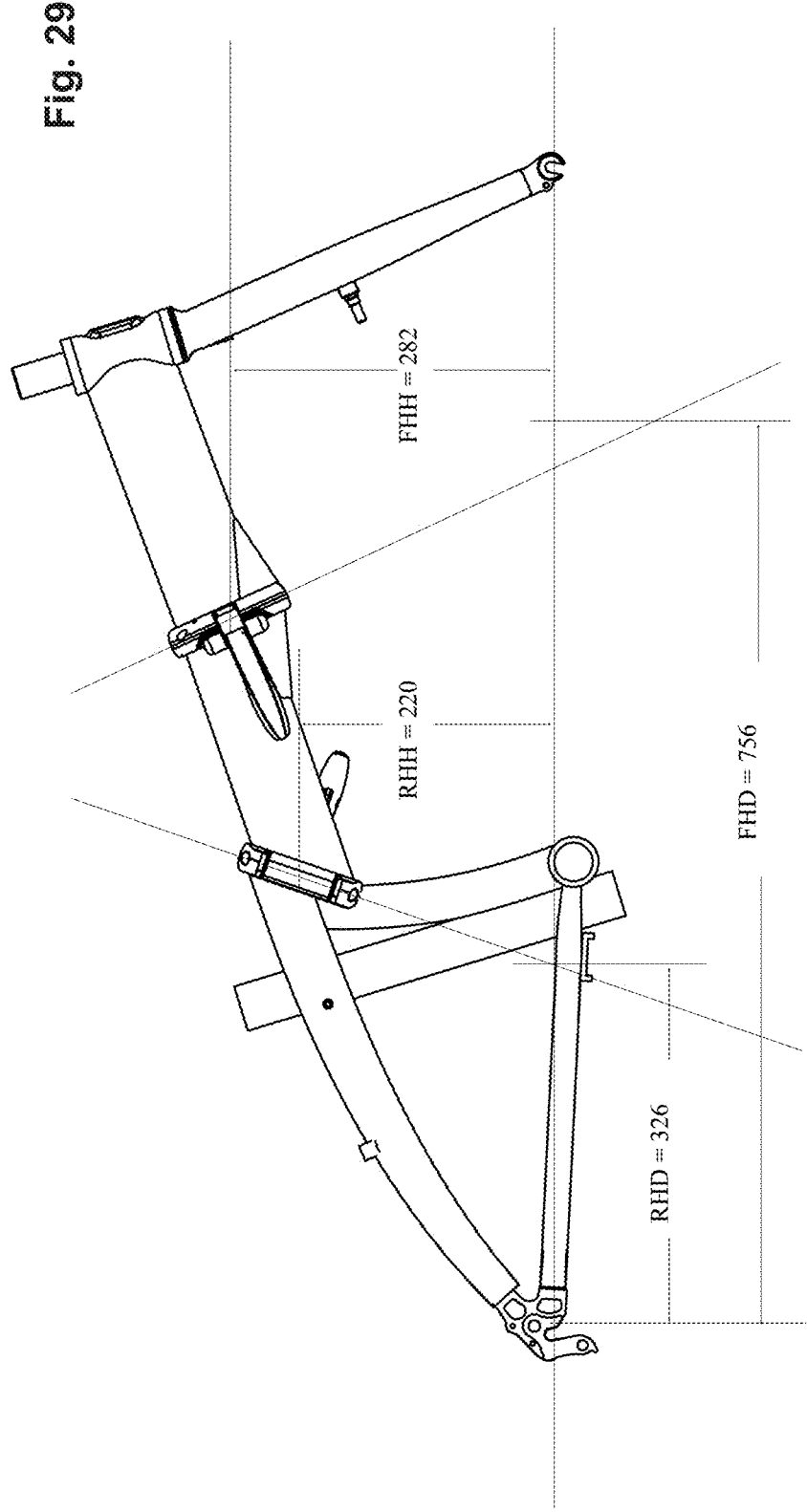

Eqn. 3

$RH_{CL} = RS$ or,
$RH_{CL} = RHD + RHH \cdot \tan(90° - RHA)$ $FH_{CL} = RS + MS$ or,
$FH_{CL} = FHD - FHH \cdot \tan(90° - FHA)$ $\theta_2 = 90° - 71.0° = 19.0°$ $\theta_4 = 90° - 65.5° = 24.5°$

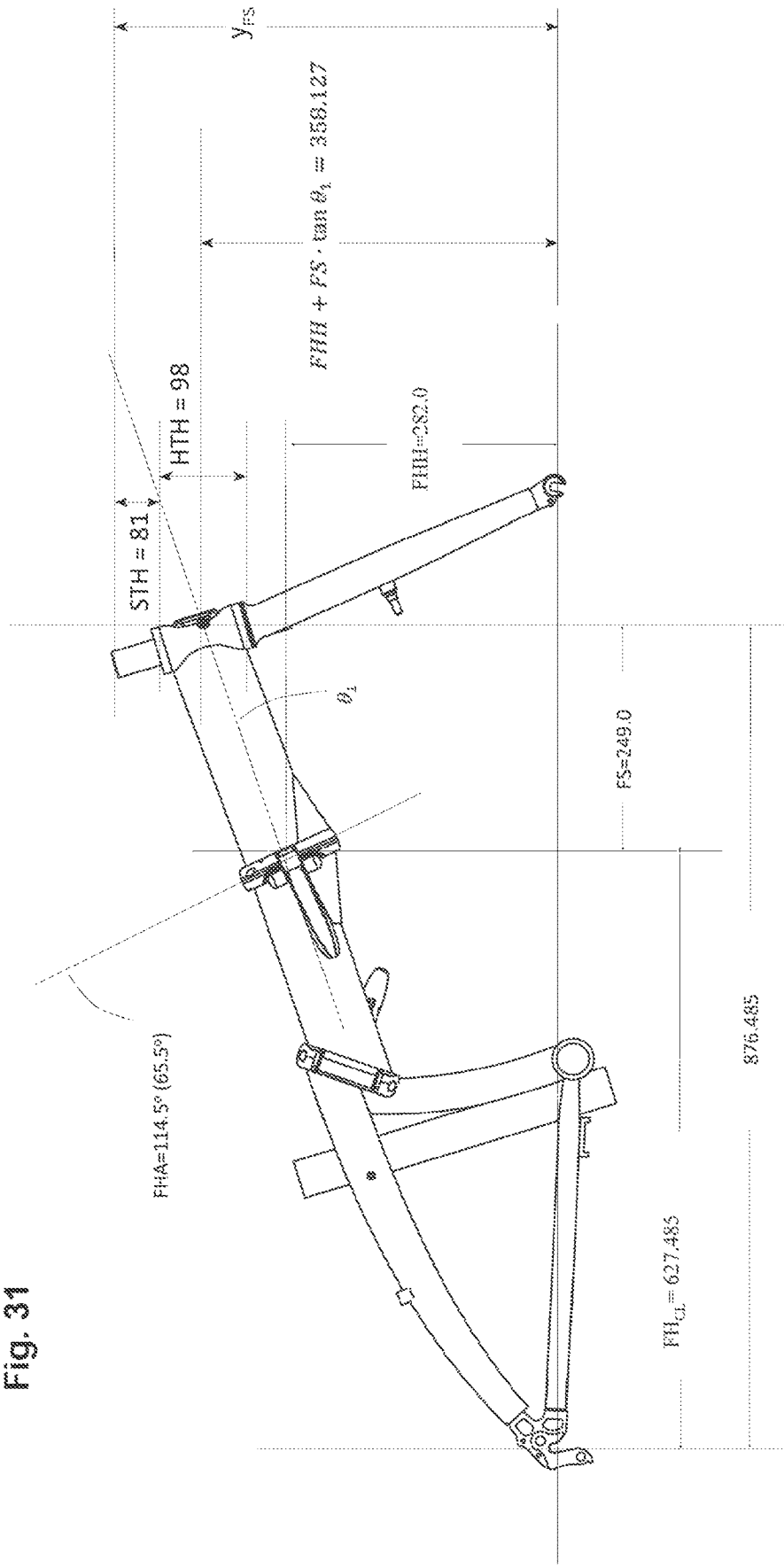

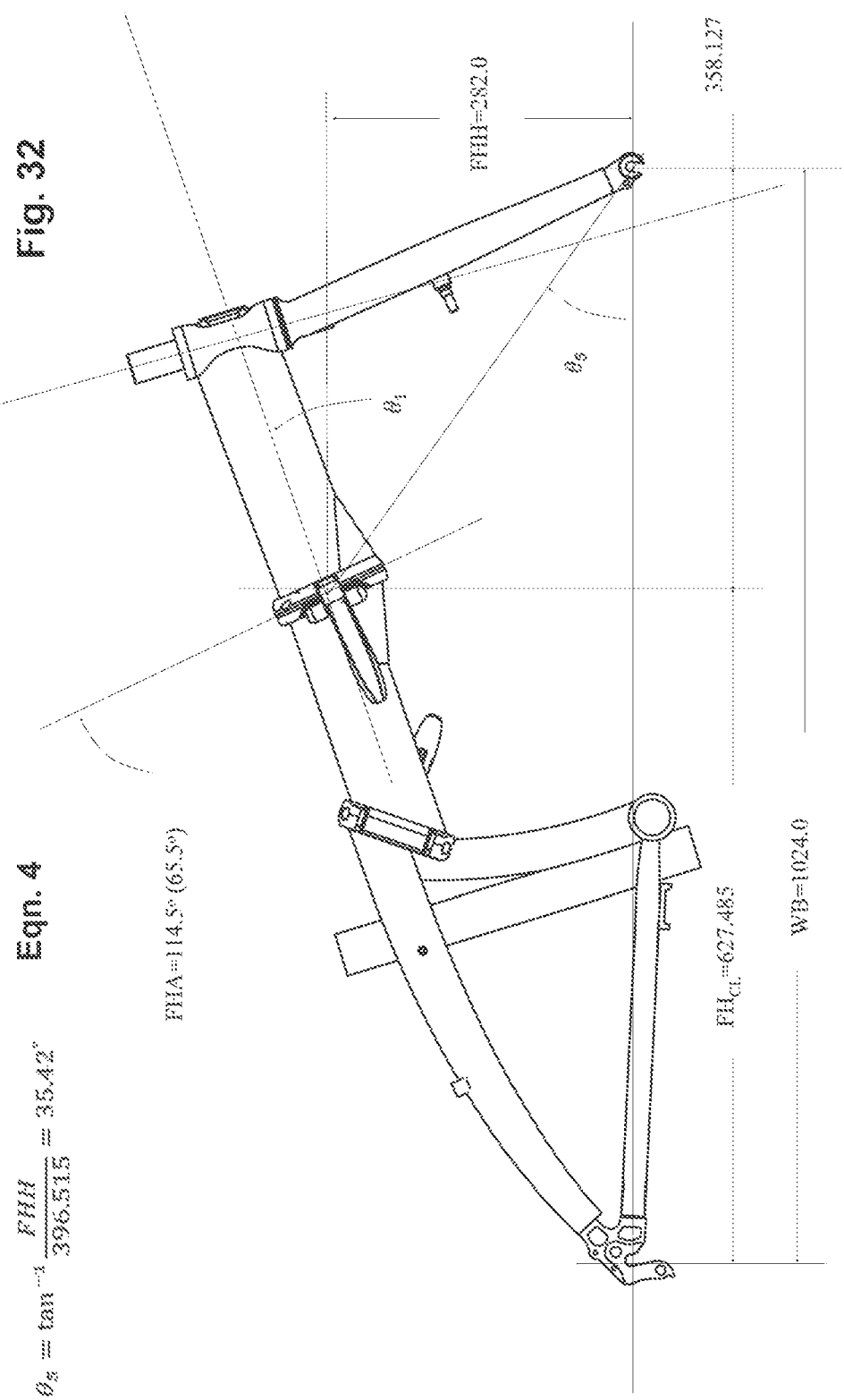

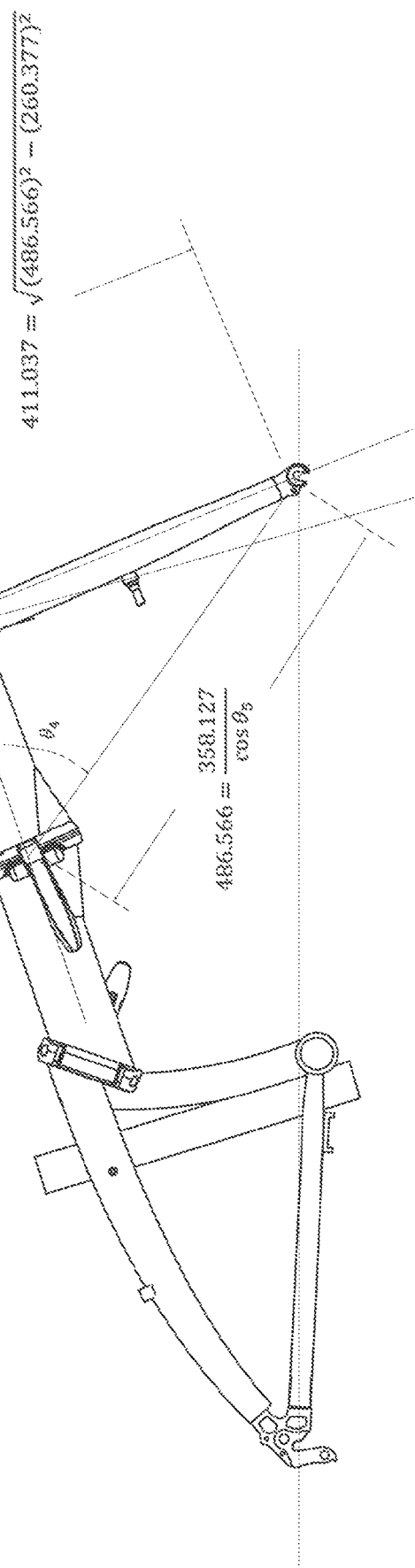

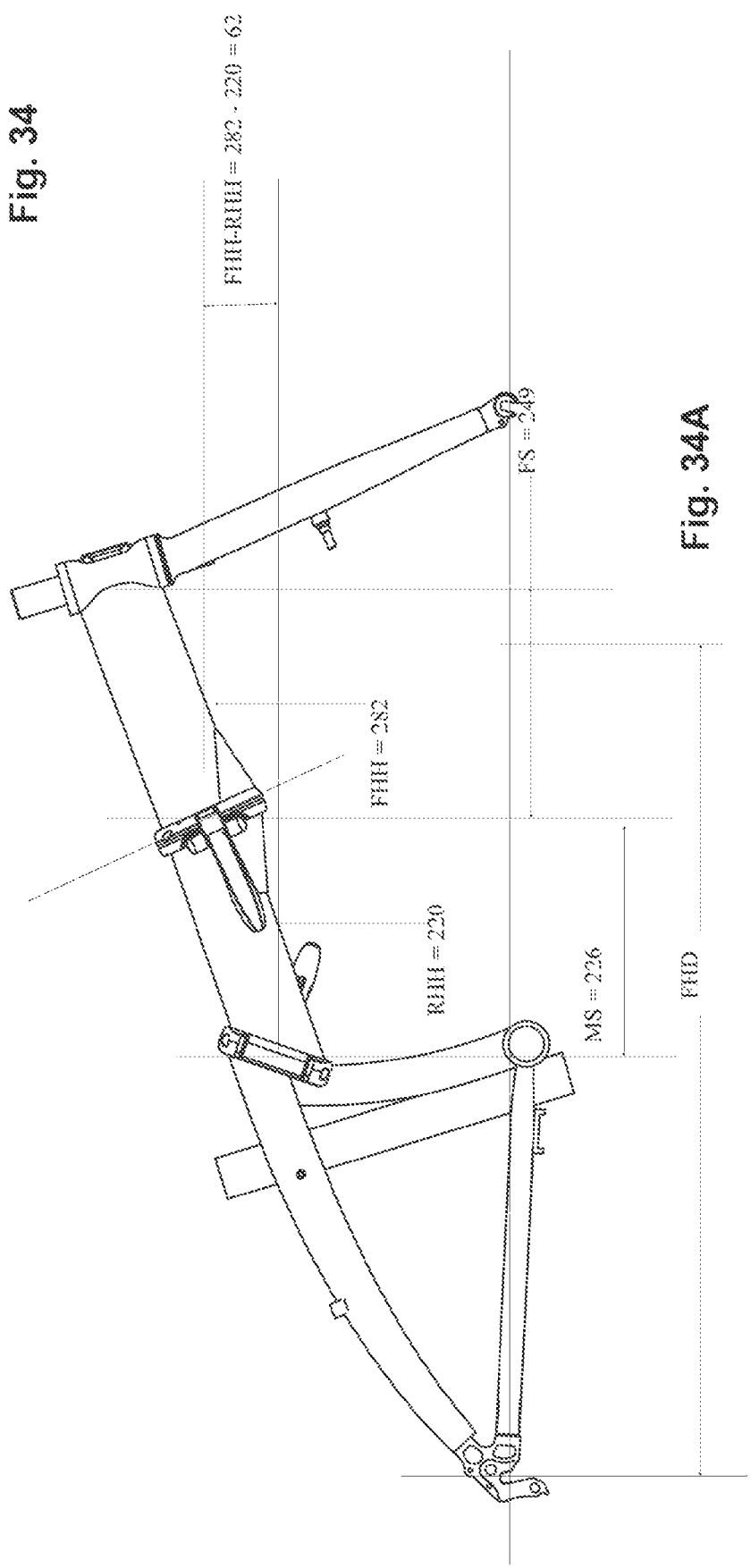

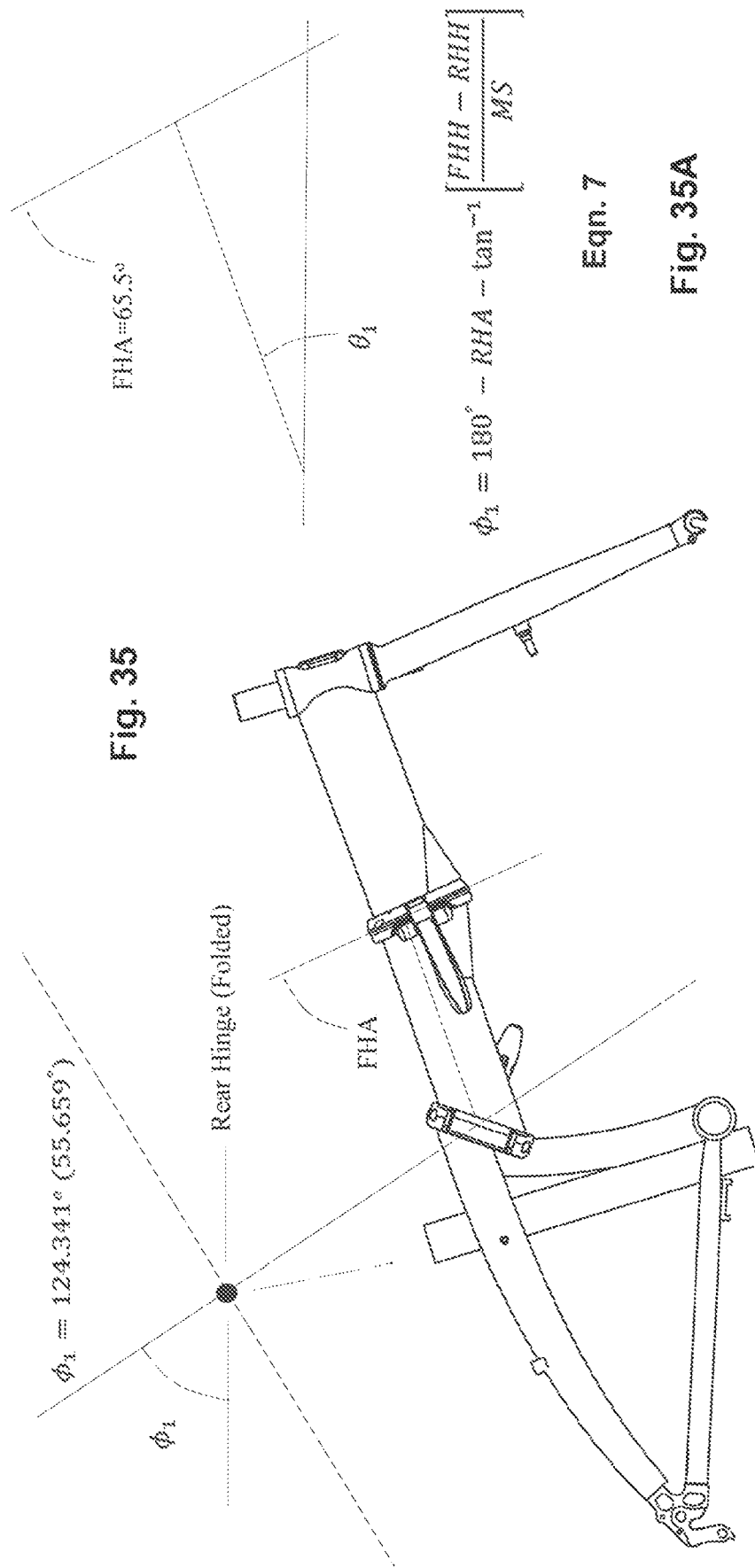

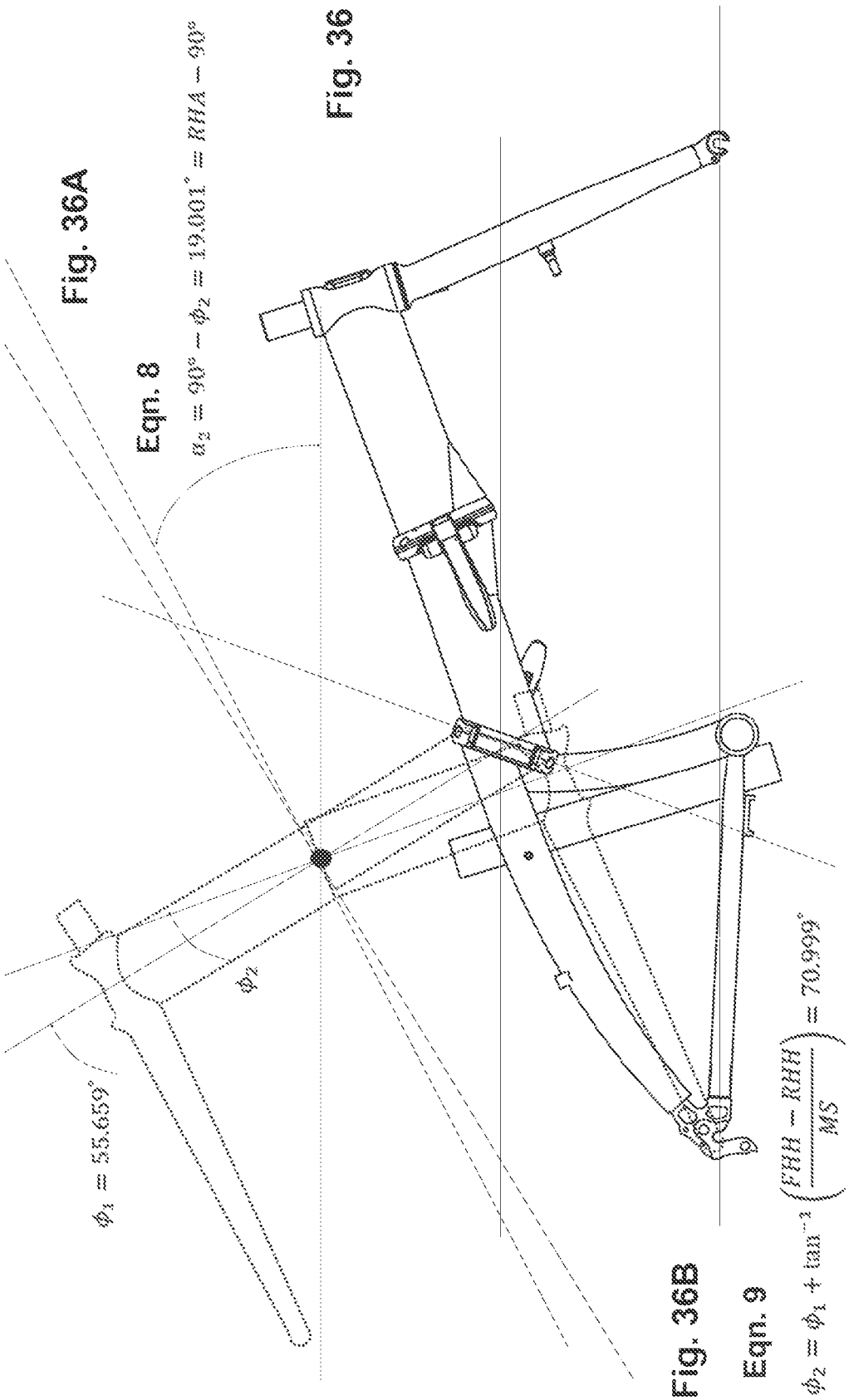

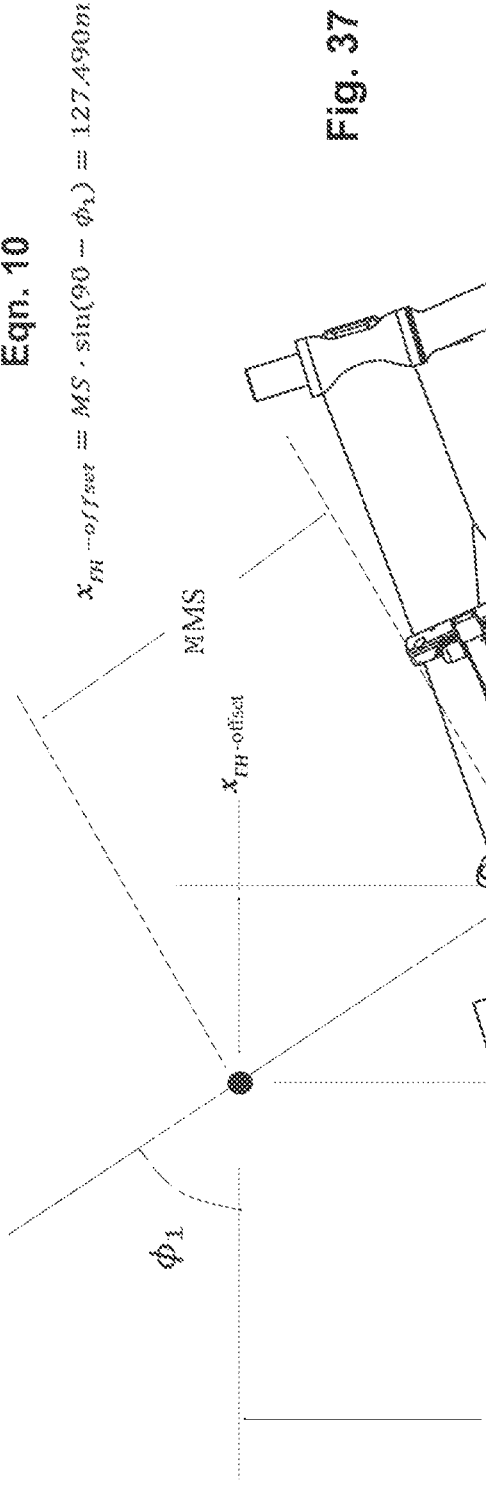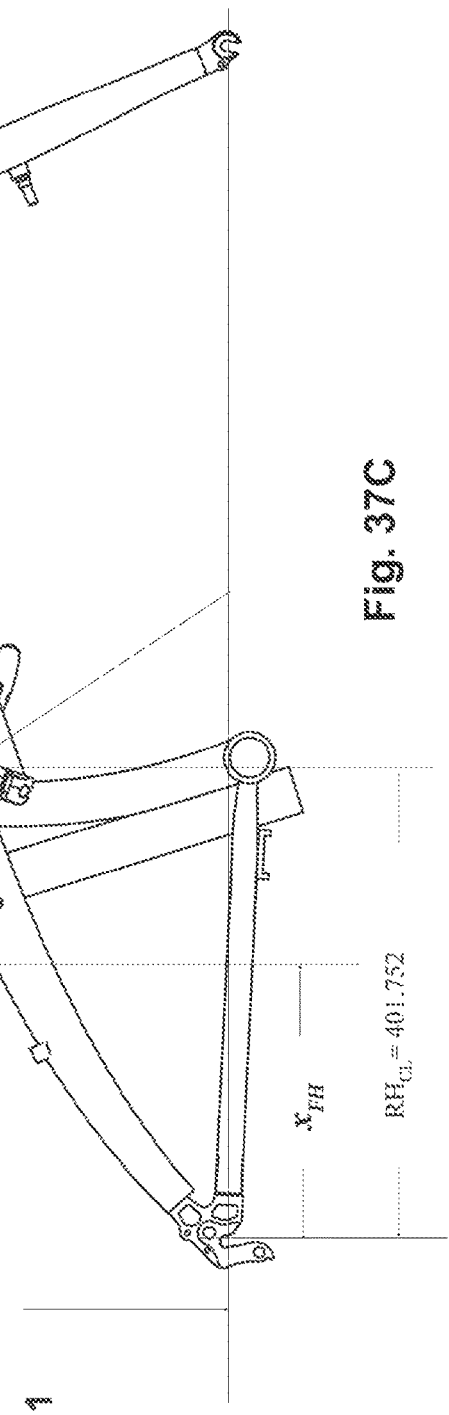

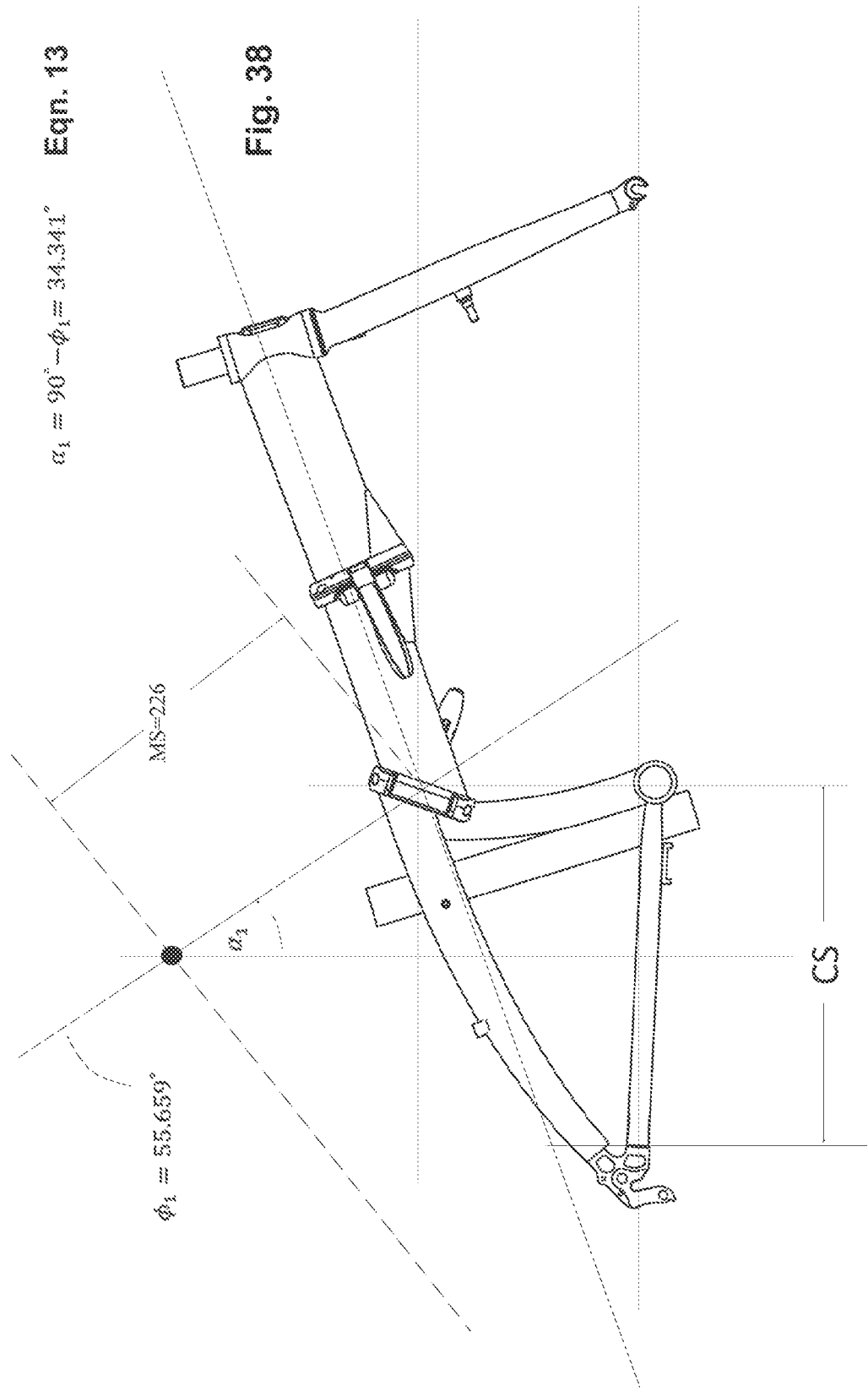

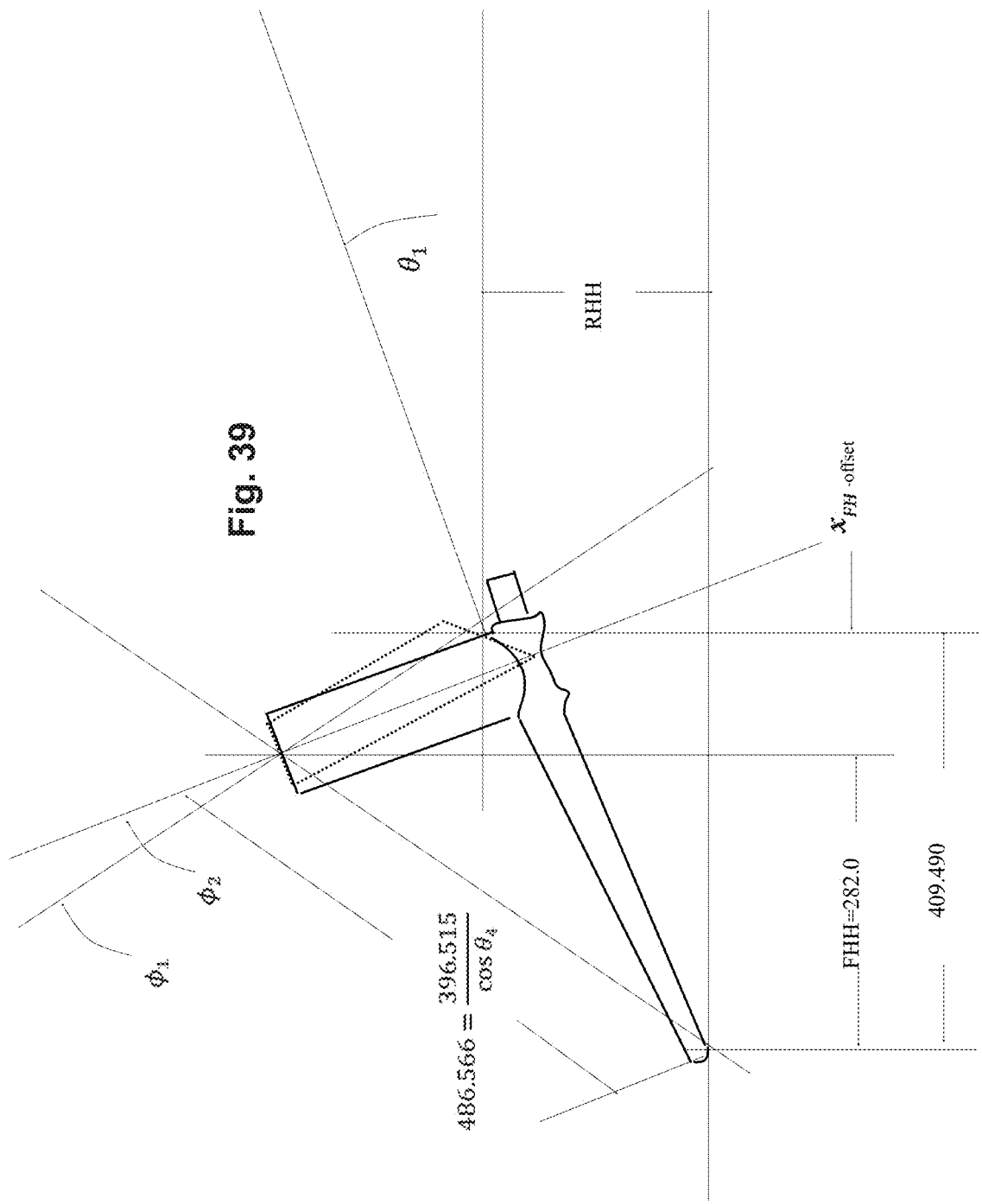

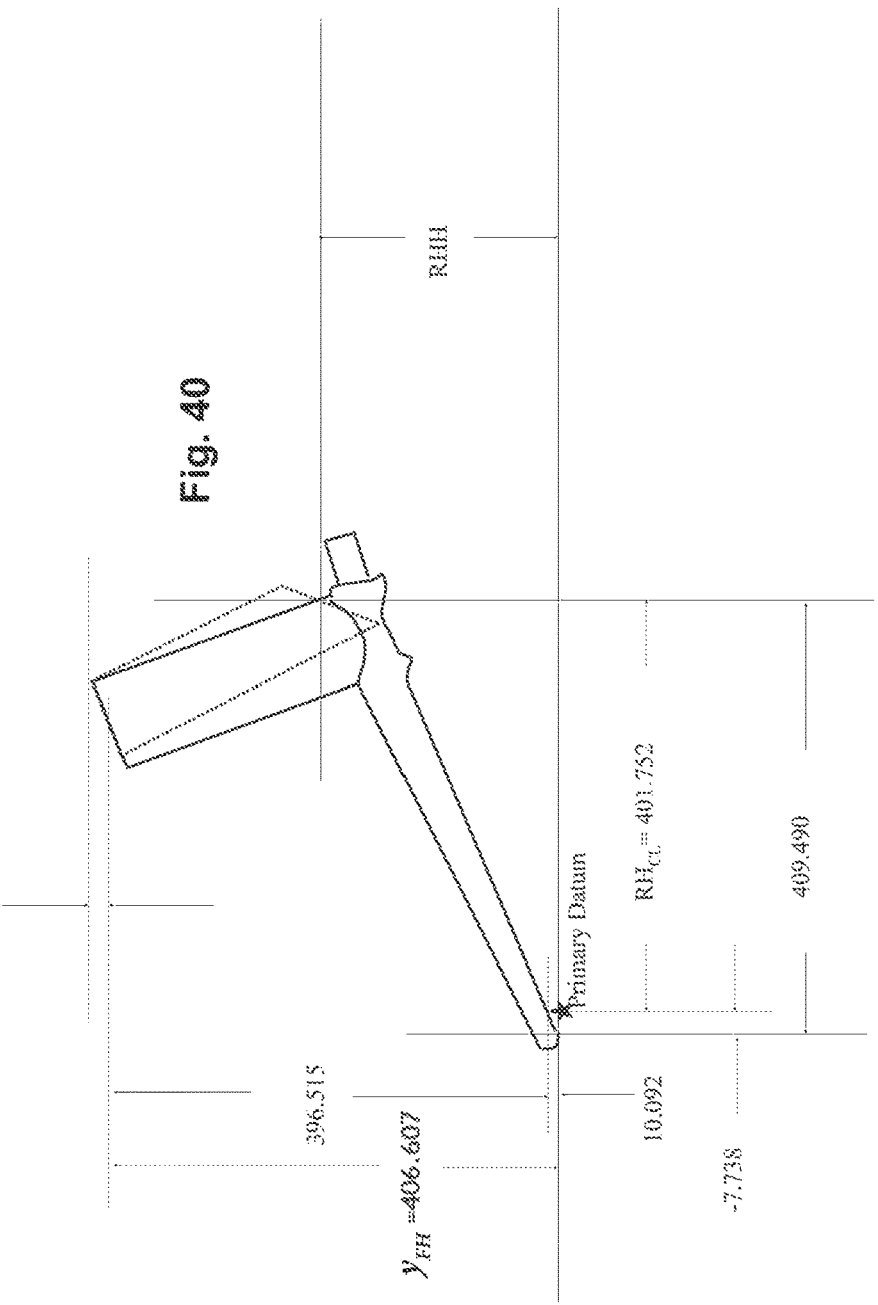

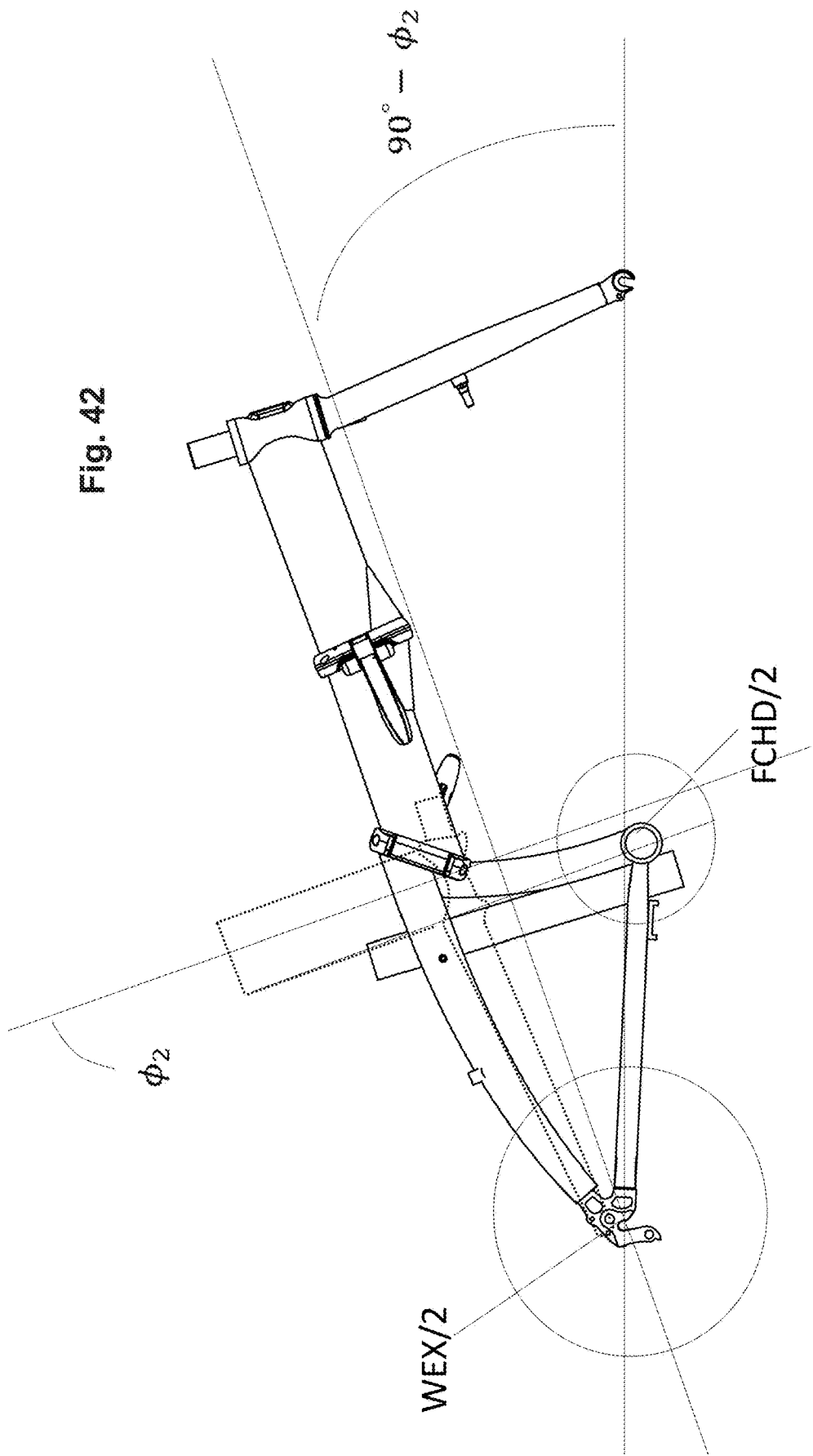

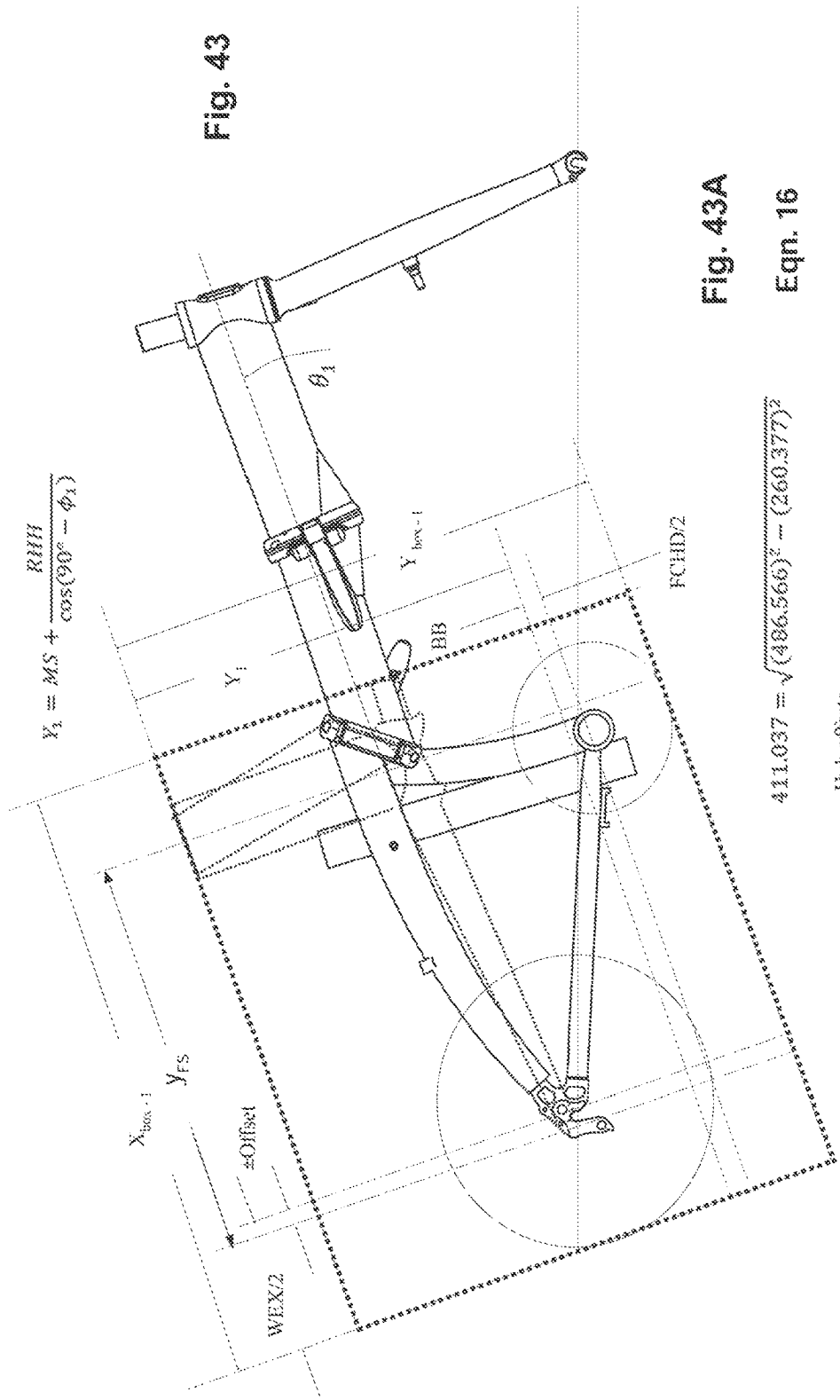

Fig. 44

$$X_{Box1} = \frac{WEX}{2} - Offset + y_{FS}$$

$$y_{FS} = \left(\sqrt{(FL^2 + FO^2)} + HTH + STH\right) \cdot \cos(90° - HTA)$$

$$Offset = \frac{(Hub\,Offset_x)}{ABS(Hub\,Offset_x)} \cdot \sqrt{(Hub\,Offset_x)^2 + (Hub\,Offset_y)^2}$$

$$Hub\,Offset_x = RH_{CL} - (FHH + MS \cdot \sin(90° - \phi_1))$$

$$Hub\,Offset_x = RHD + RHH \cdot \tan(90° - RHA) - (FHH + MS) \cdot \sin\left(RHA + \tan^{-1}\left[\frac{FHH - RHH}{MS}\right] - 90°\right)$$

$$Hub\,Offset_y = RHH + MS \cdot \cos(90° - \phi_1) - [WB - FH_{CL}]$$

$$Hub\,Offset_y = RHH + MS \cdot \cos\left(RHA + \tan^{-1}\left[\frac{FHH - RHH}{MS}\right] - 90°\right) + FHD - FHH \cdot \tan(90° - FHA) - WB$$

$$FH_{CL} = RS + MS$$

$$X_{Box1} = f(FHA, FHD, FHH, FL, FO, HTL, MS, RHA, RHD, RHH, RS, STH, WB, WEX)$$

$$Y_{Box1} = MS + \frac{RHH}{\cos\left(RHA + \tan^{-1}\left[\frac{FHH - RHH}{MS}\right] - 90°\right)} + \frac{FCHD}{2}$$

$$Y_{Box1} = f(FCHD, FHH, MS, RHA, RHH)$$

Eqn. 17

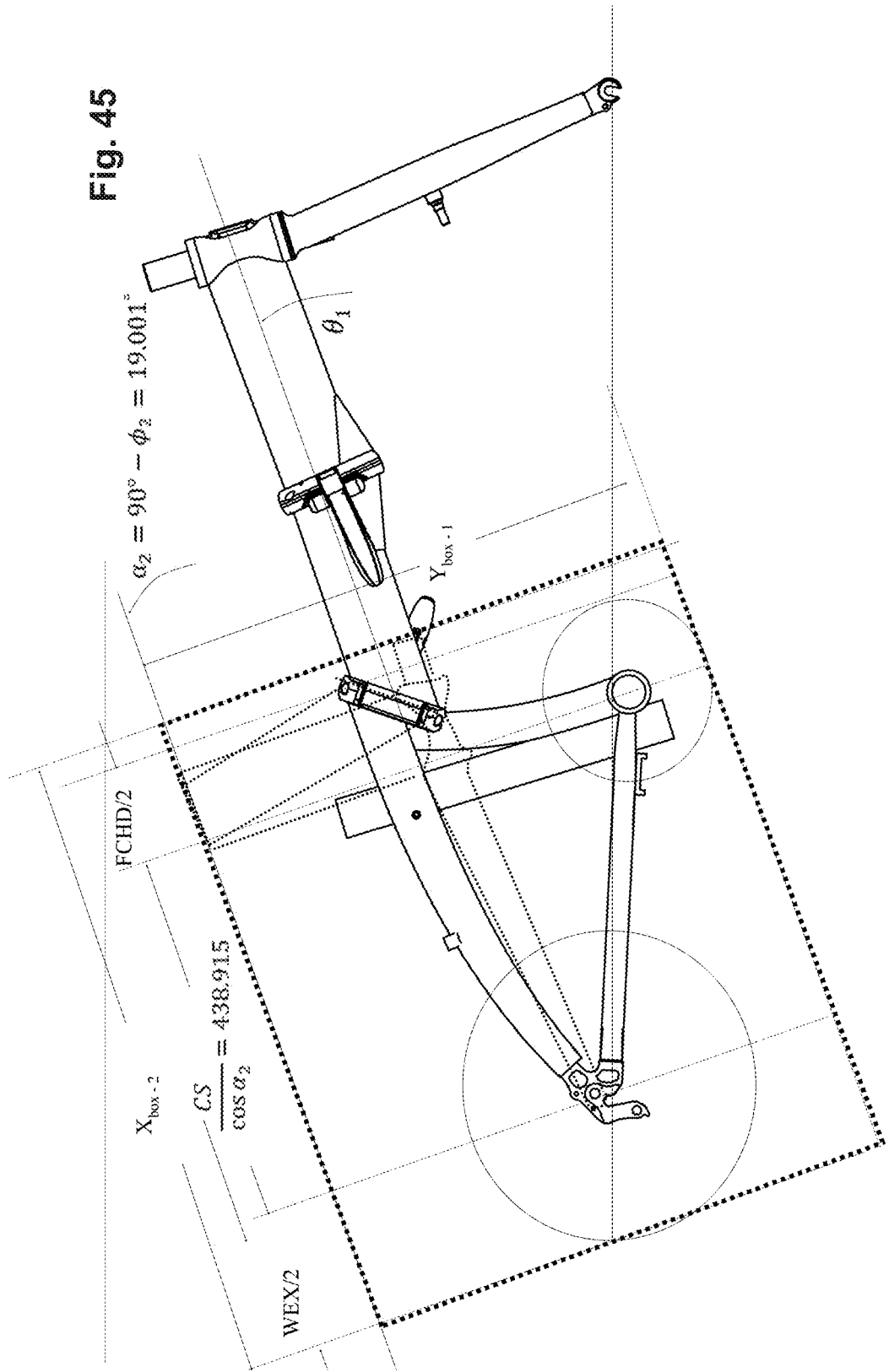

Fig. 46

$$X_{Box2} = \frac{WEX + FCHD}{2} + \frac{CS}{\cos(RHA - 90°)}$$

$X_{Box1} = f(CS, FCHD, RHA, WEX)$ $$Y_{Box2} = MS + \frac{RHH}{\cos\left(RHA + \tan^{-1}\left[\frac{FHH - RHH}{MS}\right] - 90°\right)} + \frac{FCHD}{2}$$

$Y_{Box1} = f(FCHD, FHH, MS, RHA, RHH)$

Eqn. 18

$$BoxArea1 = \left\{\frac{WEX}{2} - Offset + \left(\sqrt{(FL^2 + FO^2)} + HTH + STH\right) \cdot \cos(90° - HTA)\right\} \left\{MS + \frac{RHH}{\cos\left(RHA + \tan^{-1}\left[\frac{FHH-RHH}{MS}\right] - 90°\right)} + \frac{FCHD}{2}\right\}$$ Eqn. A

Fig. 47

$$Offset = \frac{(Hub\ Offset_x)}{ABS(Hub\ Offset_x)} \cdot \sqrt{(Hub\ Offset_x)^2 + (Hub\ Offset_y)^2}$$

$$Hub\ Offset_x = RHD + RHH \cdot \tan(90° - RHA) - (FHH + MS \cdot \sin\left(RHA + \tan^{-1}\left[\frac{FHH-RHH}{MS}\right] - 90°\right))$$

$$Hub\ Offset_y = RHH + MS \cdot \cos\left(RHA + \tan^{-1}\left[\frac{FHH-RHH}{MS}\right] - 90°\right) + FHD - FHH \cdot \tan(90° - FHA) - WB$$

$$BoxArea2 = \left\{MS + \frac{RHH}{\cos\left(RHA + \tan^{-1}\left[\frac{FHH-RHH}{MS}\right] - 90°\right)} + \frac{FCHD}{2}\right\} \cdot \left[\frac{WEX + FCHD}{2} + \frac{CS}{\cos(RHA - 90°)}\right]$$ Eqn. B

Fig. 47A

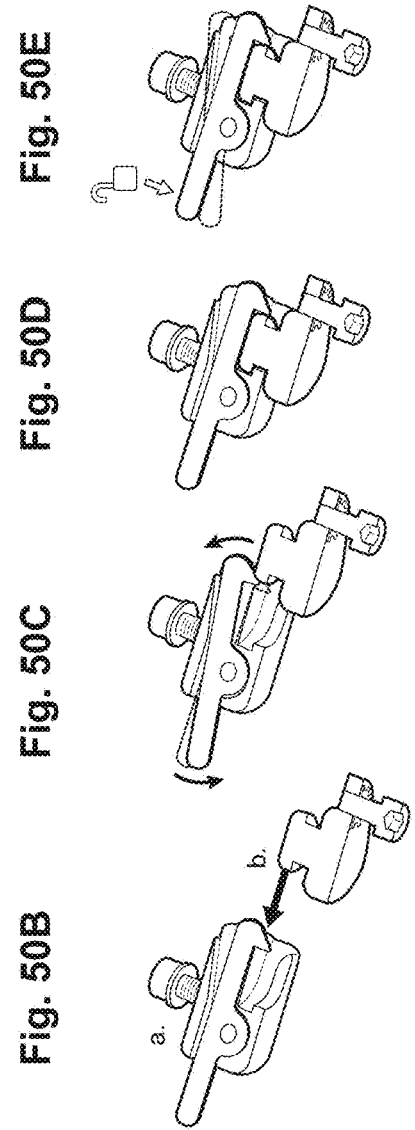
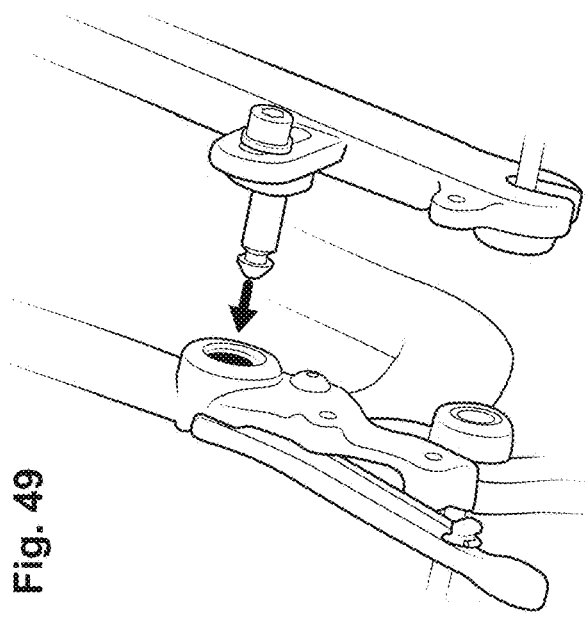
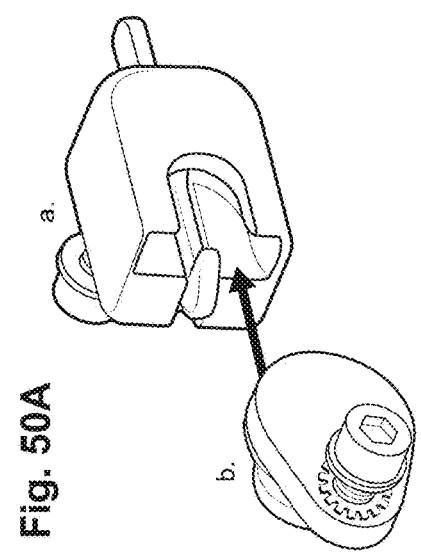

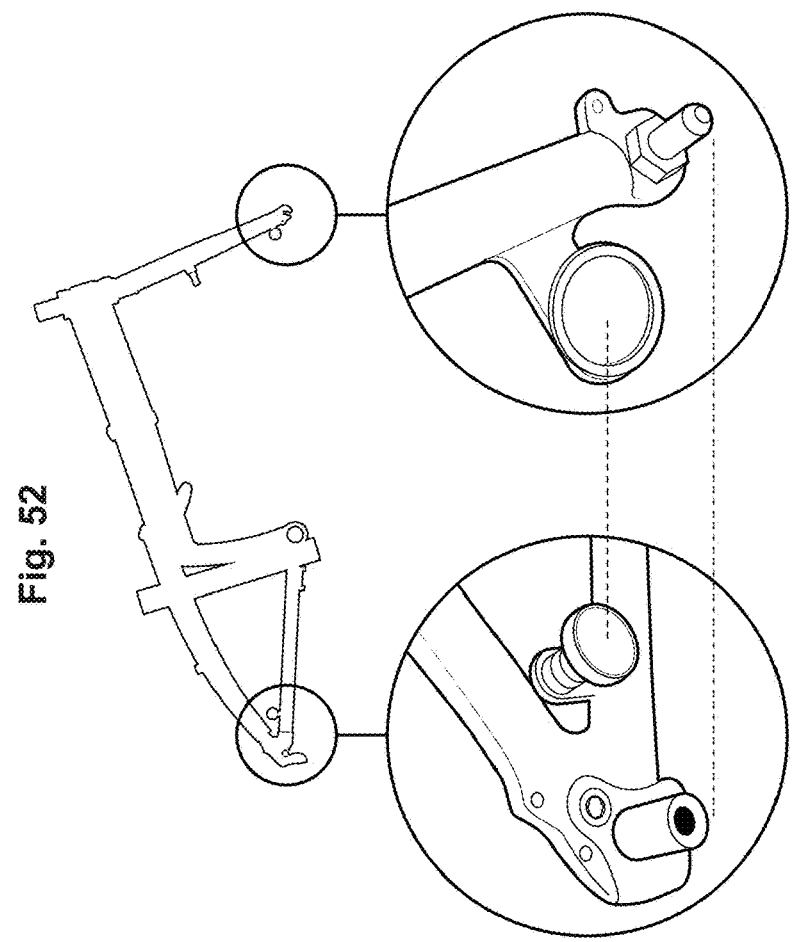
Fig. 52
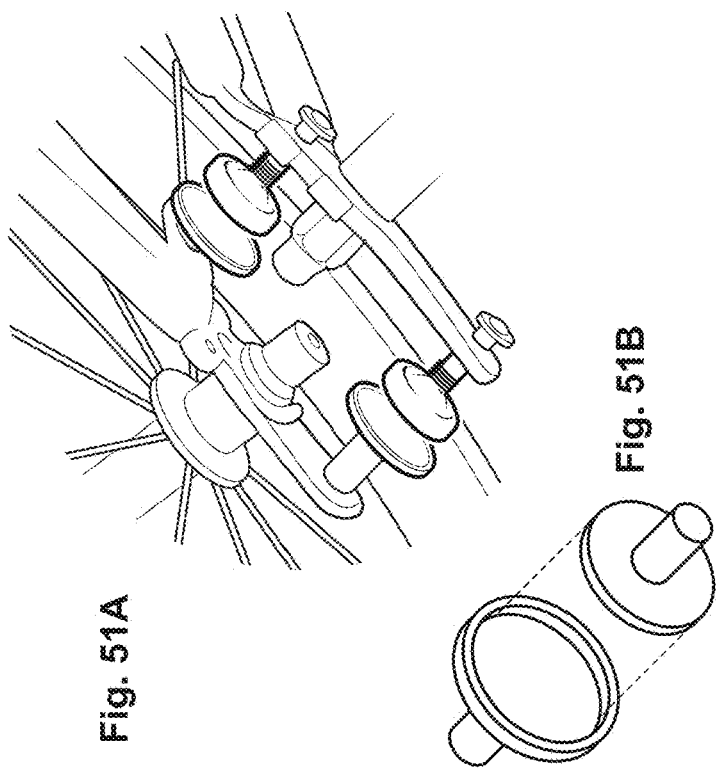
Fig. 51A
Fig. 51B

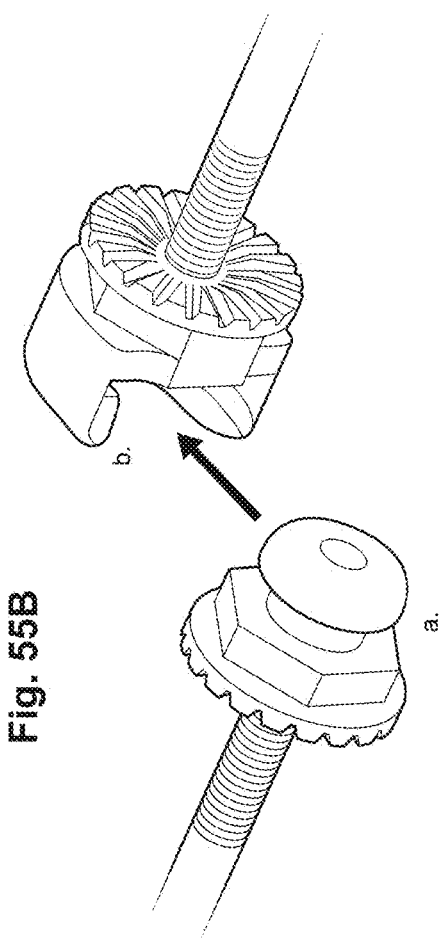
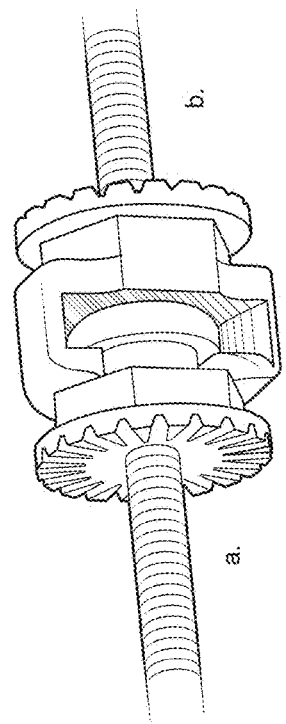
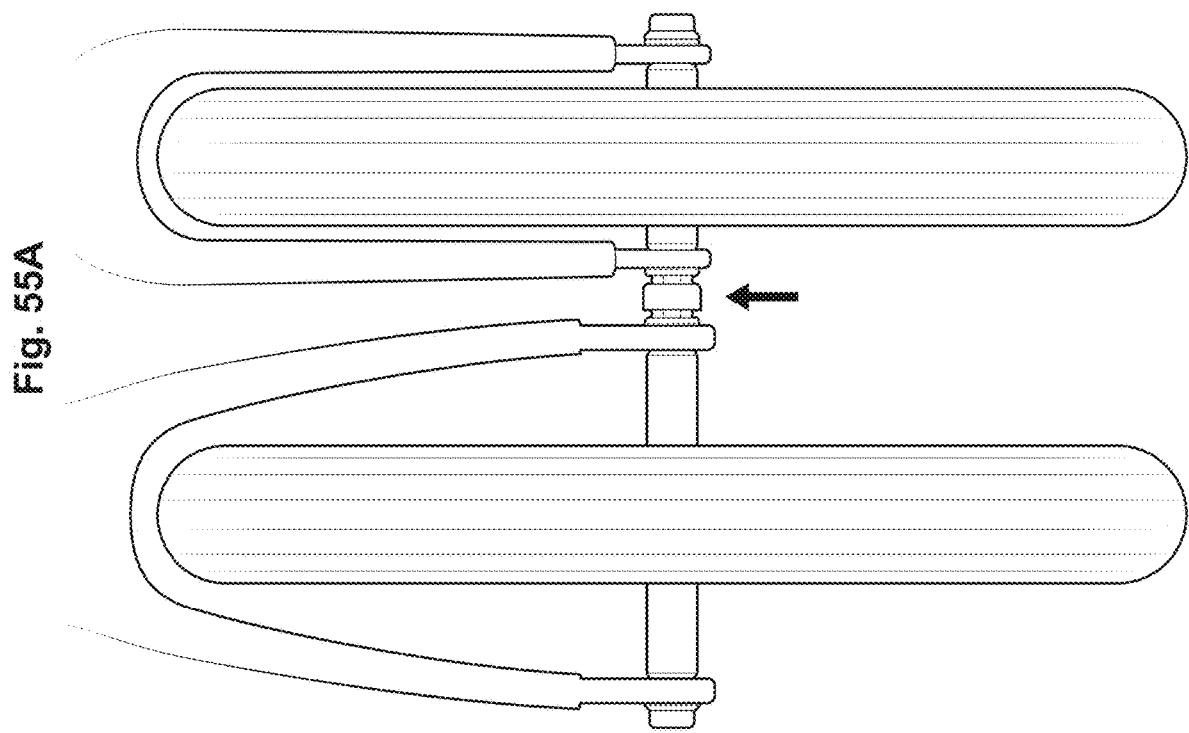

TRIFOLD BICYCLE FRAME

RELATED APPLICATIONS

This application claims the benefit under 35 U.S.C. § 119(e) of U.S. Provisional Application No. 62/300,753, filed 26 Feb. 2016, and U.S. Provisional Application No. 62/300,754 (the "'754 application"), filed 26 Feb. 2016.

BACKGROUND OF THE INVENTION

Field of the Invention

This invention relates to a folding bicycle, and a folding bicycle frame.

Definitions

The following terms used in the Specification and Claims of this application have meaning as set forth in this section. In the event of conflict between condensed definitions in Table 2 and this definitions section, this definition section shall prevail. Unless otherwise specified, the directional terms front, forward, rear, rearward, left, and right are those perceived by a rider seated on the saddle of an unfolded bicycle of the invention. Measurements are in millimeters unless otherwise specified.

"Airline legal volume" means the volume of a suitcase or other container in which the sum of the X, Y, and Z dimensions of the suitcase (or other container) is no more than 62 inches.

"Airline legal suitcase" means a suitcase, or other container commonly accepted as checked baggage by airlines, with volume equal to or less than airline legal volume.

"Alternate folded volume" means the volume of a folding bicycle in a folded configuration that is greater than minimum folded volume, but which configuration does not topple over and thereby provides additional utility. One preferred alternate folded volume of a Trifold Design bicycle is a folded configuration in which the rear and front wheels have several centimeters of separation and remain in parallel track, and cargo loaded on that folding bicycle is not removed when the folding bicycle is folded; the cargo prevents a configuration of minimum folded volume.

"Barrier areas" means areas that require folding a folding bicycle to transit, either by regulation or by physical necessity, such as turnstiles, elevators, stairs, boarding areas of mass transit or vessels, and aboard mass transit or vessels.

"Baseline" means a line along the central, longitudinal ("X") axis of an unfolded bicycle of the invention shown in a top view; in side view of an unfolded bicycle of the invention, the baseline connects (i) the center of a rear axle disposed in the rear dropout and (ii) the center of a front axle disposed in the front dropout. In a top view of an unfolded bicycle of the invention, the baseline bisects the mainbeam, seat tube, and head tube. For a folding bicycle equipped with front and rear wheels of identical wheel external diameter, the baseline is horizontal in a side view of the unfolded bicycle, as shown in FIG. 22A. The center of an axle disposed in a dropout in a side view of an unfolded bicycle of the invention is called hereafter "the center of a dropout". As shown in FIG. 22A, the baseline extends rearward from the rear dropout to facilitate measurement of hinge angles, head tube angle, etc.

"BB" or "bottom bracket height" is the distance in a side view of a bicycle of the invention from the center of the bottom bracket to the baseline.

"Bifold design" means a folding bicycle design that has one mainbeam joint and one handlepost joint.

"Box area" means the product of multiplying the Y dimension of a fully folded Trifold Design bicycle by the X dimension of a fully folded bicycle. Box area is synonymous with "folded package area".

"Cargo" means loads, typically carried on bicycles in front and/or rear panniers, of a volume typically used by commuters and cyclotourists.

"Cargo holder" means a rack, pannier, or other support or container, or combinations thereof, affixed to a folding bicycle and in which cargo is placed.

"CS" or "chain stay" means the length of a chain stay in a side view of an unfolded bicycle of the invention. CS is measured from the center of the rear dropout to the center of the bottom bracket.

"CCWr" or "CCWrear" means that the rear mainbeam joint hinge pin is on the left side of the rear hinge, and the front mainbeam joint hinge pin is on the right side of the front hinge, which produces "rear hinge counterclockwise rotation, forward hinge clockwise rotation".

"CWr" or CWrear" means that the rear mainbeam joint hinge pin is on the right side of the rear hinge, and the front mainbeam joint hinge pin is on the left side of the front hinge, which produces "rear hinge clockwise rotation, forward hinge counterclockwise rotation".

"Data banner" means a table reciting Design Variables for the version of a Trifold Design bicycle shown on the same drawing sheet as the data banner.

"Design Variables" means the 25 variables recited in Table 2, and defined herein, that specify how a Trifold Design folding bicycle folds.

"Drive system" means the parts of a bicycle, including one of Trifold Design, that convey motive force to its driven wheel. The drive system on a bicycle without an electric motor typically comprises pedals, crankset, crank spindle (aka crank axle), bottom bracket, chain, one or more chain rings affixed to the crankset and engageable with the chain, one or more sprockets concentric with the rear axle and engageable with the chain, wherein the chain (belt, or other equivalent of a chain) wraps partially around a chain ring and partially around a sprocket ("pedal drive system"), and wherein a bicycle rider pedals the bicycle to generate motive force at the rear wheel A bicycle, including one of Trifold Design, can be motorized by the inclusion of an electric motor, an internal combustion motor, or other source of propulsive force. The drive system on a bicycle with "motor drive system" typically comprises a battery or other power source (e.g., fuel for an internal combustion engine); an electric motor, an internal combustion engine, or other source of motive force; a means of conveying the motive force to the driven wheel, and a means whereby a rider can control the motive force. A motor drive system may be installed on the same folding bicycle as a pedal drive system. In some pedal drive systems and motor drive systems, both front and rear wheels of a bicycle may be driven. A toothed belt, belt ring, and belt sprocket(s) can replace the chain, chain ring, and chain sprocket(s) in a pedal drive system. A shaft, wire, spring, or cable drive system can be used to replace the chain and optionally the chain ring(s) and rear sprocket(s) (depending upon drive system design) in a pedal drive system or a motor drive system. A pedal drive system typically includes a means of changing the gear ratio, such as (i) a front and/or rear derailleur(s), (ii) an internal gear hub, or (iii) an internal geared crankset.

"Driven wheel" means the wheel (or wheels) to which motive power is delivered from a source of motive power, i.e., a rider, motor, or engine. The rear wheel of a folding bicycle is the driven wheel herein, unless otherwise specified.

"Dropout" means the concavity or hole into which a wheel axle is secured to enable proper operation of an unfolded bicycle of the invention. The rear dropout is in the rearmost area of the rear mainbeam segment. The front dropout is in the forwardmost area of the fork.

"FAW" or "front axle width" means the width of the front axle (i) plus the Z-axis dimension of the handlebar assembly when the handlepost joint is folded and maximally rotated open and the handlebar is positioned to minimize its Z dimension, and (ii) less any reduction in Z-axis dimension of a folded Trifold design bicycle if the front axle is placed forward or rearward of the rear axle rather than inline on the same Z-axis of the rear axle. FAW is used in computation of folded package volume.

"FCHD" or "front chain ring diameter" is the diameter in a side view of a bicycle of the invention of the chain ring, or in an embodiment of the invention with multiple chain rings, of the largest chain ring.

"FD" means folding direction, either clockwise or counterclockwise, of a hinge on a folding bicycle when viewed by the rider seated in the saddle of an unfolded folding bicycle. Unless otherwise specified, FD means the folding direction of the hinge in the rear mainbeam joint of the claimed invention. As disclosed below, in the claimed invention, the hinge in the front mainbeam joint has an FD that is opposite from the FD of the hinge in the rear mainbeam joint.

"FHW" or "front hub width" is the distance in a top view of bicycle of the invention between the (i) interior face of the left front dropout (of the fork) and (ii) the interior face of the right front dropout (of the fork).

"FHA" or "FH" or "front hinge angle" is the measurement in side view of an unfolded bicycle of the invention, in degrees clockwise from the baseline, of the long axis of the hinge pin in the front mainbeam joint. The FH is shown in the Drawings. The front mainbeam joint is also called the "front hinge". "FH" is sometimes used subscript for to refer to the front hinge.

"FHAD" or "front hinge axis distance" is the measurement in top view of an unfolded bicycle of the invention of the distance from the vertical center plane to the center of the diameter of the hinge pin in the front mainbeam joint.

"FHD" or "front hinge distance" is the measurement on the baseline in a side view of the bicycle of the invention from the center of the rear dropout to the projection on the baseline of the center of the long axis of the hinge pin in the front mainbeam joint.

"FHH" or "front hinge height" is the distance from the baseline to the center of the long axis of the hinge pin of the front mainbeam joint of an unfolded bicycle of the invention.

"FL" or "fork length" is the length of the fork in a side view of a folding bicycle of the invention from the front dropouts to the center of the head tube lumen at its lower opening.

"FMS" or "front mainbeam segment" means the segment of the mainbeam forward of the front mainbeam joint. The front mainbeam segment extends from the center of the long axis of the hinge pin in the front mainbeam joint to the center of the head tube lumen at its lower opening. The FMS is shown in the Drawings.

"Folded" means the configuration of a joint in which the joint is unlocked and hinged parts pivoted so that the front and rear wheels have parallel track. "Folded" also means the configuration of a folding bicycle in which all joints are unlocked and the folding bicycle is configured in minimum folded volume (or in an alternate folded volume). When all joints in a folding bicycle are folded, the folding bicycle consumes a much smaller volume than when unfolded, and therefore the folding bicycle is much easier to store or to transport. A folded bicycle has a smaller X dimension (length) and a smaller Y dimension (height) than an unfolded bicycle, but has a larger Z dimension (depth) than an unfolded bicycle.

"Folded bicycle" means a folding bicycle in a folded configuration. "Fully folded" means that the front hinge and rear hinge are opened and maximally rotated open, the front and rear axles are in the same or nearly the same Z-axis, and the wheels are in parallel track.

"Folded fixing means" means a releasable lock, latch, strap, or other device that secures a joint in a "hinge opened" or "folded" position, or connects other structural elements of a folded bicycle (or of attachments to the folding bicycle frame, such as panniers, racks, and other detachable structures) designed to engage when the bicycle is folded, thereby permitting the folded bicycle to be carried or rolled without the structural members affixed to a hinge rotating unrestrained about the relevant hinge. Folded fixing means can permit the structural members affixed to a hinge to maintain a user selectable amount of hinge openness. A folded fixing means for a handlepost restrains the handlepost from rotating on the handlepost hinge when a folding bicycle is folded. A folded fixing means for a mainbeam (including without limitation a mainbeam joint) keeps the wheels of a folded bicycle of the invention in parallel track, which enables the stable tracking of the folded bicycle when rolled. A folded fixing means for a mainbeam may have several "Z dimension" detents, stops, latches, or equivalents that keep the wheels in parallel track, but at a set distance apart. The Z dimension of separation of the wheels of a folded bicycle of the invention can vary between minimum Z to achieve the smallest folded package volume, and a maximum Z to provide the largest space between the parallel-tracked wheels, which space can contain racks and also panniers or other means of carrying cargo. A folded fixing means can interface with a pannier or other cargo container placed between and/or straddling the wheels of a folded bicycle. Such cargo container interface can fasten one or more containers and/or support the weight of one or more containers between the wheels, and/or straddling the wheels, or a folded bicycle. A folding fixing means provides at last two user-selectable separations of the front and rear wheels when the frame of a Trifold design bicycle is folded. A Trifold design folding bicycle can be equipped with one or more rear racks or one or more rear panniers or other types of cargo holders, and cargo placed in one or more cargo holders, and when the frame is folded, the folded frame can be rolled on the front and rear wheels in parallel track without removal of cargo or cargo holder by setting the folded fixing means to maintain the separation of the front and rear wheels. A folded fixing means reduces yaw when a folded Trifold Design bicycle is rolled on its wheels. Folded fixing means are distinguished from "unfolded fixing means". Folded fixing means are shown in FIGS. 49 to 55.

"Folded package" means the three-dimensional shape of a folding bicycle when folded.

"Folded package area", or "box area", means the side view area of a folding bicycle when fully folded.

"Folded package volume" means the volume of a folding bicycle when folded, including within that volume the saddle, seat post, and other parts necessary for a rider to ride the folding bicycle when unfolded. Pedals on folding bicycles are typically folding pedals or detachable pedals that when folded or detached reduce the folded package volume. The folded package volume of a folded bicycle of the invention varies depending on the Z dimension distance between the front and rear wheels, which Z dimension distance can be maintained by a folded fixing means. One or both crank arms may also fold to reduce the folded package volume.

"FO" or "fork offset" is the distance in a side view of a folding bicycle of the invention from the front dropout to the lower projection on the baseline of the center line of the long axis of the steerer tube.

"Forward" means toward the front of an unfolded bicycle of the invention.

"Front joint" means the joint of a mainbeam closest to the handlepost in an unfolded bicycle of the invention.

"FMS" or "front mainbeam segment" means the segment of the mainbeam between the front mainbeam joint and the head tube. The middle mainbeam segment extends from the center of the long axis of the hinge pin in the front mainbeam joint to the center of the long axis of the head tube. The FMS is shown in the Drawings.

"FS" or "front segment" is the measurement of the projection of the front mainbeam segment on the baseline. The FS is shown in FIG. 22A.

"Gear-inches" or "GI" is a measure of bicycle gearing, i.e., of the mechanical advantage of the chain ring over with the driven wheel, expressed in the formula GI=(DWD)/(CRT/RST), where GI means gear-inches, DWD means drive wheel diameter in inches, CRT means the number of teeth in the chain ring (to which pedals are attached or other motive force is conveyed), and RST means number of teeth in the sprocket on the driven wheel, and assuming one rotation of the sprocket affixed to the driven wheel equals one rotation of the driven wheel ("direct drive"). Values for "gear inches" typically range from 20 GI (very low gearing) to 125 GI (very high gearing).

"Handlebar assembly" means the elements required for a user to steer and brake an unfolded folding bicycle and comprises the handlepost, handlepost joint, handlebar, grips, levers, lever cabling.

"Handlepost" means a structural member of a folding bicycle that connects the handlebar of a folding bicycle to the handlepost hinge. The handlepost joint that contains the handlepost hinge joins the steerer tube in close proximity to the top of the head tube. In a side view of an unfolded bicycle of the invention, a handlebar is connected to the top of a handlepost, and the bottom of the handlepost terminates in a handlepost joint.

"Handlepost joint" means the joint that connects the bottom of a handlepost to the top of the steerer tube of a folding bicycle.

"Higher" means in the direction away from the baseline in a side view of an unfolded bicycle of the invention.

"Hinge" means a pin and knuckled leaves structure that joins two beams (attached to the knuckles of a mainbeam hinge, which beam segments are therefore the leaves of the hinge) or other structural members of a bicycle frame (such as a handlepost and steerer tube). The leaves rotate around the hinge pin.

"Hinge angle" means, unless otherwise specified, the angle between the baseline and the long axis of the pin of a rear hinge or a front hinge, with the angle measured clockwise from the baseline in a side view of an unfolded bicycle of the invention.

"Horizontal" is a road surface with zero-degree incline, unless otherwise specified.

"HTA" or "head tube angle" is the measurement in side view, in degrees clockwise from the baseline, of the center line of the head tube of a folding bicycle of the invention.

"HTH" or "head tube height" means the longitudinal axial distance from the bottom of the head tube to the top of the head tube.

"Joint" means a hinge, at least two mating surfaces on the leaves of the hinge that pivot on hinge pin, and (unless otherwise noted), an unfolded fixing means. Joints are typically used to join segments of a mainbeam and to join a handlepost to a steerer tube.

"Lateral" means in the Z direction.

"Locked" means that the mating surfaces in a joint, or analogous hinged structural elements, are compressed against each other, held in such configuration by an unfolded fixing means, and remain so until the fixing means is released. "Locked" is to an unfolded bicycle of the invention as "secured" is to a folded bicycle of the invention.

"Longitudinal" means in the X direction.

"Lower" means in the direction toward the baseline in a side view of an unfolded bicycle of the invention.

"Mainbeam" means the structural member or segments of a folding bicycle that connect the rear dropouts to the head tube. Most folding bicycle designs have one joint in the mainbeam (i.e., a bifold design). The forward end of a mainbeam contains a head tube (i.e., the cylinder into which a steerer tube is inserted; a steerer tube, fork crown, fork leg(s), and front dropouts comprise a fork).

"Mating element" means eyelets, hooks, pins, loops, male/female parts, magnets, or other structural elements that are in close proximity when a folded bicycle is folded or unfolded, and can be secured to a corresponding mating element with a folded fixing means or unfolded fixing means, respectively.

"Mating surfaces" means flanges, male/female parts, or other structural elements that distribute stress across a joint, thereby reducing stress on a hinge pin contained in the joint; when locked in an unfolded configuration, the mating surfaces cause the bicycle frame to be rigid and rideable. Each structural member affixed to a hinge terminates in a mating surface (aka hinge leaf) that is integral with knuckle of the hinge.

"Minimum folded area" means the minimum folded package area, or "box area", of a Trifold Design bicycle, and is computed using a "Minimum folded area equation".

"Minimum folded area equation" means one of Equations A or B in FIG. 47.

"Minimum folded volume" means the minimum folded package volume of a Trifold Design bicycle. The minimum folded volume is computed by multiplying the box area times (FAW+RAW).

"MMS" or "middle mainbeam segment" means the segment of the mainbeam between the rear mainbeam joint and the front mainbeam joint. The middle mainbeam segment extends from the center of the long axis of the hinge pin in the rear mainbeam joint to the center of the long axis of the hinge pin in the front mainbeam joint. The MMS is shown in the Drawings.

"MS" or "middle segment" is the measurement of the projection of the middle mainbeam segment on the baseline. The MS is shown in FIG. 22A.

"Oversized suitcase" means a suitcase with a volume that exceeds airline legal volume.

"Pin" means the pin of a hinge unless otherwise specified.

"Primary datum", or simply "the datum", is the center of the rear dropout of a Trifold design bicycle frame, in side view.

"RAW" or "rear axle width" means the width of the rear axle. RAW is used in computation of folded package volume.

"RC distance", or "rear center distance", means the distance between the center of the long axis of the crank spindle (aka crankset axle) and the center of the axle of the rear wheel. If the RC distance varies between the folded and unfolded configurations of a folding bicycle with a chain or belt drive system, slack in the chain or belt must be taken up with a tensioner to prevent the chain or belt from disengaging from the chain ring and sprocket.

"Rear mainbeam joint" means the joint of a mainbeam closest to the seat tube in an unfolded bicycle of the invention. The rear mainbeam joint is also called the "rear hinge".

"Rearward" means toward the rear of an unfolded bicycle of the invention.

"RHA" or "RH" or "rear hinge angle" is the measurement in side view of a folding bicycle of the invention, in degrees clockwise from the baseline, of the long axis of the hinge pin in the rear mainbeam joint. The rear mainbeam joint is also called the "rear hinge". "RH" is sometimes used in subscript form to refer to the rear hinge.

"RHAD" or "rear hinge axis distance" is the measurement in top view of a folding bicycle of the invention of the distance from the vertical center plane to the center of the diameter of the hinge pin in the rear mainbeam joint.

"RHD" or "rear hinge distance" is the measurement on the baseline in a side view of the bicycle of the invention from the center of the rear dropout to the projection on the baseline of the center of the long axis of the hinge pin in the rear mainbeam joint.

"RHH" or "rear hinge height" is the distance from the baseline to the center of the long axis of the hinge pin of the rear mainbeam joint of an unfolded bicycle of the invention.

"RHW" or "rear hub width" is the distance in a top view of bicycle of the invention between the (i) interior face of the left rear dropout (of the rear mainbeam segment) and (ii) the interior face of the right rear dropout (of the rear mainbeam segment).

"RMS" or "rear mainbeam segment" means the structure in which the rear wheel of a folding bicycle is mounted. The most common rear mainbeam designs are triangles, trusses, plates, and hollow arms. The rear mainbeam segment extends from the center of the rear dropout to the center of the long axis of the hinge pin in the rear mainbeam joint in a side view of an unfolded bicycle of the invention. The RMS is shown in the Drawings.

"RS" or "rear segment" is the measurement in millimeters of the projection of the rear mainbeam segment on the baseline. The RS is shown in FIG. 22A.

"Secured" means that the mating elements of a folded bicycle are connected and held in such configuration by a folded fixing means, and remain so until the folded fixing means is released. "Locked" is to an unfolded bicycle of the invention is as "secured" is to a folded bicycle of the invention.

"STH" or "steerer tube height" means the longitudinal axial distance from the top of the head tube to the top of the lower half of the handlepost joint when folded.

"Track" means the path described by a rolling wheel of a bicycle on a surface.

"Trifold Design" means a folding bicycle design that comprises two mainbeam joints with opposing FDs, and a handlepost joint, as disclosed herein.

"Tuck-under design" means a folding bicycle frame design in which a hinge or pivot located near the bottom bracket permits the rear beam (and attached rear wheel) to rotate under the bottom bracket so that the rear wheel is forward of the bottom bracket when the folding bicycle is folded. A tuck-under fold reduces the X dimension of the folded package, but in most tuck-under designs, the rear beam is hinged immediately aft of the bottom bracket and the RC distance decreases when the bicycle is folded. A decrease in RC distance means that a chain tensioner (or belt tensioner) must be used to keep the chain (or belt) on a chain ring and sprocket when the bicycle is in the folded configuration. In some other designs of a tuck-under fold, the rear beam is hinged on the mainbeam above the bottom bracket and the RC distance does not change between folded and unfolded configurations. In tuck-under designs, the wheels cannot roll when the bicycle is folded and the folded bicycle must be carried (or small trolley wheels fitted to a rear rack and the folded bicycle rolled on the trolley wheels).

"Unfolded" means the configuration of a joint in which the joint is locked. "Unfolded" also means the configuration of a folding bicycle in which all joints are locked. A folding bicycle is ridable when unfolded.

"Unfolded bicycle" means a folding bicycle in an unfolded configuration.

"Unfolded fixing means" means a releasable lock or other device that maintains a joint in a fixed or locked position to prevent rotation of structural elements about the hinge. Locking all unfolded fixing means makes a folding bicycle rigid and safe to ride, and also configures the folding bicycle to have a maximum X dimension. The unfolded fixing means shown in all embodiments in the Figures is a camlock joint clamp (aka locking hinge) well known in the folding bicycle industry. (See, e.g., http://www.ternbicycles.com/support/techtips/meet-your-folding-joints-0, http://www.ternbicycles.com/us/tech/472/fbl-2-frame-joint, U.S. Pat. No. 6,135,668 to Lin, U.S. Pat. No. 5,440,948 to Ching, U.S. Pat. No. 5,906,452 to Lee). Unfolded fixing means are distinguished from folded fixing means.

"Upright" means that the seat tube of an unattended folded bicycle resting on a horizontal surface is vertical or near vertical.

"User" or "rider" means the person who operates a folding bicycle, e.g., by riding it, folding it, unfolding it, loading it with cargo, or unloading cargo from it.

"Vertical center plane" is the Y direction plane along the baseline.

"WB" or "wheelbase" is the distance in a side view of an unfolded bicycle of the invention from the center of the rear dropout to the center of the front dropout. The wheelbase measurement is coincident with the baseline between the rear and front dropouts.

"WEX" means the measurement in millimeters of the diameter of a wheel on which an inflated tire is mounted, measured in a straight line from most centrifugal tire tread on one side to most centrifugal tire tread on the opposite side.

"WS" or "wheel size" means "wheel size", in inches, of the wheels on a folding bicycle. Wheel sizes in inches are those commonly and nominally used in the bicycle industry, such as 8", 10", 12", 16", 20", 24", 26", and 28", even though tire diameters may vary and wheel rim sizes are commonly specified using metric measurements, such as a 349 mm rim for a 16" wheel, a 406 mm rim for a 20" wheel, a 507 mm rim for a 24" wheel, a 559 mm rim for a 26" wheel, etc.

"X direction" is along the longitudinal (rearmost to forwardmost) axis of a bicycle of the invention in a side, top, or bottom view of the bicycle.

"X dimension" is a measurement in the X direction.

"Wheel diameter" means, in deference to common usage, the nominal rim diameter, e.g., 16", 20", 24", 26", 27.25" (aka 700 c), and 28".

"Yaw" means a deviation to the left or right when a folded bicycle is rolled forward.

"Y direction" is along vertical axis of a bicycle of the invention, i.e., height of a bicycle of the invention in a side view of the bicycle.

"Y dimension" is a measurement in the Y direction.

"Z direction" along the lateral axis of a bicycle of the invention, i.e., the width in a top or bottom view of the bicycle.

"Z dimension" is a measurement in the Z direction.

Other terms, such as cluster, chain ring, crankset, crank arm, continuously variable transmission ("CVT"), pedal, pedal axle, rim, spoke, hub, wheel, wheel axle, quick-release, bottom bracket, fork, seat tube, down tube, chain stay, derailleur, sprocket, cluster, (rear derailleur) cage, internal gear hub, single speed, handlebar, saddle, seat post, seat tube angle (measured clockwise from the baseline is a side view), front rack, rear rack, pannier, rear trunk, etc., have meaning as commonly understood in bicycle, or in bicycle accessory, design and manufacturing.

Description of Related Art

All folding bicycle designs are solutions of several, conflicting design goals: quick fold vs. compact fold; rigidity of unfolded frame vs. number and location of joints; whether both wheels of the folded bicycle are parallel and free-rolling or not; whether the folded package shape is generally square or at least rectilinear, or is an odd shape; whether the folded bicycle will stand upright when folded or topple over; whether the folded bicycle when loaded with cargo will stand upright when folded or topple over; stability of longer wheelbase and larger diameter wheels vs. increase in volume when a longer wheelbase and/or larger wheel diameter bicycle is folded; the volume of the folded package; whether cargo loaded on the folding bicycle must be removed to fold the bicycle; whether a folded bicycle loaded with cargo can roll freely on both wheels; whether the folded package has a volume less than or equal to airline legal volume; whether the folded package has a shape that enables the folded package to fit inside an airline legal suitcase.

Fast folding and unfolding, simplicity of the folding/unfolding operation, and fast packing and unpacking of a folding bicycle in a suitcase of airline legal volume are of paramount importance to buyers of folding bicycles. Commuters who take their folded bicycles aboard mass transit systems, especially mass transit systems that prohibit non-folding bicycles and large luggage during certain hours and/or at certain stations, are a major market segment for sales of folding bicycles. A second major segment for sales of folding bicycles are apartment owners, private airplane owners, and boat owners. A third major market segment for sales of folding bicycles are cyclotourists (persons who travel long distances on bicycles and rely upon airlines and mass transit as needed).

Certain design concepts apply to all folding bicycles: (1) the smaller the driven wheel, the larger the chain ring must be to provide acceptable gearing (or more specifically, to provide a target "gear-inch" value or range of values); (2) the larger the driven wheel, the larger the folded package; (3) the smaller the driven wheel, the smaller the folded package; (4) the larger the chain ring, the larger the folded package; (5) the smaller the chain ring, the smaller the folded package; and (6) a folding bicycle with a folding or detachable handlepost has a smaller folded package than a folding bicycle in which the handlepost cannot be folded or detached.

If the RC distance changes when a folding bicycle is folded, a chain tensioner is required. In rear derailleur-equipped bifold designs, an additional chain tensioner is required if the cage of the rear derailleur cannot accommodate all the chain slack created by folding the bicycle. Rear derailleur-equipped bifold designs are the most popular folding bicycle drive system because rear derailleurs weigh, and cost, much less than internal gear hubs or internally geared cranksets. The most common folding bicycle design is a bifold (one mainbeam joint and one handlepost joint) design configured with (i) a rear-derailleur, small-range cluster, and short cage (to maximize the distance between the cage bottom and the road surface; a large-range cluster requires a long cage) and (ii) a rearmost section of the rear beam that does not fold (to avoid the problems of a changing RC distance). Such a bifold design has lower manufacturing costs and requires less maintenance than other designs. However, when such a bifold design bicycle is folded, the handlepost joint sits substantially higher (greater Y dimension) than the top of the driven wheel, and/or with 16" and larger diameter wheels, the folded package cannot fit in an airline legal suitcase. The center of gravity and the folded package shape of the bifold design also prevent a folded bifold bicycle from standing upright when folded (the folded bicycle will topple unless equipped with a stand), or from rolling on both wheels when folded.

Many folding bicycle designs emphasize speed of folding over volume of the folded bicycle. See, e.g., U.S. Pat. No. 6,196,566 to Zhang, and U.S. Pat. No. 6,286,848 to Augustin, both of which designs which use six hinges to enable rapid folding, but such designs result in unacceptably large "folded" volume, far larger than an airline legal suitcase, and less rigidity when unfolded.

"Separable" (aka "break-away") bicycle designs require disassembly of the bicycle into subsystems (e.g., detached rear triangle, detached handlepost, detached mainbeam) to pack in minimal volume for transport or storage, and reassembly before a separable bicycle can be ridden. Most separable bicycles require the skills of a bike technician to safely reassemble the bicycle for riding. Separable bicycle frames are optimized for storage, but sacrifice convenience, time, simplicity, and increase risk. Therefore, separable (aka break-away) bicycle designs are a different art from folding bicycle designs.

A popular design, especially for folding bicycles with 16" diameter wheels, is the "tuck-under design". The Brompton® folding bicycle (www.brompton.com) is the most popular tuck-under design. The tuck-under design used in the Brompton® (and nearly all other tuck-under designs) has different RC distances when folded vs. unfolded, and therefore requires a chain tensioner, even on single speed (one chain ring, one sprocket, no internal gearing) models, to prevent disengagement of the chain from a chain ring and/or rear sprocket when the folding bicycle is folded. When folded, the Brompton® tuck-under design cannot roll on its wheels (the wheels point in different directions), but with 16" diameter wheels, the Brompton® folding bicycle can fit in an airline legal volume.

Three variants of the tuck-under design, the Swift (www.swiftfolders.com), the Vello (www.vello.bike), and the Mezzo (www.mezzobikes.co.uk) have a tuck-under rear beam. The Vello can roll on its rear wheel if the front of the bike is kept off the ground, or on the front wheel if actively steered and if the rear wheel is kept off the ground (the wheels point in different directions when the Vello is folded). The Swift folding bicycle uses a variation of the tuck-under design that does not alter the RC distance, but like the Mezzo, when folded, the wheels point in different directions: like the Vello, if the operator holds one wheel off the ground, the other wheel of a Swift or Mezzo may roll. None of the preceding variants of the tuck-under design fit in an airline legal suitcase. Another variant of the tuck-under design is the Birdy (www.birdybike.com), in which both the front and the rear wheels (18" diameter) fold under the mainbeam. Neither wheel can roll freely when a Birdy bicycle is folded, but a folded Birdy fits in an airline legal suitcase.

The Brompton® tuck-under design uses a rear beam hinge aft of the bottom bracket and a handlepost joint, a mainbeam joint, an upwardly arched mainbeam, a deep "U" handlebar, and a hinged, unlocked rear beam. Many later inventors have attempted to improve upon the Brompton® design, many of which later designs focused on a means of locking the upper struts of the rear beam in an unfolded position or on a slight variation in the rear beam hinge angle. See, e.g., U.S. Pat. No. 8,430,414 to Yap; U.S. Pat. No. 8,123,243 to Ho; USPUB 20070210556 by Hon. None of the "improved" designs based on the Brompton® tuck-under design scale up to 20" diameter wheels and fit in an airline legal suitcase without disassembly, or enable both wheels to roll freely when the bicycle is folded.

A folded bicycle design in which both wheels roll freely when the bicycle is folded means the operator does not have to carry the bicycle in circumstances that prevent keeping the bike unfolded, e.g., in barrier areas. The ability to roll a folded bicycle is even more important if the bicycle is loaded with cargo, and the cargo does not have to be removed from the bicycle to fold the bicycle. One example of this situation is taking a bicycle on a bus. Only a folded bicycle is allowed inside a city bus in cities that permit bicycles inside buses. If cargo must be removed from a folding bicycle before the bicycle is folded, each iteration of boarding and exiting a bus requires extra work of unloading and loading cargo on the bicycle. Being able to roll a loaded folding bicycle off a bus, into a subway or train station, and across a platform to board a subway or train has tremendous consumer demand for which there has been no prior solution or product. If a folding bicycle is loaded with cargo (e.g., for touring, typically with panniers on front and rear racks), folding the loaded bicycle to traverse such areas is like portaging with a canoe and cargo: the cargo must be separated from the bike and carried, or both the bicycle and cargo must be carried.

Some folding bicycle designs, such as the Decathlon Tilt (www.decathlon.uk) and the IF Move (www.pacific-cycles.com), when folded, place the front and rear wheel axles on roughly the same Z axis, but with the front wheel at a dihedral in the X and Y dimensions compared to the rear wheel: the both wheels may be free to roll when the bicycle is folded, but the front wheel causes the bicycle to yaw if both wheels bear a load. Other folding bicycle design, such as the IF Mode (www.pacific-cycles.com) and the Strida (www.strida.com/en/main/), place the wheels almost parallel and the axles on the same Z-axis when the bicycle is folded, but neither the IF Mode nor the Strida can fit in an airline legal suitcase, cannot fold with cargo attached, and cannot carry cargo when folded. The Strida may be fitted with a small "seat post" rack, but any pannier fitted to the rack would hang upside down if the Strida were folded and wheeled about. When an IF Mode or Strida is folded, to move the bicycle the operator must lift approximately half the weight of the bicycle and any cargo attached to the bicycle (In other words, a folded IF Mode or Strida is a second class lever, with the wheels as the fulcrum.).

None of the folding bicycle designs prior to the instant invention can roll when folded and also fit into an airline legal suitcase. None of the folding bicycle designs prior to the instant invention can fold with cargo attached, or carry cargo when folded and rolled.

One technical problem to be solved is a folding bicycle frame design that (i) enables both wheels to roll freely when the folding bicycle is folded, and (ii) fits in an airline legal suitcase. A second technical problem to be solved is a folding bicycle design that (i) is scalable for all wheel sizes from 8" to 28" diameter or greater, and (ii) enables both wheels to roll freely when the folding bicycle is folded. A third technical problem to be solved is a folding bicycle design that can fold with cargo attached to the bicycle. A fourth technical problem to be solved is a folding bicycle design in which both wheels are essentially parallel when the bicycle is folded and the folded bicycle can transport cargo attached to the bicycle, including cargo that remained in place when the bicycle was folded. A fifth technical problem to be solved is a folding bicycle that is motorized and also solves the preceding four technical problems.

The "Tern Trifold" design solves the preceding five technical problems and provides a range of frame sizes for which there is strong market demand, especially among commuters, urban residents, and cyclotourists. The invention disclosed herein provides a substantially smaller folded size while retaining a standard riding geometry and the ability to use derailleur drivetrains. To the inventor's knowledge, the Tern Trifold design produces the smallest folding package possible for a given wheel diameter greater than 16".

SUMMARY OF THE INVENTION

A first preferred embodiment of the invention is a folding bicycle comprising a handlepost joint and two joints in the mainbeam forward of the seat tube, wherein the pins of the hinges in the two mainbeam joints (i) are located on opposite sides of the mainbeam when viewed in a top view, (ii) have hinge angles that place the top of the handlepost, when the bicycle in folded, no higher than the top of the rear wheel when viewed from the side, and (iii) when the bicycle in folded, place the front wheel parallel to rear wheel and the wheel axles inline on the same lateral (or Z) axis or on parallel lateral (Z) axes, wherein the wheels roll in parallel track. A second preferred embodiment of the invention is a folding bicycle comprising a handlepost joint and two joints in the mainbeam forward of the seat tube, wherein the pins of the hinges in the two mainbeam joints forward of the seat tube (i) are located on opposite sides of the mainbeam when viewed in a top view, (ii) have hinge angles that place the top of the handlepost, when the bicycle is folded, no more than ten percent (10%) of the rear wheel diameter higher than the top of the driven wheel when viewed from the side, and (iii) when the bicycle in folded, place the front wheel parallel to rear wheel and the wheel axles on the same Z axis, or slightly offset on parallel Z axes. The two joints in the mainbeam in all embodiments of the invention are a rear mainbeam joint and a front mainbeam joint. The handlepost folds to the outside, i.e., the front wheel is placed between the rear wheel and the handlepost in the folded package.

Both the first and second embodiments can also have folded fixing means that, when an embodiment of the folding bicycle disclosed herein is folded, maintain a user selectable separation of the front and rear wheels and maintains the parallel track of the front and rear wheels. Both the first and second embodiments can be folded without removing or disturbing cargo attached to the bicycle. Both the first and second embodiments can roll on both wheels on a parallel track while the folded bicycle is loaded with cargo. The hinge angles in handlepost joint and in the rear mainbeam joint and in the front mainbeam joint, and the other Design Variables listed in Tables 3A and 3B, are a function of wheel diameter and desired folded package volume and shape, and are selected to satisfy items (ii) and (iii) in the first and second embodiments. Alternatively, the Design Variables can be selected to provide other folded package volumes and shapes. Referring to Tables 3A and 3B, examples of most preferred embodiments are design versions v20 A, v20 A1, v20 G, v20 H, v20 M, v03A, v03C, v09a, v09b, v09c, v10a, v10b, and v10c, since the combination of design variables for those versions best satisfies items (i) to (iii) above and produces lower folded package volumes.

In the claimed invention, if the rear mainbeam joint hinge pin is on the left side of the rear hinge, then the front mainbeam joint hinge pin is on the right side of the front hinge (called hereafter the "CCWr" or "CCWrear" configuration, for "rear hinge counterclockwise rotation, forward hinge clockwise rotation"). In the claimed invention, if the rear mainbeam joint hinge pin is on the right side of the rear hinge, then the front mainbeam joint hinge pin is on the left side of the front hinge (called hereafter the "CWr" or CWrear" configuration, for "rear hinge clockwise rotation, forward hinge counterclockwise rotation").

In the folded configuration of the folding bicycle of the invention, the "mainbeam joints with opposing hinge pins" configuration (either CWr paired with a CCW FH, or CCWr paired with a CW FH) of the mainbeam joints, and remaining Design Variables compatible with the selected rear hinge angle and front hinge angle, permit the front and rear wheels of a folded bicycle of the invention to roll on a parallel track over a range of several distances of separation in the Z dimension; the "mainbeam joints with opposing hinge pins" configuration also permits the folding bicycle of the invention to be folded without removing cargo attached to front and/or rear cargo holders on the folding bicycle, and to be rolled with such cargo attached in or on the cargo holders. The folding bicycle of the invention can be rolled up and down gradients and stairs, and in other barrier areas, with or without cargo loaded on the folding bicycle. The folding bicycle of the invention can be motorized, which means that motorized, folded embodiments can climb steep gradients and stairs, and cross barrier areas, with cargo loaded on the folding bicycle. Such capabilities of folding without removal of cargo, and rolling in parallel track with separated wheels while folded, are unprecedented. A 20" wheel diameter folding bicycle that folds (i.e., without disassembly of the frame, but with deflated tires and one folding crank arm) to fit in an airline legal suitcase, such as version v20 D in Tables 3A and 3B, is also unprecedented.

BRIEF DESCRIPTION OF THE DRAWINGS

FIG. 1A shows a top view of a 20" CWr version of a trifold bicycle frame, unfolded.

FIG. 1B shows a side view of a 20" CWr version of a trifold bicycle frame, unfolded.

FIG. 1C shows a side perspective view of a 20" CWr version of a trifold bicycle frame, unfolded.

FIG. 4A shows a top view of a 20" CCWr version of a trifold bicycle frame, unfolded.

FIG. 4B shows a side view of a 20" CCWr version of a trifold bicycle frame, unfolded.

FIG. 5A shows a top perspective view of a 20" CCWr version of a trifold bicycle frame, folded to maximum Z dimension with parallel track.

FIG. 5B shows a side view of a 20" CCWr version of a trifold bicycle frame, folded to maximum Z dimension with parallel track.

FIG. 5C shows a rear perspective view of a 20" CCWr version of a trifold bicycle frame, folded to maximum Z dimension with parallel track.

FIG. 6A shows a top view of a 20" CCWr version of a trifold bicycle frame, folded to minimum Z dimension with axles on the same Z axis with parallel track.

FIG. 6B shows a side view of a 20" CCWr version of a trifold bicycle frame, folded to minimum Z dimension with axles on the same Z axis with parallel track.

FIG. 6C shows a rear view of a 20" CCWr version of a trifold bicycle frame, folded to minimum Z dimension with axles on the same Z axis with parallel track, with optionally detached left crank arm and optionally detached right pedal.

FIG. 7A shows a side view of a 16" CWr version of a trifold bicycle frame, unfolded.

FIG. 7B shows a side view of a 16" CWr version of a trifold bicycle, unfolded.

FIG. 12A shows a top view of a 24" CWr version of a trifold bicycle frame, folded to minimum Z dimension with axles on the same Z axis with parallel track.

FIG. 12B shows a side view of a 24" CWr version of a trifold bicycle frame, folded to minimum Z dimension with axles on the same Z axis with parallel track.

FIG. 12C shows a rear view of a 24" CWr version of a trifold bicycle frame, folded to minimum Z dimension with axles on the same Z axis with parallel track.

FIG. 13B shows a top view of a 28" CWr version of a trifold bicycle, unfolded.

FIG. 13C shows a side view of a 28" CWr version of a trifold bicycle, unfolded.

FIG. 13D shows a front view of a 28" CWr version of a trifold bicycle frame, unfolded.

FIG. 14A shows a top view of a 28" CWr version of a trifold bicycle, folded to maximum Z dimension with parallel track.

FIG. 14B shows a side view of a 28" CWr version of a trifold bicycle frame, folded to maximum Z dimension with parallel track.

FIG. 14C shows a rear view of a 28" CWr version of a trifold bicycle, folded to maximum Z dimension with parallel track.

FIG. 17A shows a side view of a 28" CCWr version of a trifold bicycle, with step-through frame, unfolded.

FIG. 17B shows a side view of a 28" CCWr version of a trifold bicycle, with step-through frame, folded to minimum Z dimension with parallel track.

FIG. 17C shows a side view of a 28" CCWr version of a trifold bicycle frame, with step-through frame, folded to minimum Z dimension with parallel track.

FIG. 17D shows a side view of a 28" CCWr version of a trifold bicycle frame, with step-through frame, unfolded.

FIG. 19A shows a side view of a 20" CWr version of a trifold bicycle, folded with front axle disposed forward of the rear axle to decrease the Z dimension of the folded package.

FIG. 19B shows a top view of a 20" CWr version of a trifold bicycle, folded with front axle disposed forward of the rear axle to decrease the Z dimension of the folded package.

FIG. 19C shows a rear view of a 20" CWr version of a trifold bicycle, folded with front axle disposed forward of the rear axle to decrease the Z dimension of the folded package.

FIG. 20A shows a side view of a 20" CWr version of a trifold bicycle, folded with rear axle disposed forward of the front axle to decrease the Z dimension of the folded package.

FIG. 20B shows a top view of a 20" CWr version of a trifold bicycle, folded with rear axle disposed forward of the front axle to decrease the Z dimension of the folded package.

FIG. 20C shows a rear view of a 20" CWr version of a trifold bicycle, folded with rear axle disposed forward of the front axle to decrease the Z dimension of the folded package.

FIG. 21A shows a side view of a 20" CWr version of a trifold bicycle, folded to maximum Z dimension with parallel track.

FIG. 21B shows a top view of a 20" CWr version of a trifold bicycle, folded to maximum Z dimension with parallel track.

FIG. 21C shows a rear view of a 20" CWr version of a trifold bicycle, folded to maximum Z dimension with parallel track.

FIG. 21D shows a side view of a 20" CWr version of a trifold bicycle frame, folded to maximum Z dimension with parallel track.

FIG. 21E shows a top view of a 20" CWr version of a trifold bicycle frame, folded to maximum Z dimension with parallel track.

FIG. 21F shows a rear view of a 20" CWr version of a trifold bicycle frame, folded to maximum Z dimension with parallel track.

FIG. 22A shows a side view diagram of how Design Variables are measured.

FIG. 22B shows a top view diagram of how Design Variables are measured.

FIG. 22C shows Table 1 reciting the Design Variables of the trifold bicycle shown in FIG. 22A.

FIG. 22D shows Table 2 reciting acronyms and corresponding abbreviated definitions of the Design Variables.

FIG. 22E shows Table 3A reciting the Design Variables for various configurations of trifold bicycles of the invention.

FIG. 22F shows Table 3B reciting the Design Variables for various configurations of trifold bicycles of the invention.

FIGS. 23A to 23E show the steps used to fold a trifold bicycle.

FIG. 25A shows a perspective view of a fully folded Trifold Design version v09a with dashed lines delimiting minimum folded volume. The pedal protruding outside the dashed line is detachable. The outlined fenders are optional.

FIG. 25B shows a bottom view of a fully folded Trifold Design version v09a with dashed lines delimiting minimum folded volume. The pedal protruding outside the dashed line is detachable. The outlined fenders are optional.

FIG. 25C shows a side view of a fully folded Trifold Design version v09a with dashed lines delimiting minimum folded volume. The pedal protruding outside the dashed line is detachable. The outlined fenders are optional.

FIG. 25D shows a rear view of a fully folded Trifold Design version v09a with dashed lines delimiting minimum folded volume. The pedal protruding outside the dashed line is detachable. The outlined fenders are optional.

FIG. 25E shows a side view of an unfolded Trifold Design version v09a, with measurements of Design Variables as recited in the data banner on that Drawing Sheet.

FIG. 25F shows a table reciting the Design Variables of the unfolded Trifold Design version v09a shown in FIG. 25E.

FIG. 26 shows a side view of an unfolded Trifold Design version v09a, with the primary datum centered on the rear dropout.

FIG. 27 shows a side view of an unfolded Trifold Design version v09a, with a computation using Equation 1 of fork measurements and angles.

FIG. 27A shows Equation 1 with computation of fork measurements and angles of the unfolded Trifold Design version v09a shown in FIG. 27.

FIG. 28 shows a side view of an unfolded Trifold Design version v09a, with a computation using Equation 2 of FMS and FS measurements and angles.

FIG. 28A shows Equation 2 with computation of FMS and FS measurements and angles of the unfolded Trifold Design version v09a shown in FIG. 28.

FIG. 29 shows a side view of an unfolded Trifold Design version v09a, with measurements and angles of the projections of the front and rear hinges on the baseline.

FIG. 31 shows a side view of an unfolded Trifold Design version v09a, with measurements and angles of the projections on the baseline of the mainbeam segments and hinges, dimensions of STH and HTH, calculation of the $y_{FS}$ dimension using Eqn. 3A.

FIG. 31A shows calculation of the $y_{FS}$ dimension using Equation 3A of measurements and angles of the projections on the baseline of the mainbeam segments and hinges, dimensions of STH and HTH of the unfolded Trifold Design version v09a shown in FIG. 31.

FIG. 32 shows a side view of an unfolded Trifold Design version v09a, with computation using Equation 4 of measurements and angles of the projections on the baseline of the front and rear hinges.

FIG. 32A shows Equation 4 with computation of measurements and angles of the projections on the baseline of the front and rear hinges of the unfolded Trifold Design version v09a shown in FIG. 32.

FIG. 33 shows a side view of an unfolded Trifold Design version v09a, with computation using Equation 5 of measurements and angles of the projections on the baseline of the fork.

FIG. 33A shows Equation 5 with computation of measurements and angles of the projections on the baseline of the fork of the unfolded Trifold Design version v09a shown in FIG. 33.

FIG. 34 shows a side view of an unfolded Trifold Design version v09a, with computation using Equation 6 of MS.

FIG. 34A shows Equation 6 with computation of the MS calculation shown in FIG. 34.

FIG. 35 shows a side view of an unfolded Trifold Design version v09a, with computation using Equation 7 of measurements and angles of the folded rear hinge after folding: step 1 in deriving the box area equations using dimensions and angles calculated in FIGS. 27 to 34.

FIG. 35A shows Equation 7 with computation of measurements and angles of the folded rear hinge after folding: step 1 in deriving the box area equations using dimensions and angles calculated in FIGS. 27 to 34 of the unfolded Trifold Design version v09a shown in FIG. 35.

FIG. 36 shows a side view of an unfolded Trifold Design version v09a, with computation using Equations 8 and 9 of measurements and angles of the folded rear hinge: step 2 in deriving the box area equations.

FIG. 36A shows Equation 8 with computation of measurements and angles of the folded rear hinge: step 2 in deriving the box area equations of the unfolded Trifold Design version v09a shown in FIG. 36.

FIG. 36B shows Equation 9 with computation of measurements and angles of the folded rear hinge: step 2 in deriving the box area equations of the unfolded Trifold Design version v09a shown in FIG. 36.

FIG. 37 shows a side view of an unfolded Trifold Design version v09a, with computation using Equations 10 to 12 of measurements and angles of the folded rear hinge: step 3 in deriving the box area equations.

FIG. 37A shows Equation 10 with computation of measurements and angles of the folded rear hinge: step 3 in deriving the box area equations of the unfolded Trifold Design version v09a shown in FIG. 37.

FIG. 37B shows Equation 11 with computation of measurements and angles of the folded rear hinge: step 3 in deriving the box area equations of the unfolded Trifold Design version v09a shown in FIG. 37.

FIG. 37C shows Equation 12 with computation of measurements and angles of the folded rear hinge: step 3 in deriving the box area equations of the unfolded Trifold Design version v09a shown in FIG. 37.

FIG. 38 shows a side view of an unfolded Trifold Design version v09a, with computation using Equation 13 of measurements and angles of the folded rear hinge: step 4 in deriving the box area equations.

FIG. 38A shows Equation 13 with computation of measurements and angles of the folded rear hinge: step 4 in deriving the box area equations of the unfolded Trifold Design version v09a shown in FIG. 38.

FIG. 39 shows a partial side view of an unfolded Trifold Design version v09a, with measurements and angles of the folded rear hinge, FMS, MMS, and fork: step 5 in deriving the box area equations.

FIG. 40 shows a partial side view of a folded middle segment and front segment of a Trifold Design version v09a, with computation using Equations 14 and 15 of measurements and angles of the folded FMS, MMS, and fork: step 6 in deriving the box area equations.

FIG. 40A shows Equation 14 with computation of measurements and angles of the folded FMS, MMS, and fork: step 6 in deriving the box area equations of the folded middle segment and front segment of the Trifold Design version v09a shown in FIG. 40.

FIG. 40B shows Equation 15 with computation of measurements and angles of the folded FMS, MMS, and fork: step 6 in deriving the box area equations of the unfolded Trifold Design version v09a shown in FIG. 40.

Figure 41:
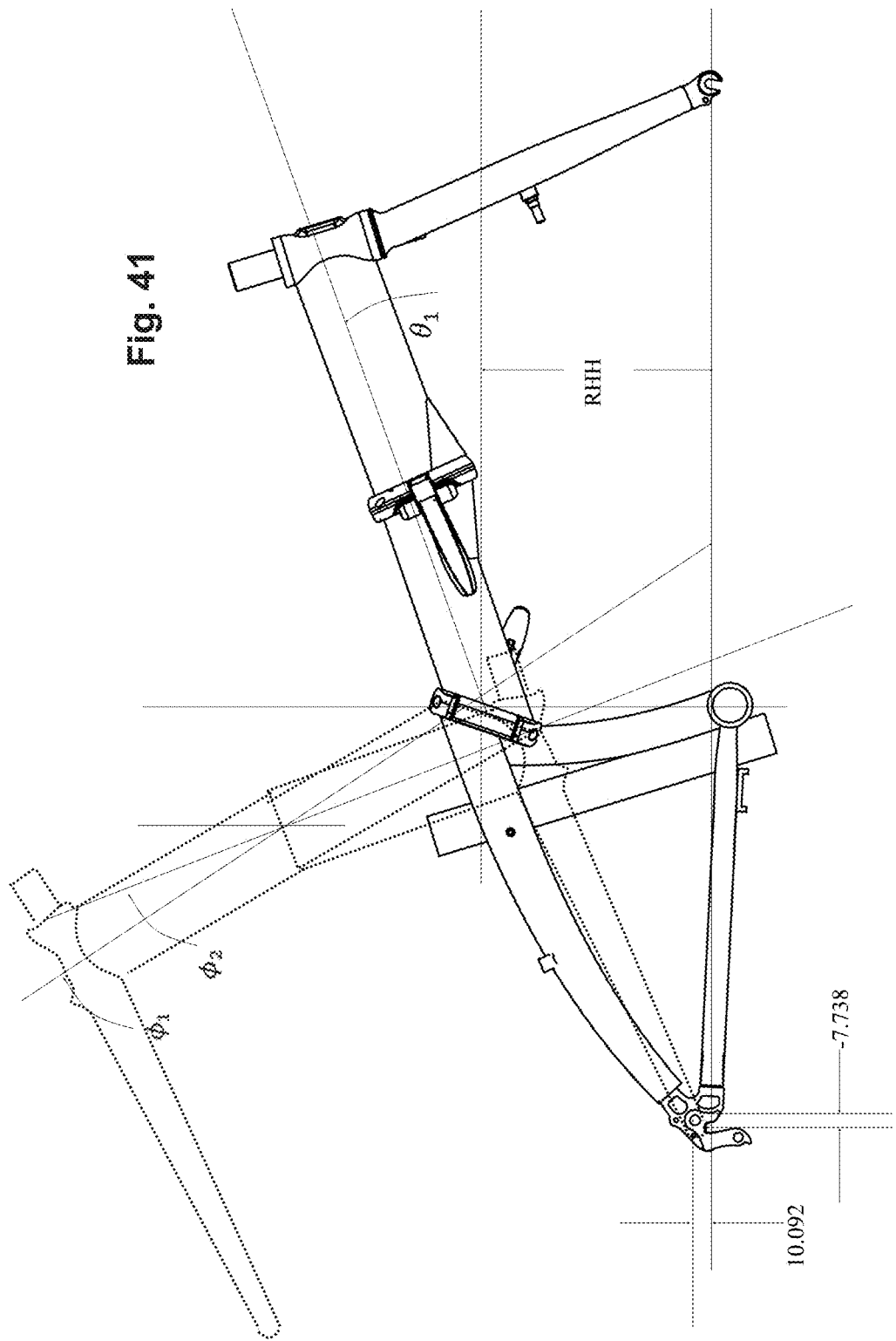

FIG. 41 shows a side view of a Trifold Design version v09a, before and after folding of the front and rear hinges, with measurements and related angles of the folded location of the front and rear dropouts: step 7 in deriving the box area equations.

FIG. 42 shows a side view of a Trifold Design version v09a, before and after folding of the front and rear hinges: step 8 in deriving the box area equations.

FIG. 43 shows a side view of a Trifold Design version v09a, before and after folding of the front and rear hinges, and with computation using Equation 16 to derive box area Equation A: step 9 in deriving the box area equations.

FIG. 43A shows Equation 16 with computation to derive box area Equation A: step 9 in deriving the box area equations of the unfolded Trifold Design version v09a shown in FIG. 43.

FIG. 44 shows the derivation using Equation 17 of box area Equation A: step 10 in deriving the box area equations.

FIG. 45 shows a side view of a Trifold Design version v09a, before and after folding of the front and rear hinges, and with geometric relationships used to derive box area Equation B: step 11 in deriving the box area equations.

FIG. 46 shows the derivation using Equation 18 of box area Equation B: step 12 in deriving the box area equations FIG. 47 presents one of two alternate equations, Equation A and Equation B, that compute minimum box area using alternate trigonometric analyses derived in the preceding Figures.

FIG. 47A presents the second of two alternate equations, Equation A and Equation B, that compute minimum box area using alternate trigonometric analyses derived in the preceding Figures.

Figure 48:
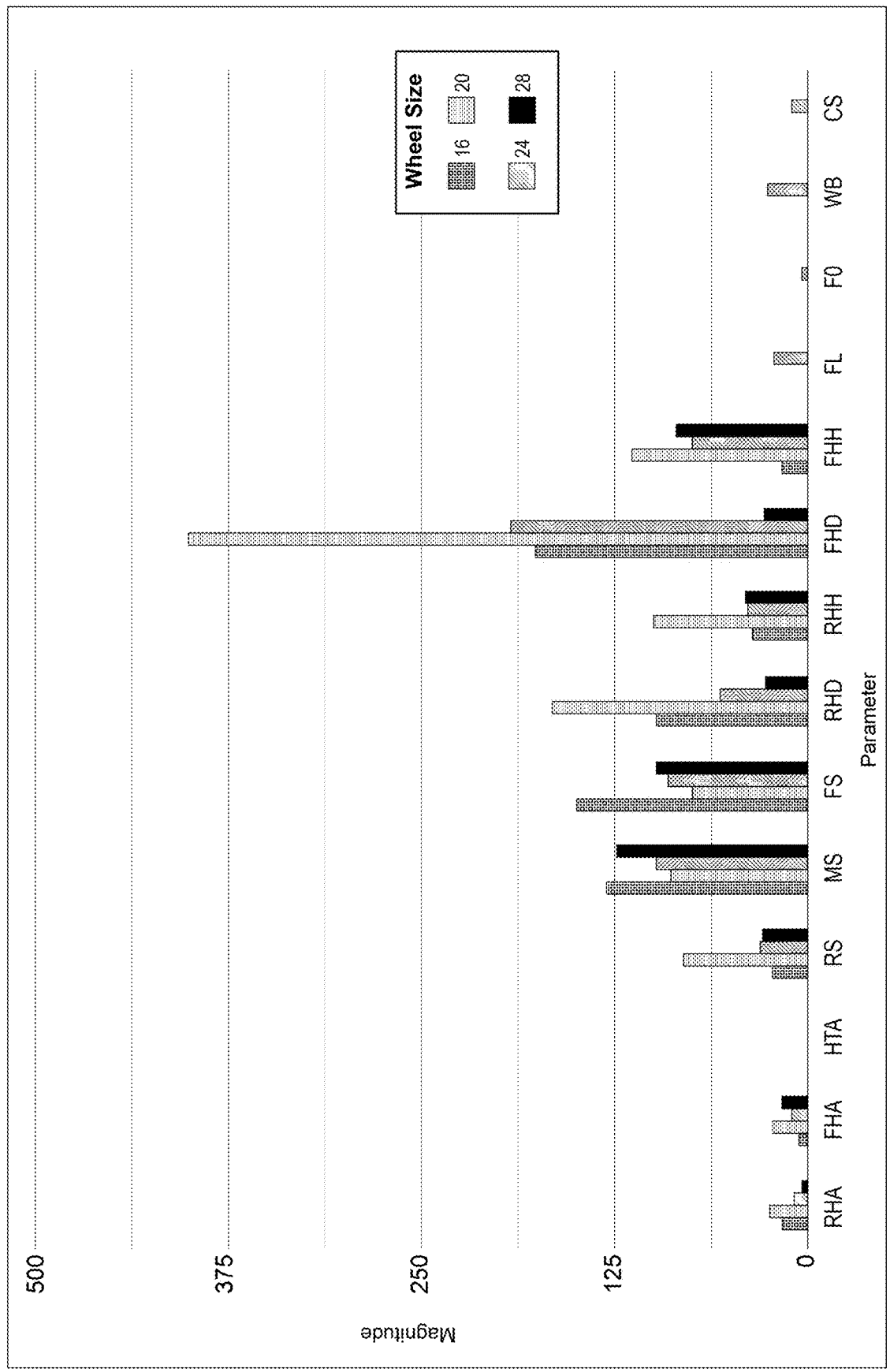

FIG. 48 a histogram of Design Variable variability as a function of wheel size.

FIG. 49 shows a stud and latched receiver embodiment of a folded fixing means (FFM, and rear dropout and front dropout positions after a Trifold design bicycle frame is folded).

FIG. 50A shows a sliding disc and latched receiver embodiment of a folded fixing means. FIGS. 50B to 50E show operation of the sliding disc and latched receiver folded fixing means.

FIG. 51A shows two magnetic folded fixing means on a single frame (FFM, rear dropout, and front dropout positions after a Trifold design bicycle frame is folded). FIG. 51B shows operation of a single magnetic folded fixing means (isolated view).

FIG. 52 shows location on a Trifold design bicycle frame of the corresponding halves of a single magnetic folded fixing means, with close-up views.

Figure 53A:
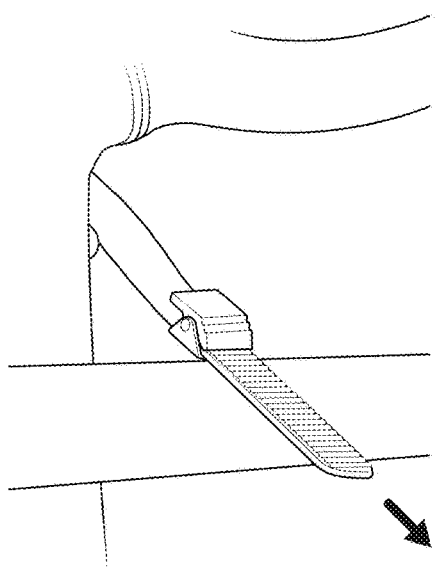
Figure 53B:
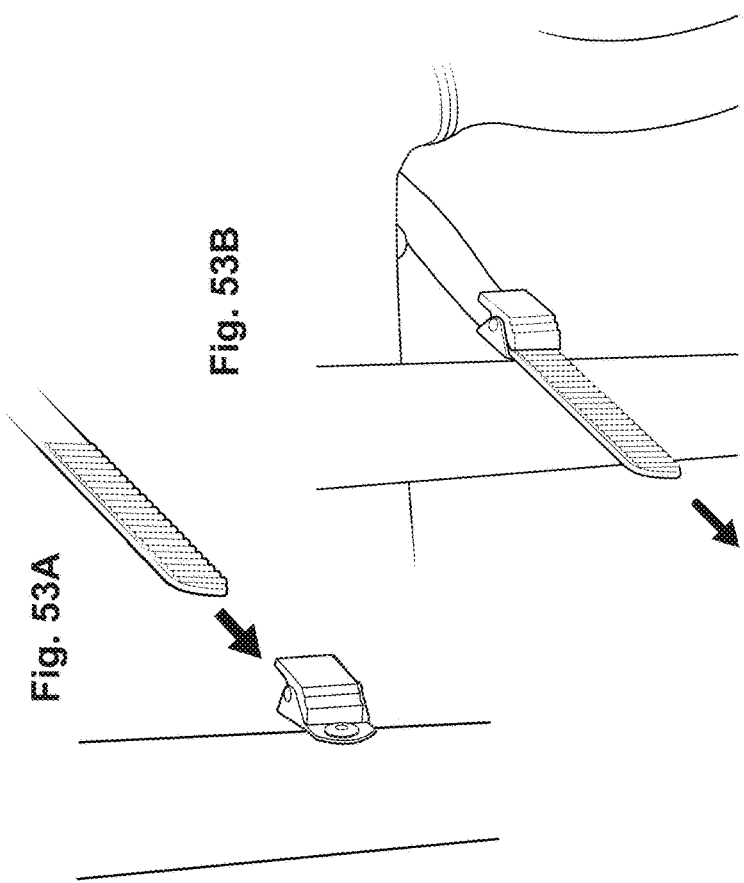

FIG. 53A shows a "snowboard strap" and latch folded fixing means before insertion of the strap into the latch. FIG. 53B shows a snowboard strap and latch folded fixing means after insertion of the strap into the latch.

Figure 54:
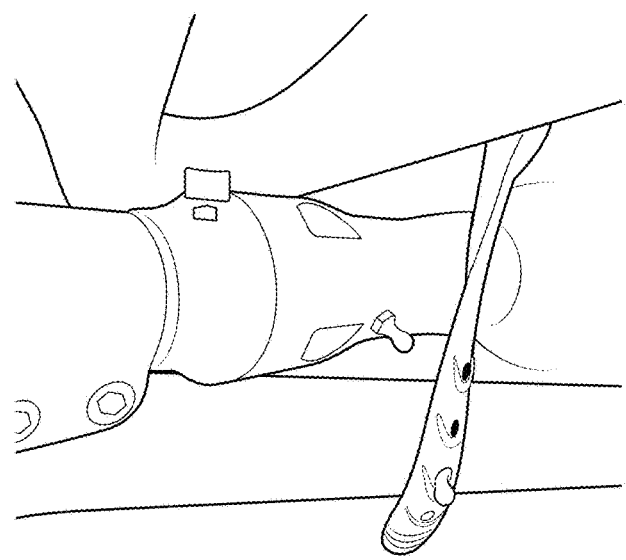

FIG. 54 shows a strap and stud folded fixing means after inserting the stud through the strap of a folded Trifold design bicycle frame. The strap is typically anchored on the mainbeam and the stud is affixed to the head tube.

FIG. 55A shows a rear view of a sliding disc and receiver embodiment of a folded fixing means affixed to the axles of a Trifold design folding bicycle. FIGS. 55B to 55C show operation of the sliding disc and receiver folded fixing means.

DETAILED DESCRIPTION OF PREFERRED EMBODIMENTS

The present invention is directed to a folding bicycle frame, and to bicycles built with that frame, wherein a rear mainbeam joint folds in the direction opposite from the direction in which a front mainbeam joint folds. This core design feature is called the Trifold Design. The third joint in the Trifold Design is the handlepost joint. In the Trifold Design, if the rear mainbeam joint folds clockwise, the front mainbeam joint folds counterclockwise; if the rear mainbeam joint folds counterclockwise, the front mainbeam joint folds clockwise. Each mainbeam joint comprises a hinge, hinge pin, and structural elements integral with the knuckles of each hinge leaf. By selection of 25 Design Variables (see Tables 1, 2, 3A, and 3B), i.e., the wheel size, wheelbase, folding direction, wheel external diameter, rear hinge angle, rear hinge distance from the rear dropout on the baseline, rear hinge height above the baseline, rear hinge axis distance from the vertical center plane, front hinge angle, front hinge distance from the rear dropout on the baseline, front hinge height above the baseline, front hinge distance from the vertical center plane, head tube angle, rear segment length, middle segment length, front segment length, fork length, fork offset, center stay length, front chain ring diameter, bottom bracket distance from the baseline, front hub width, and rear hub width, the wheels of a folded bicycle of the invention can be disposed in a parallel track, free to roll, and have a user-selected separation while maintaining parallel track. Although most of the Design Variables are well known in the art of folding bicycles, introducing mainbeam joints that fold in opposite directions into folding bicycle design is heretofore unknown and provides unexpected and very useful benefits, particularly (i) decreased folded package area (and decreased folded package volume) and more rectilinear shapes, (ii) the ability to fold a Trifold Design bicycle loaded with cargo without removal of cargo, and (iii) the ability to roll a folded Trifold Design bicycle on both wheels without yaw, whether loaded with cargo or not, as a result of the wheels' having parallel track when the bicycle is folded. Typically, a folded Trifold Design bicycle, with or without attached cargo, is rolled by pushing a saddle secured on an un-retracted seat post and steered by turning that saddle. Importantly, front and rear brakes operate normally when a Trifold Design bicycle is folded and rolled on its wheels.

The Trifold Design produces a greater variety of rectilinear folded package shapes and significantly reduced folded package volume compared with prior art folding bicycles with the same wheel size. A most preferred Trifold Design has a Y dimension no larger than the rear wheel external diameter. A preferred Trifold Design has a Y dimension slightly larger than the rear wheel external diameter, or alternatively, than the maximum Y dimension of the rear fender on a bicycle equipped with a rear fender. The Trifold Design applied to 20" wheel sizes produces the first 20" folding bicycle that folds to an airline legal volume without disassembly of the frame. The Trifold Design can be applied to any wheel size, e.g, 8" to 36", and the reduction of folded package volume increases in proportion to the wheel size. For instance, the folded package volume of a 26" wheel size Trifold Design bicycle is approximately the same as the folded package volume of a 24" wheel size bifold bicycle. These smaller volumes are of great commercial value in sales of folding bikes to urban dwellers, bicycle commuters, airline passengers who travel with bicycles, and users of mass transit. The ability of a user to select alternate folded volumes, e.g., when transporting cargo on a Trifold Design bicycle, without diminishing the ability to transit barrier areas when rolling a folded Trifold Design bicycle on both wheels, is unknown in the prior art.

The 25 Design Variables used to specify a Trifold Design are defined in the Definitions section above and shown in FIGS. 22A and 22B. For convenience in reviewing the Figures, the legends used for the Design Variables is presented in Table 2. All 25 Design Variables interact to place the rear wheel, front wheel, and handlepost joint in a desired folded configuration, such as a folded configuration in which the rear wheel and front wheel are aligned in parallel track, and while parallel track is maintained in the folded configuration, the rear wheel and front wheel can be set at a user-selected distance of separation.

Among the 25 Design Variables, the paramount Design Variables are having rear and front mainbeam joints with opposite folding directions. After selecting the folding directions of the rear and front mainbeam joint hinges, the remaining Design Variables are fine tuned to produce a target folded package area, shape, and volume. Trifold Designs with a given rear hinge angle ("RHA") and rear hinge distance ("RHD"), and a given front hinge angle ("FHA") and front hinge distance ("FHD"), can produced radically different folded packages by varying the rear hinge height ("RHH") and front hinge height ("FHH"), among other Design Variables. The use of three-dimensional modelling software, such as Solidworks®, and the equations described below, enable rapid selection of Design Variable values for a given folded package area, shape, and volume.

The chain ring is on the right side of bicycles. In some CWr configurations in which the rear mainbeam joint is close to the seat tube, the chain ring prevents folding the middle mainbeam segment to a position parallel to the baseline; such configurations are less acceptable (i.e., not as commercially viable) because of the resultant larger folded package.

Figure 2C:
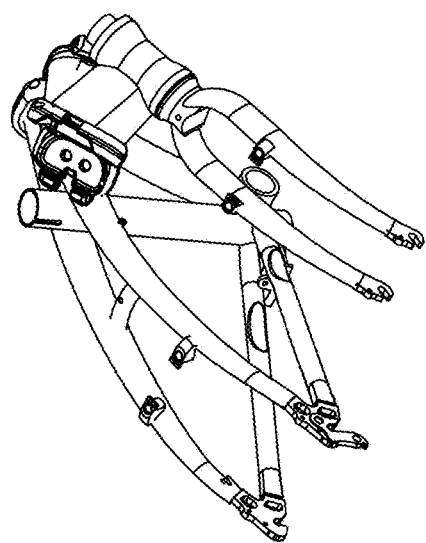
FIG. 2C shows a top perspective view of a 20" CWr version of a trifold bicycle frame, partially folded.
Figure 2D:
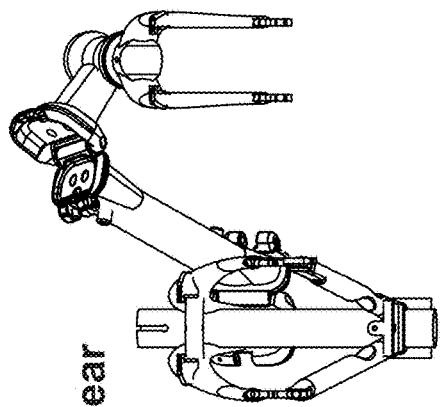
FIG. 2D shows a rear perspective view of a 20" CWr version of a trifold bicycle frame, partially folded.
Figure 2A:
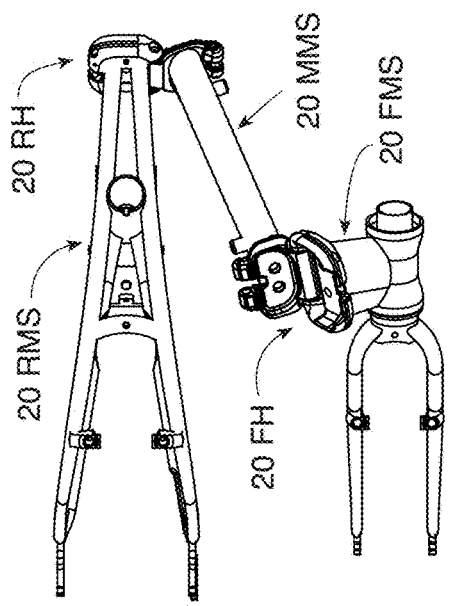
FIG. 2A shows a top perspective view of a 20" CWr version of a trifold bicycle frame, partially folded.
Figure 2B:
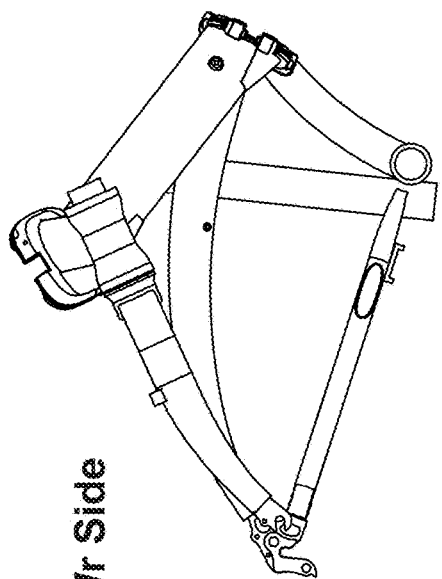
FIG. 2B shows a side view of a 20" CWr version of a trifold bicycle frame, partially folded.
Figure 3B:
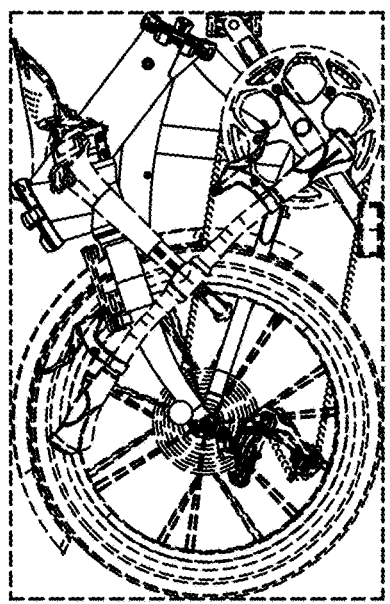
FIG. 3B shows a side view of a 20" CWr version of a trifold bicycle frame, folded to minimum Z dimension with axles on the same Z axis.
Figure 3D:
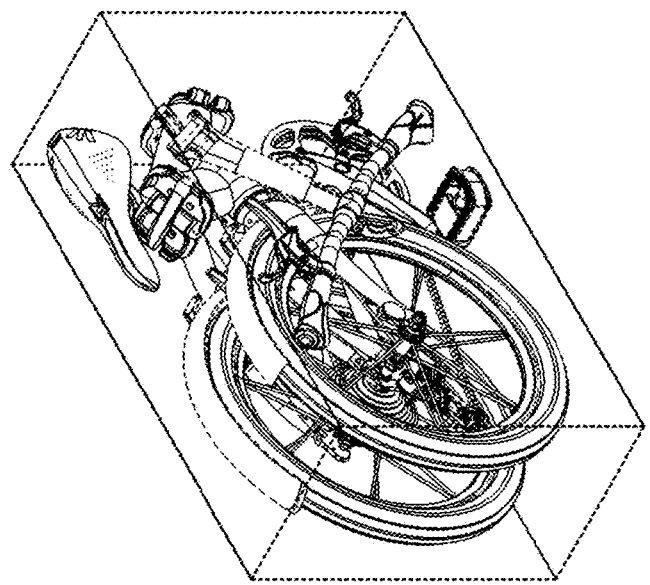
FIG. 3D shows a rear perspective view of a 20" CWr version of a trifold bicycle frame, folded to minimum Z dimension with axles on the same Z axis.
Figure 3A:
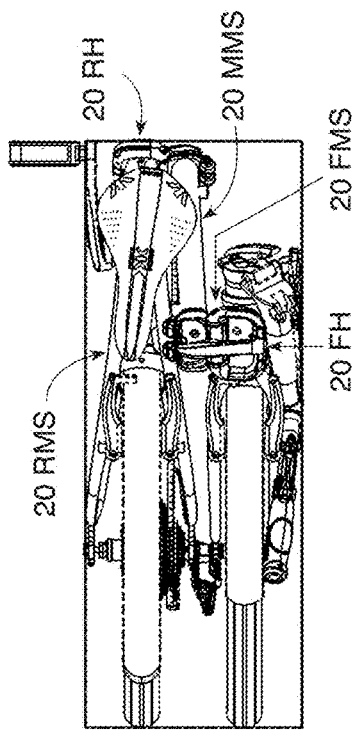
FIG. 3A shows a top view of a 20" CWr version of a trifold bicycle, folded to minimum Z dimension with axles on the same Z axis.
Figure 3C:
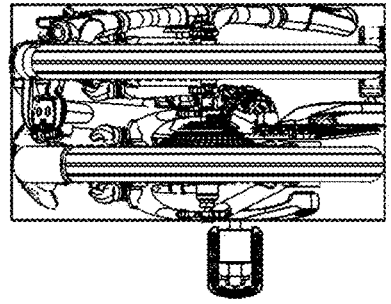
FIG. 3C shows a rear view of a 20" CWr version of a trifold bicycle frame, folded to minimum Z dimension with axles on the same Z axis.
Figure 5E:
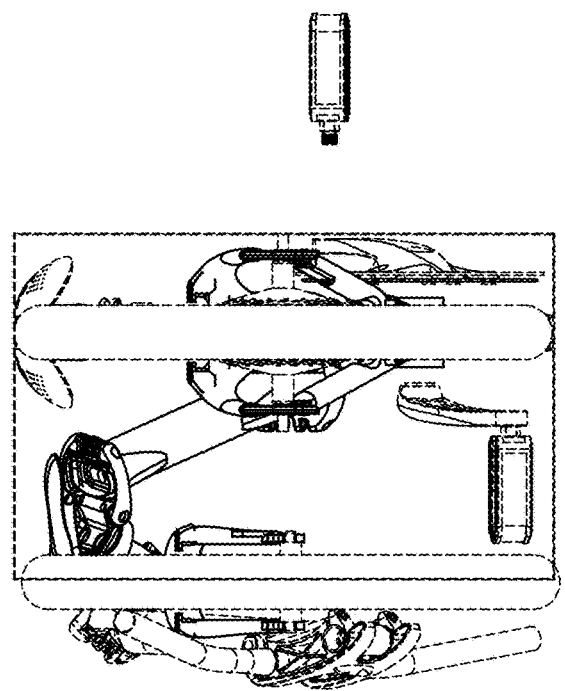
FIG. 5E shows a rear view of a 20" CCWr version of a trifold bicycle, folded to maximum Z dimension with axles on the same Z axis with parallel track, with optionally detached left crank arm and optionally detached right pedal.
Figure 5D:
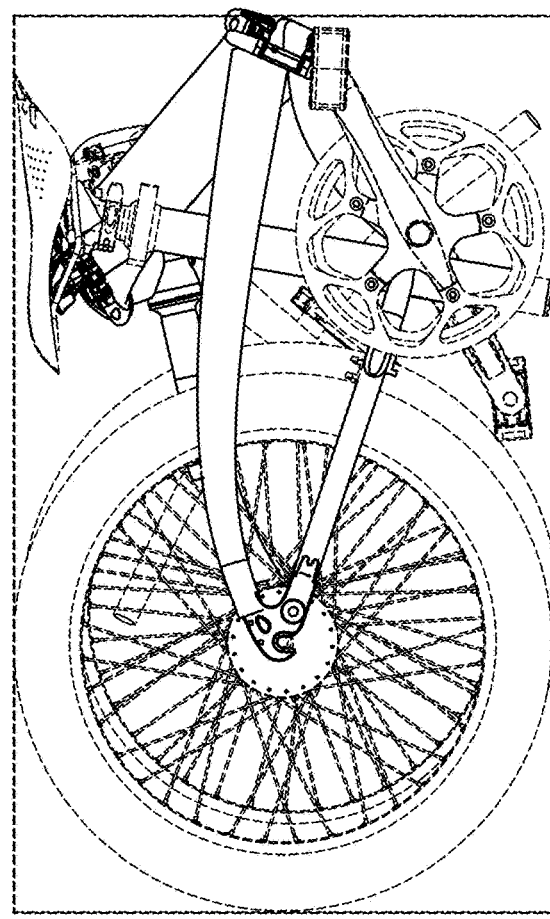
FIG. 5D shows a side view of a 20" CCWr version of a trifold bicycle, folded to maximum Z dimension with parallel track.
Figure 6E:
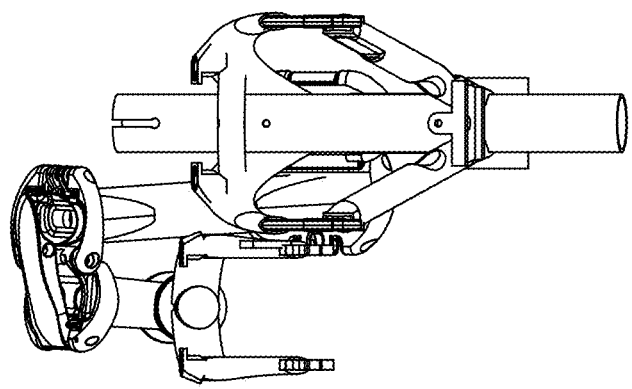
FIG. 6E shows a rear view of a 20" CCWr version of a trifold bicycle frame, folded to minimum Z dimension with axles on the same Z axis with parallel track.
Figure 6D:
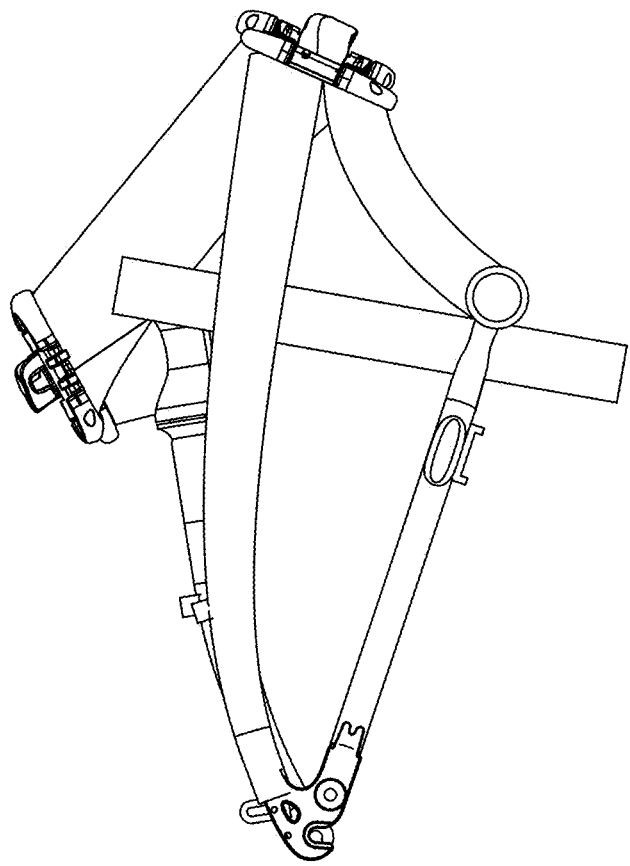
FIG. 6D shows a side view of a 20" CCWr version of a trifold bicycle frame, folded to minimum Z dimension with axles on the same Z axis with parallel track.
Figure 8A:
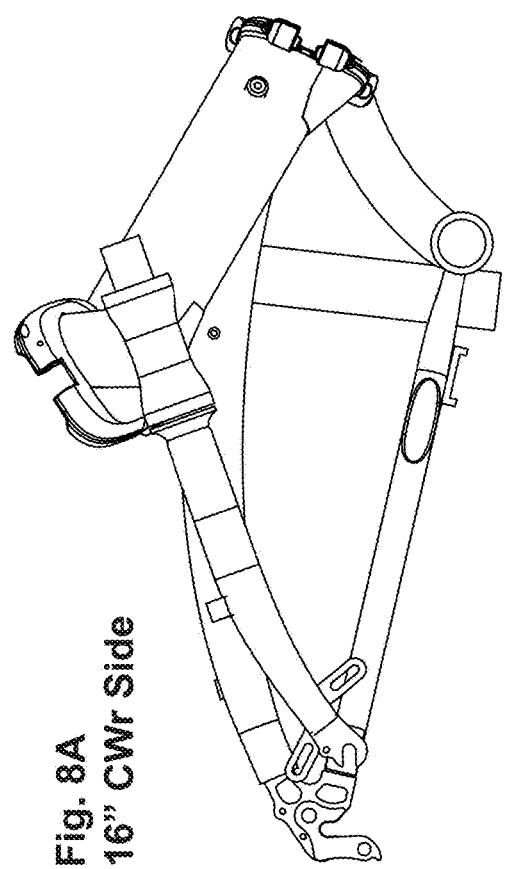
FIG. 8A shows a side view of a 16" CWr version of a trifold bicycle frame, folded to maximum Z dimension with parallel track.
Figure 8C:
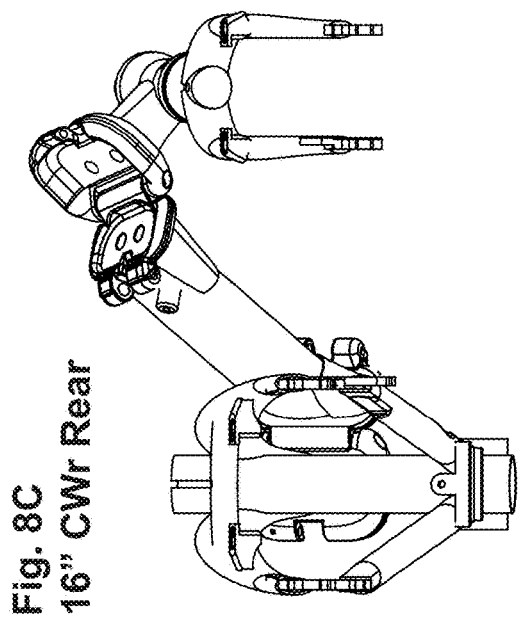
FIG. 8C shows a rear perspective view of a 16" CWr version of a trifold bicycle frame, folded to maximum Z dimension with parallel track.
Figure 8B:
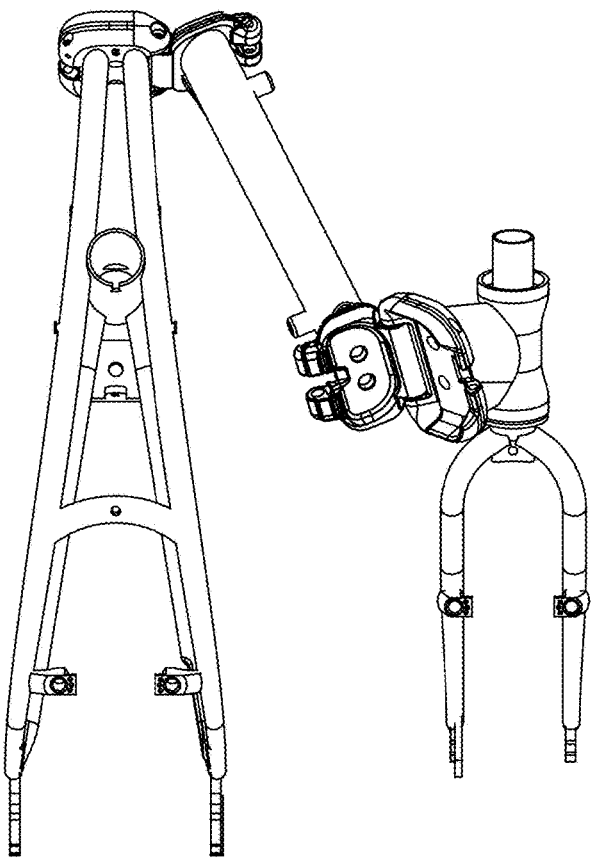
FIG. 8B shows a top view of a 16" CWr version of a trifold bicycle frame, folded to maximum Z dimension with parallel track.
Figure 8D:
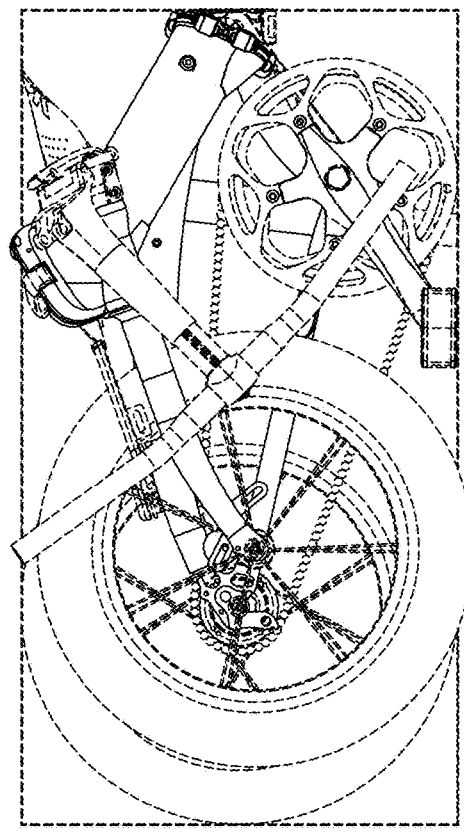
FIG. 8D shows a side view of a 16" CWr version of a trifold bicycle, folded to maximum Z dimension with parallel track.
Figure 8E:
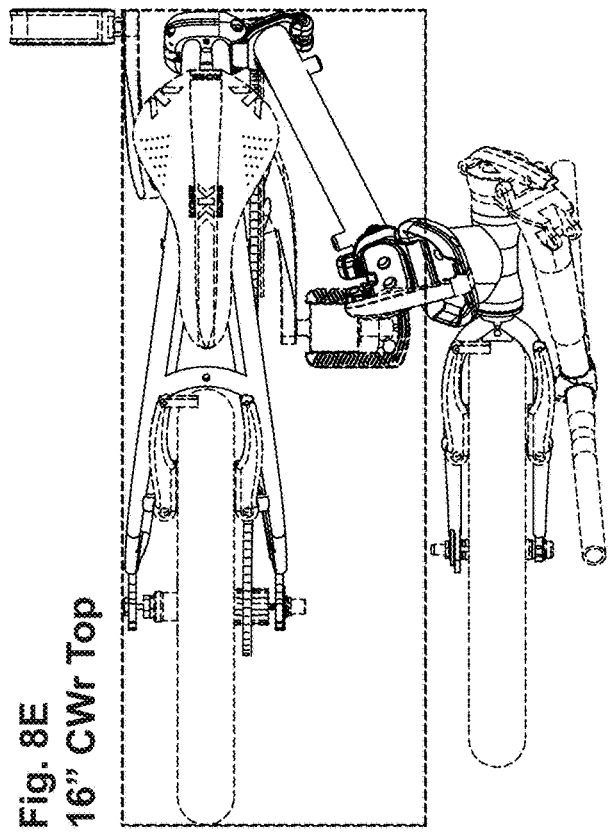
FIG. 8E shows a top view of a 16" CWr version of a trifold bicycle, folded to maximum Z dimension with parallel track.
Figure 8F:
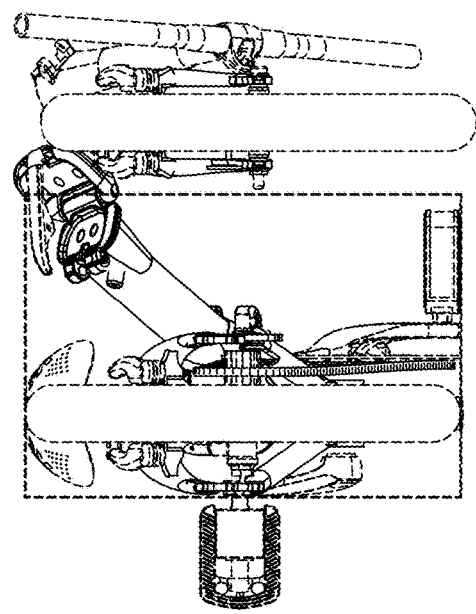
FIG. 8F shows a rear view of a 16" CWr version of a trifold bicycle, folded to maximum Z dimension with parallel track.
Figure 9C:
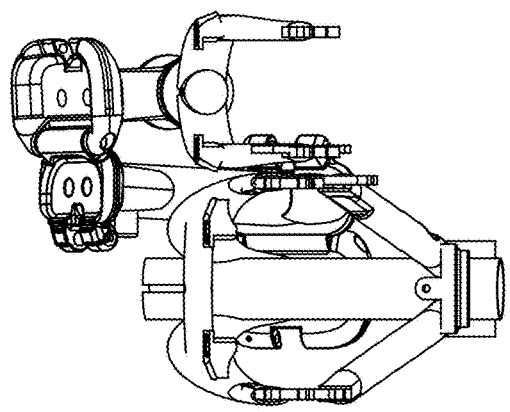
FIG. 9C shows a rear view of a 16" CWr version of a trifold bicycle frame, folded to minimum Z dimension with axles on the same Z axis with parallel track.
Figure 9A:
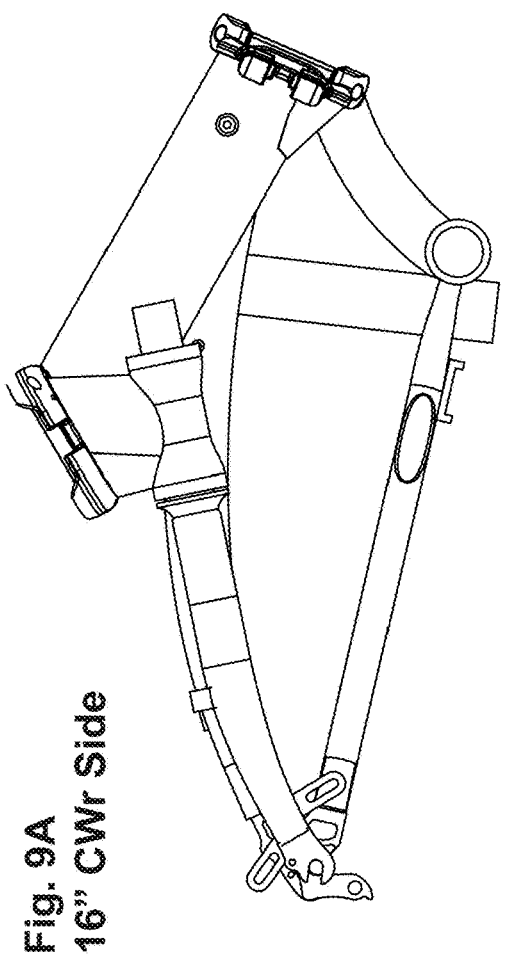
FIG. 9A shows a side view of a 16" CWr version of a trifold bicycle frame, folded to minimum Z dimension with axles on the same Z axis with parallel track.
Figure 9B:
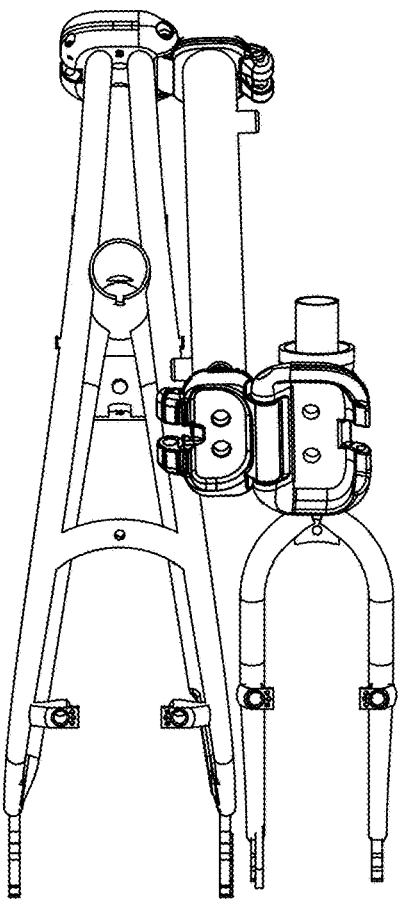
FIG. 9B shows a top view of a 16" CWr version of a trifold bicycle frame, folded to minimum Z dimension with axles on the same Z axis with parallel track.
Figure 9F:
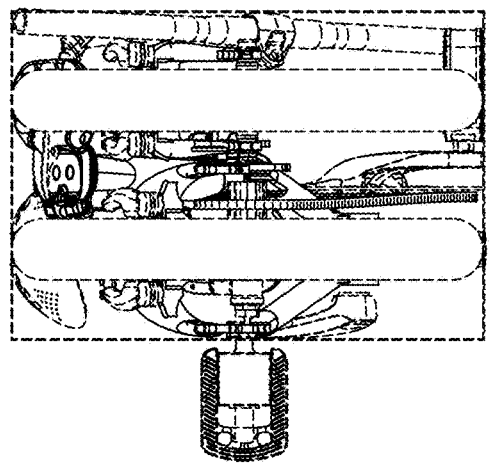
FIG. 9F shows a rear view of a 16" CWr version of a trifold bicycle, folded to minimum Z dimension with axles on the same Z axis with parallel track.
Figure 9D:
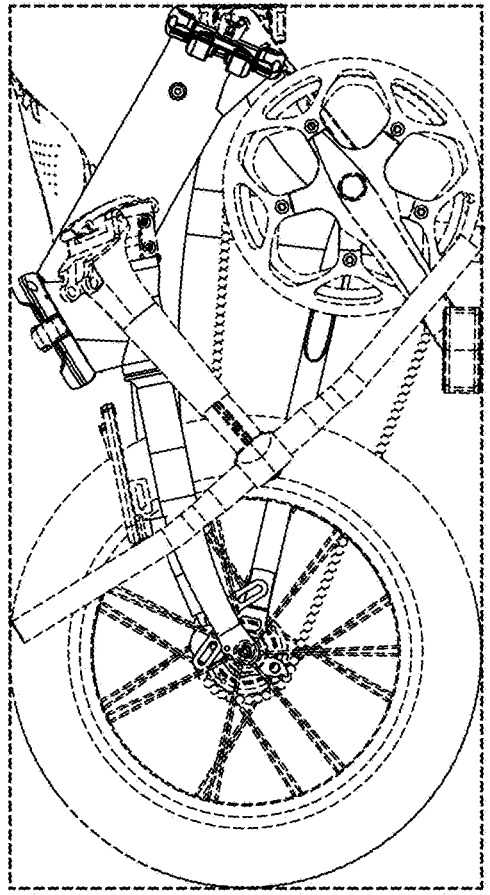
FIG. 9D shows a side view of a 16" CWr version of a trifold bicycle, folded to minimum Z dimension with axles on the same Z axis with parallel track.
Figure 9E:
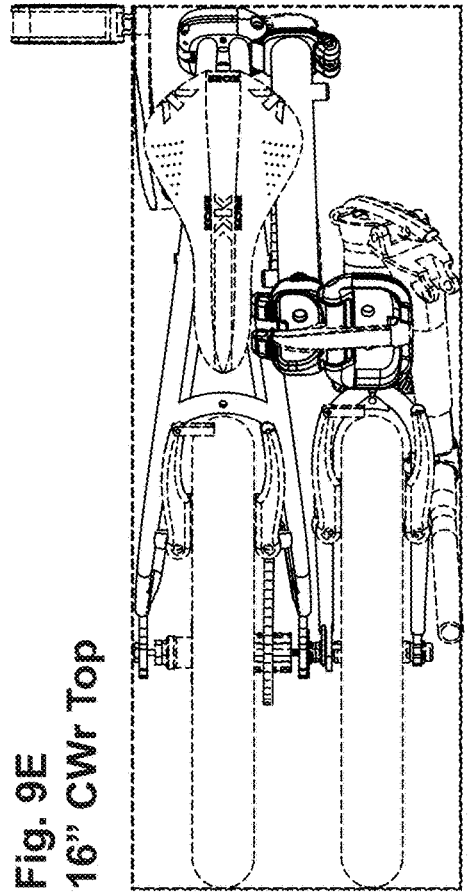
FIG. 9E shows a top view of a 16" CWr version of a trifold bicycle, folded to minimum Z dimension with axles on the same Z axis with parallel track.
Figure 10:
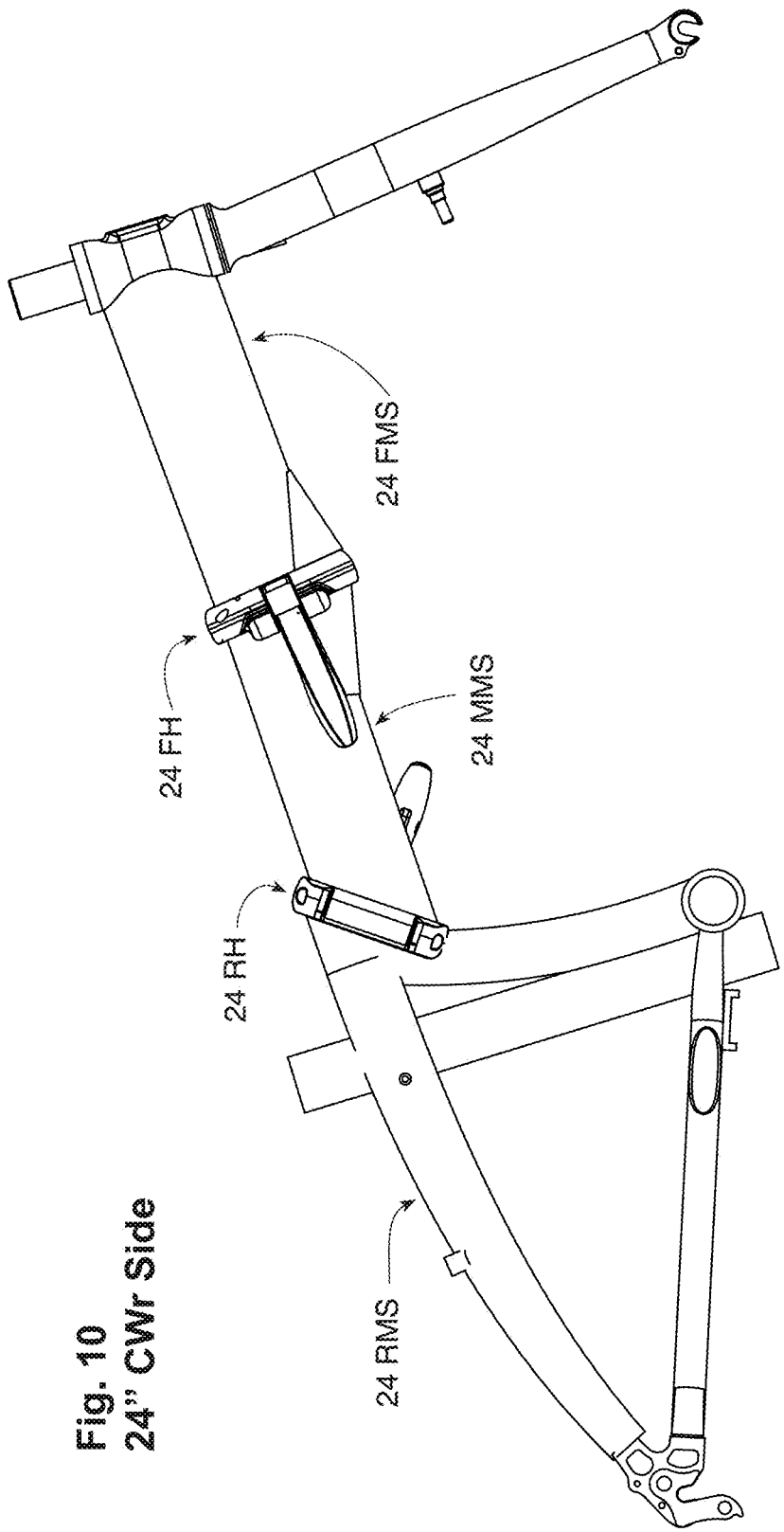
FIG. 10 shows a side view of a 24" CWr version of a trifold bicycle frame, unfolded.
Figure 11B:
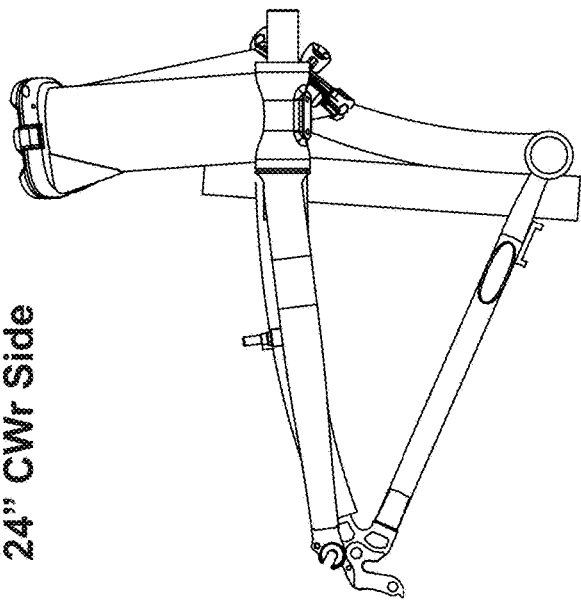
FIG. 11B shows a side perspective view of a 24" CWr version of a trifold bicycle frame, folded to maximum Z dimension with parallel track.
Figure 11A:
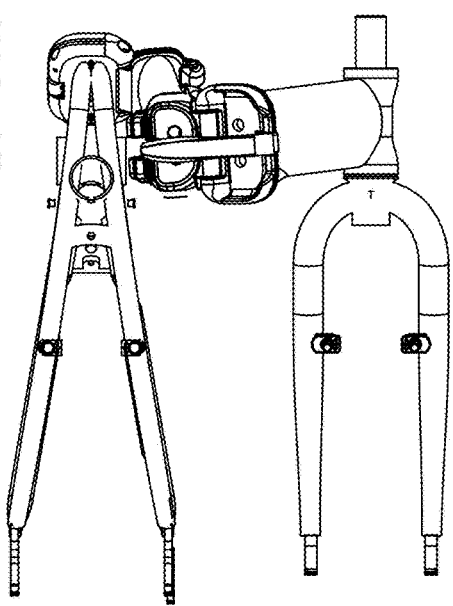
FIG. 11A shows a top view of a 24" CWr version of a trifold bicycle frame, folded to maximum Z dimension with parallel track.
Figure 11C:
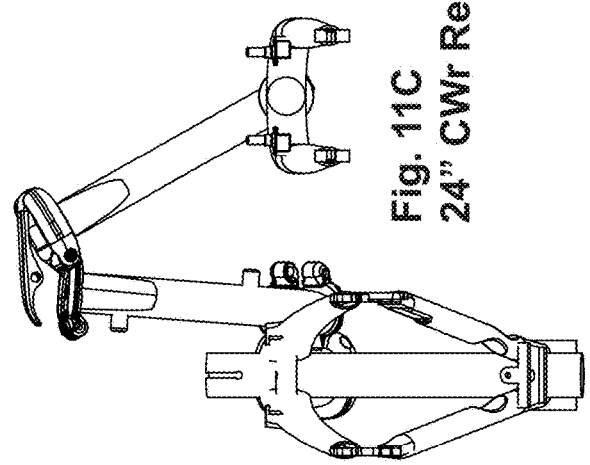
FIG. 11C shows a rear view of a 24" CWr version of a trifold bicycle frame, folded to maximum Z dimension with parallel track.
Figure 12E:
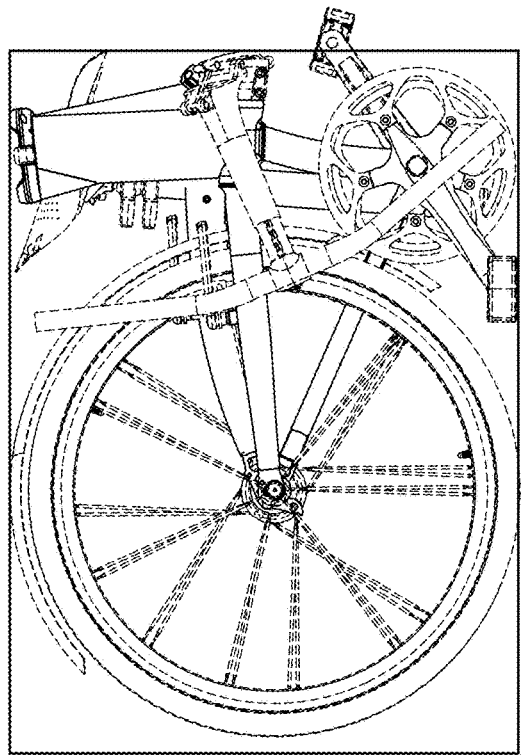
FIG. 12E shows a side view of a 24" CWr version of a trifold bicycle, folded to minimum Z dimension with axles on the same Z axis with parallel track.
Figure 12D:
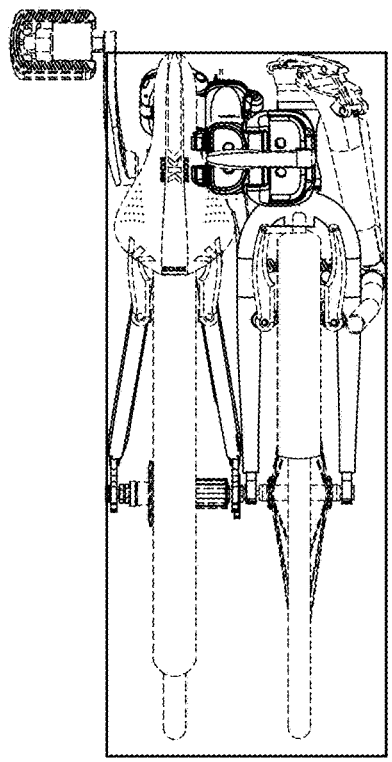
FIG. 12D shows a top view of a 24" CWr version of a trifold bicycle, folded to minimum Z dimension with axles on the same Z axis with parallel track.
Figure 12G:
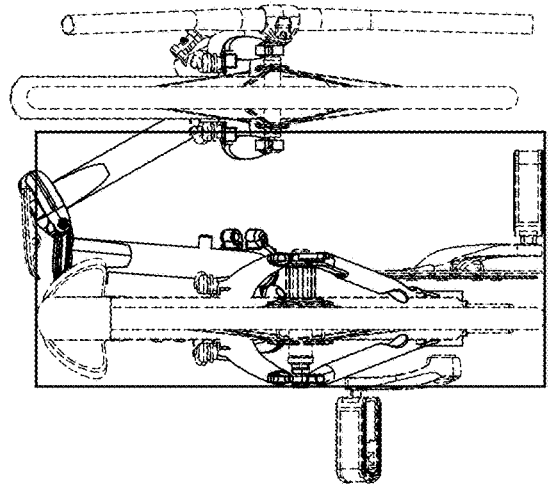
FIG. 12G shows a rear view of a 24" CWr version of a trifold bicycle frame, folded to maximum Z dimension with parallel track.
Figure 12F:
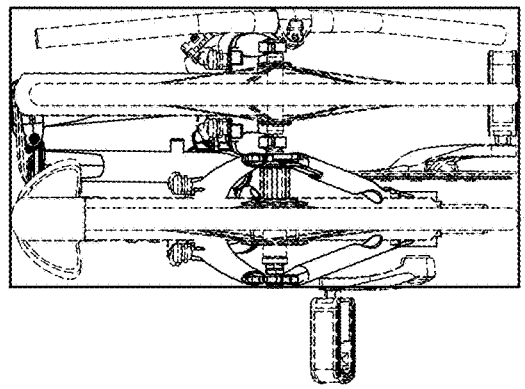
FIG. 12F shows a rear view of a 24" CWr version of a trifold bicycle, folded to minimum Z dimension with axles on the same Z axis with parallel track.
Figure 13A:
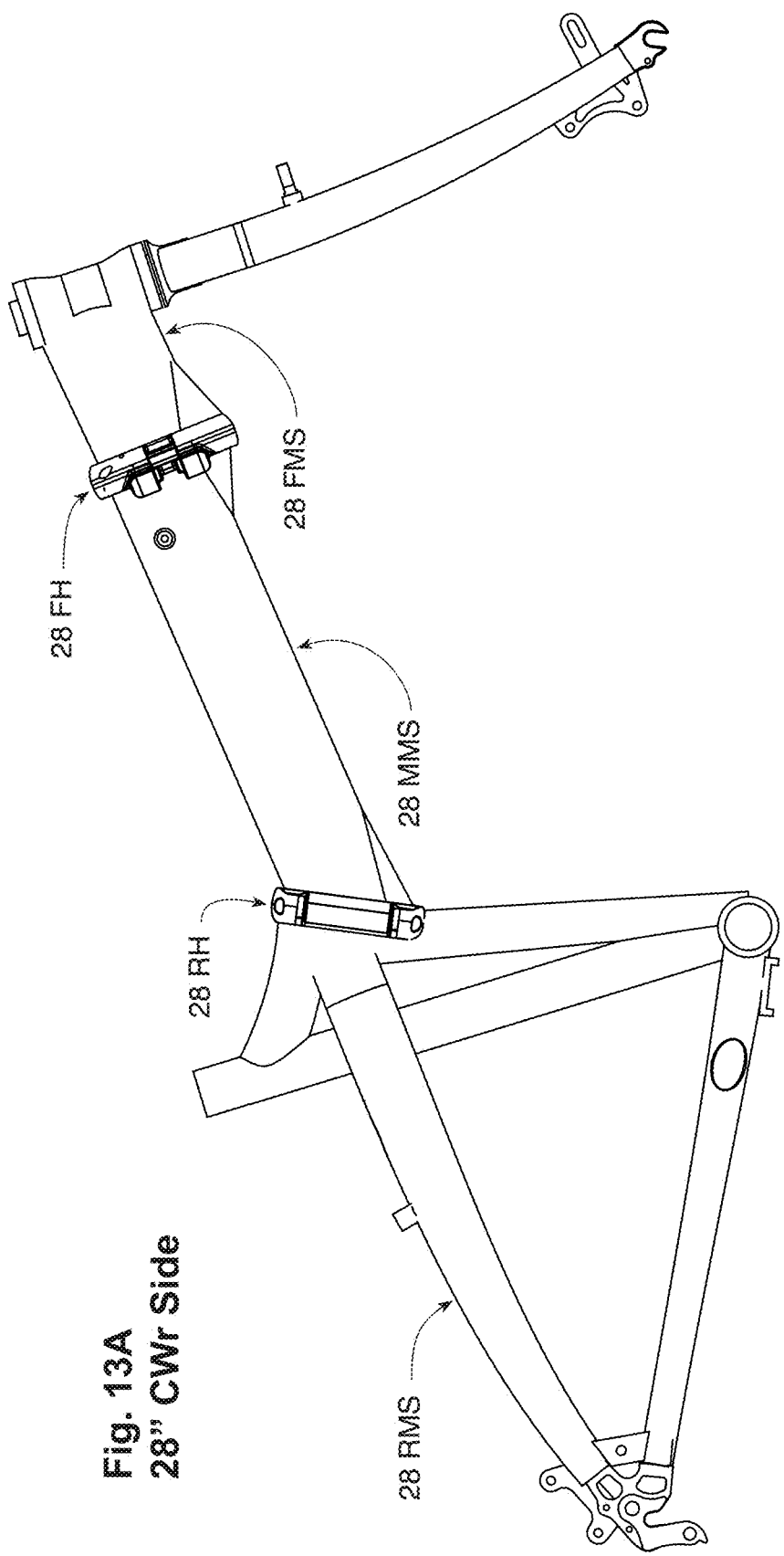
FIG. 13A shows a side view of a 28" CWr version of a trifold bicycle frame, unfolded.
Figure 15C:
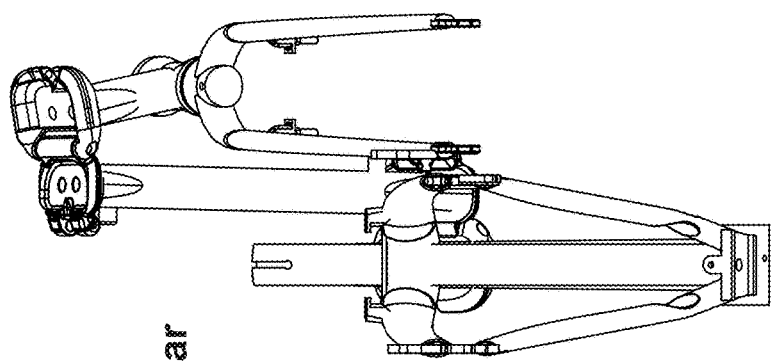
FIG. 15C shows a rear view of a 28" CWr version of a trifold bicycle frame, folded to minimum Z dimension with axles on the same Z axis with parallel track.
Figure 15A:
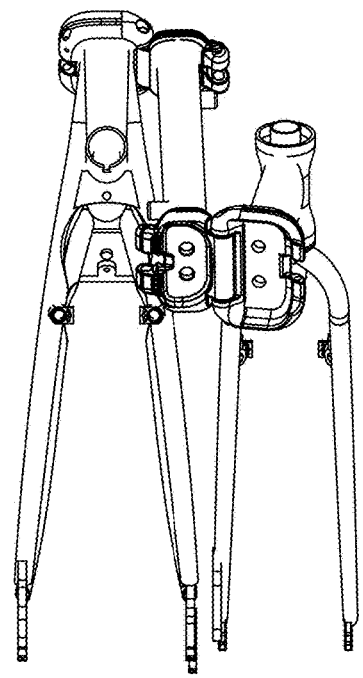
FIG. 15A shows a top view of a 28" CWr version of a trifold bicycle frame, folded to minimum Z dimension with axles on the same Z axis with parallel track.
Figure 15B:
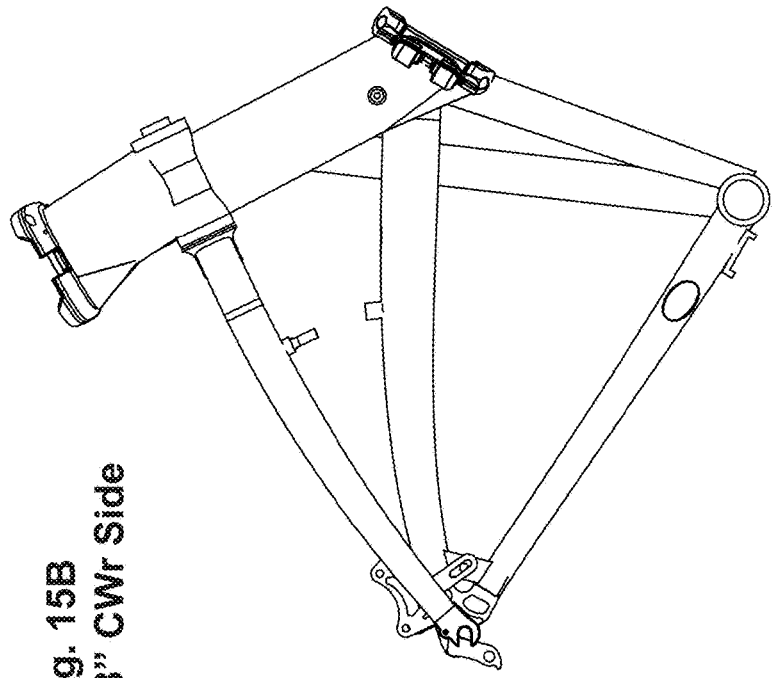
FIG. 15B shows a side view of a 28" CWr version of a trifold bicycle frame, folded to minimum Z dimension with axles on the same Z axis with parallel track.
Figure 15F:
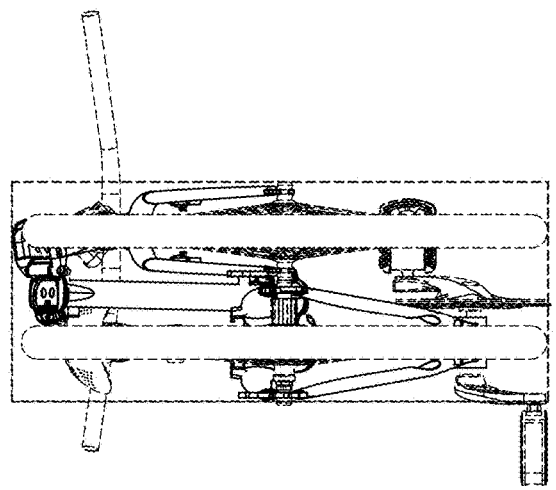
FIG. 15F shows a rear view of a 28" CWr version of a trifold bicycle frame, folded to minimum Z dimension with axles on the same Z axis with parallel track.
Figure 15D:
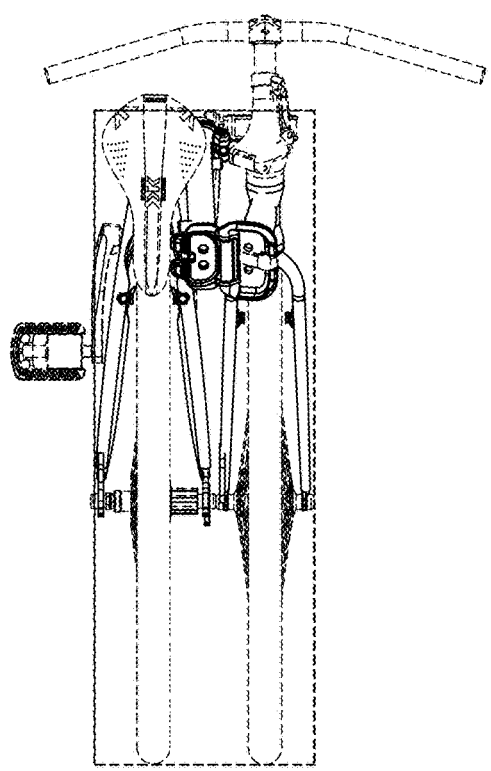
FIG. 15D shows a top view of a 28" CWr version of a trifold bicycle, folded to minimum Z dimension with axles on the same Z axis with parallel track.
Figure 15E:
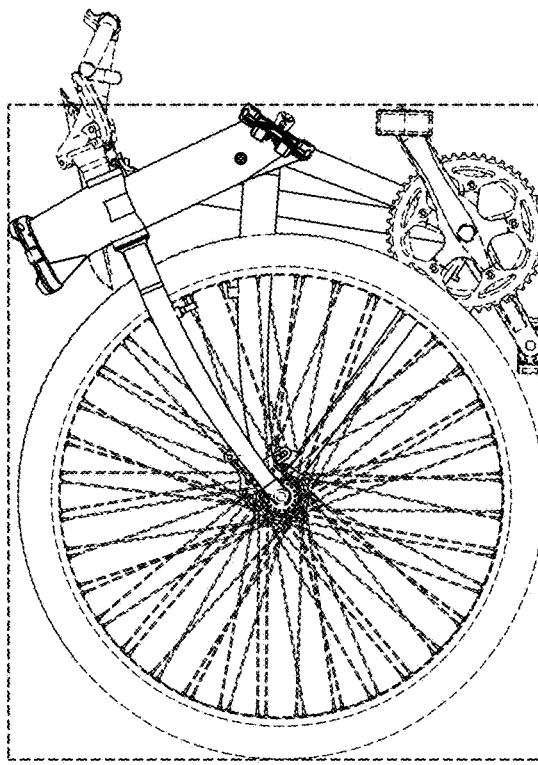
FIG. 15E shows a side view of a 28" CWr version of a trifold bicycle, folded to minimum Z dimension with axles on the same Z axis with parallel track.
Figure 16C:
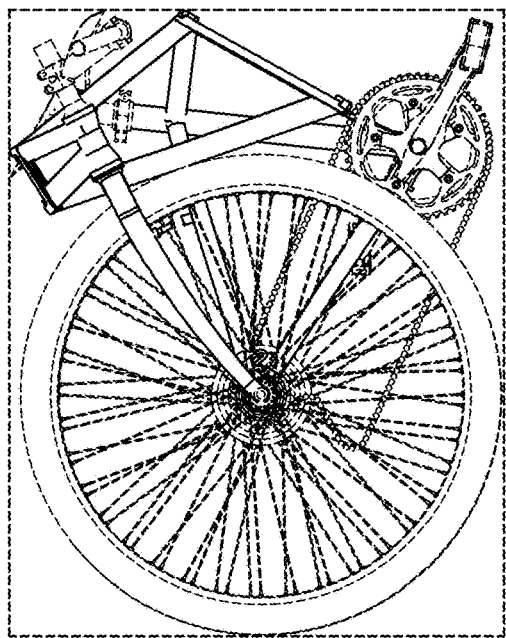
FIG. 16C shows a side view of a 28" CWr version of a trifold bicycle, with diamond frame, folded to minimum Z dimension with parallel track.
Figure 16D:
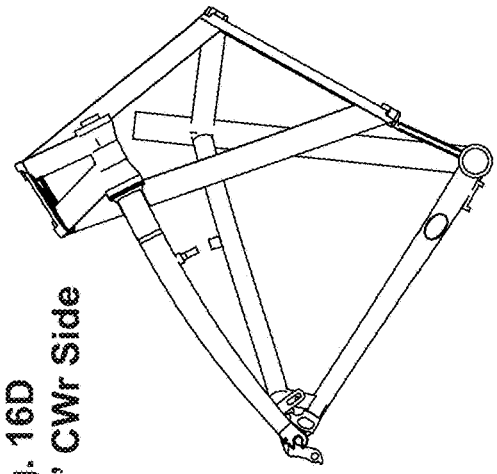
FIG. 16D shows a side view of a 28" CWr version of a trifold bicycle frame, with diamond frame, folded to minimum Z dimension with parallel track.
Figure 16A:
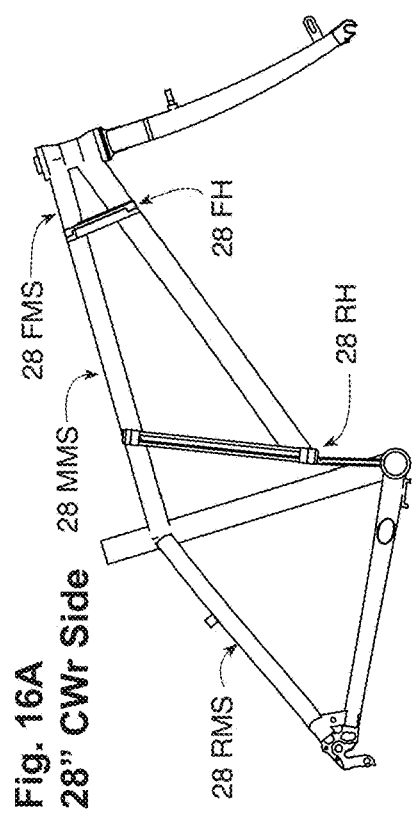
FIG. 16A shows a side view of a 28" CWr version of a trifold bicycle frame, with diamond frame, unfolded.
Figure 16B:
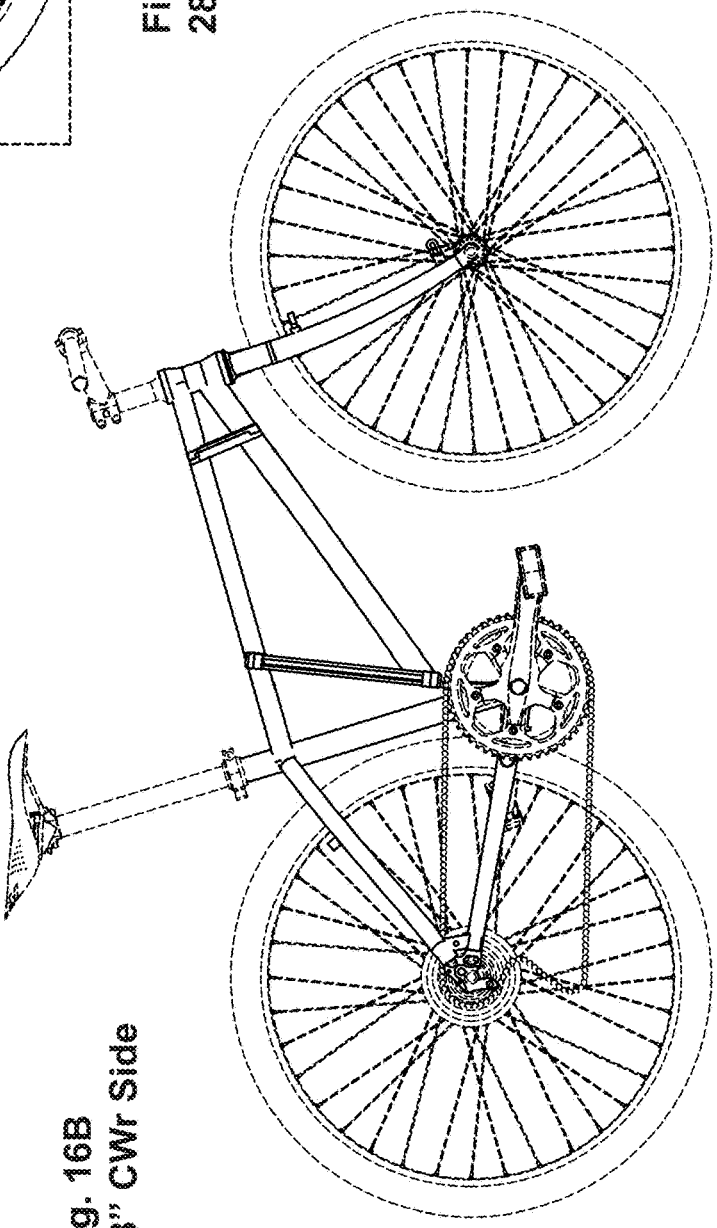
FIG. 16B shows a side view of a 28" CWr version of a trifold bicycle, with diamond frame, unfolded.

FIGS. 1A to 3D show unfolded and folded views of a 20" CWr version of a Trifold Design bicycle. In Tables 3A and 3B, rows 1 to 23 recite the Design Variables for 23 different combinations of Design Variables for a 20" CWr Trifold Design. In Tables 3A and 3B, Design Variable combinations recited in row 1 (version v20 A), 2 (version v20 A1), row 9 (version v20 G), row 10 (version v20 H), and row 15 (version v20 M) are preferred for producing the smallest folded package area and volume and acceptably rectilinear folded package shape. FIGS. 1A to 3D include preferred embodiments that incorporate the Design Variables recited in the preceding individually named rows 1, 2, 9, 10, and 15 of Tables 3A and 3B. In Tables 3A and 3B, Design Variable combinations recited in row 8 (version v20 F) and rows 20 to 23 (versions v20 W1 to v20 W4) produce either weird folded package shapes or have structural interferences (e.g., the mainframe middle segment interferes with the crankset in version v20 F). All versions incorporate the Trifold Design. The left pedal protruding from the Folded Package in FIG. 3C is an attached, quick-release pedal, similar to the pedal shown in FIG. 6C (detached, quick-release right pedal).

FIGS. 4A to 6E show unfolded and folded views of a 20" CCWr version of a Trifold Design bicycle. The right pedal in FIG. 6C is a detached, quick-release pedal. Quick-release pedals are commercially available from multiple sources (e.g., mkspedal.com, wellgopedal.com).

FIGS. 7A to 9F show unfolded and folded views of a 16" CWr version of a Trifold Design bicycle. In Tables 3A and 3B, rows 24 to 26 recite the Design Variables for 3 different combinations of Design Variables for a 16" CWr Trifold Design. In Tables 3A and 3B, Design Variable combinations in row 24 (version v03A) and row 26 (version v03C) are preferred for producing the smallest folded package area and volume and acceptably rectilinear folded package shape. FIGS. 7A to 9F include preferred embodiments of rows 24 and 25 in Tables 3A and 3B.

FIGS. 10 to 12F show unfolded and folded views of a 24" CWr version of a Trifold Design bicycle. In Tables 3A and 3B, rows 27 to 29 recite the Design Variables for 3 different combinations of Design Variables for a 24" CWr Trifold Design. In Tables 3A and 3B, Design Variable combinations recited in row 27 (version v09a), row 28 (version v09b), and row 29 (version v09c) are preferred for producing the smallest folded package volume and acceptably rectilinear folded package shape. FIGS. 10 to 12F include preferred embodiments of rows 27 to 29 in Tables 3A and 3B.

FIGS. 13A to 16D show unfolded and folded views of a 28" CWr version of a Trifold Design bicycle. In Tables 3A and 3B, rows 30 to 32 recite the Design Variables for 3 different combinations of Design Variables for a 28" CWr Trifold Design. In Tables 3A and 3B, Design Variable combinations recited in row 30 (version v10a), row 31 (version v10b), and row 32 (version v10c) are preferred for producing the smallest folded package volume and acceptably rectilinear folded package shape. FIGS. 13A to 16D include preferred embodiments of rows 30 to 32 in Tables 3A and 3B.

FIGS. 17A to 17D show the Trifold Design applied to CCWr step-through frame, in contrast to the CWr single-beam frames shown in FIGS. 1 to 3D and FIGS. 7A to 15F, and the CWr diamond frame shown in FIGS. 16A to 16D.

Figure 18:
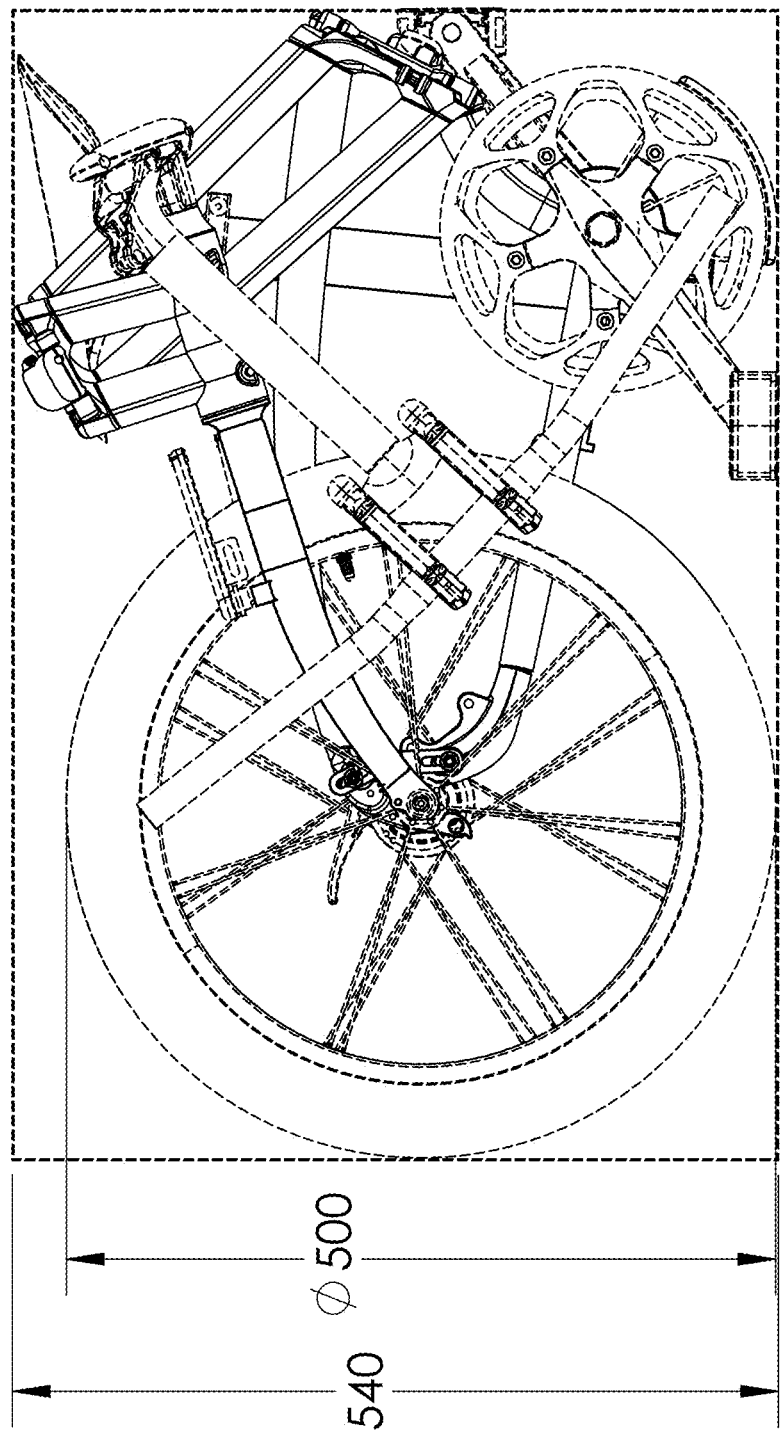
FIG. 18 shows a side view of a 20" CWr version of a trifold bicycle, folded to minimum Z dimension, with the Y dimension of the folded mainbeam greater than the Y dimension of the wheel external diameter.
Figure 19F:
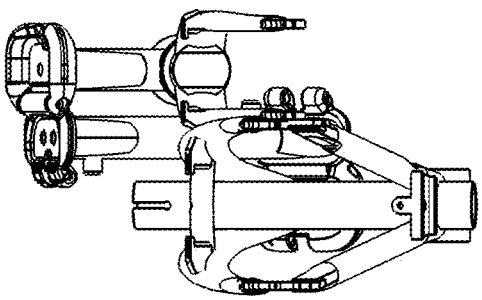
FIG. 19F shows a rear view of a 20" CWr version of a trifold bicycle frame, folded with front axle disposed forward of the rear axle to decrease the Z dimension of the folded package.
Figure 19D:
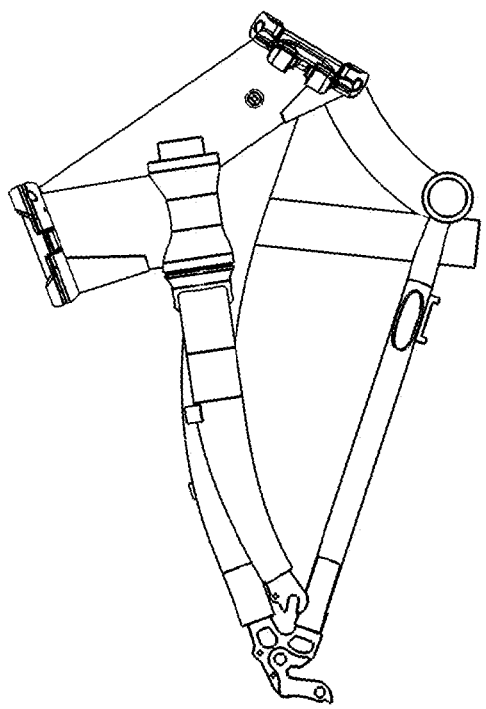
FIG. 19D shows a side view of a 20" CWr version of a trifold bicycle frame, folded with front axle disposed forward of the rear axle to decrease the Z dimension of the folded package.
Figure 19E:
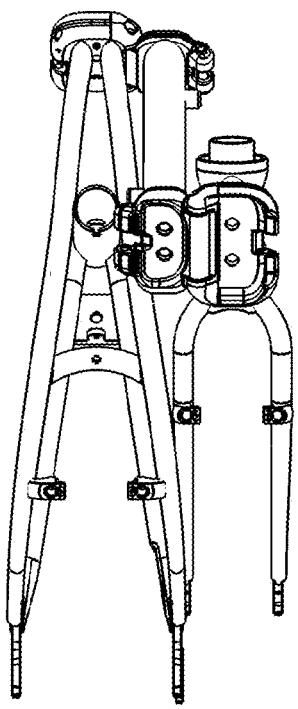
FIG. 19E shows a top view of a 20" CWr version of a trifold bicycle frame, folded with front axle disposed forward of the rear axle to decrease the Z dimension of the folded package.
Figure 20F:
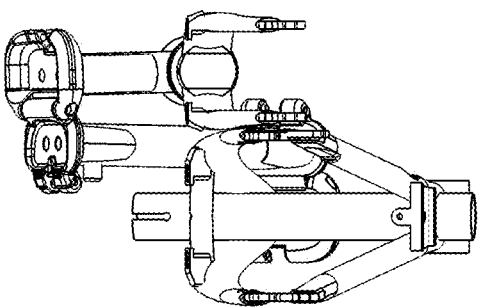
FIG. 20F shows a rear view of a 20" CWr version of a trifold bicycle frame, folded with rear axle disposed forward of the front axle to decrease the Z dimension of the folded package.
Figure 20D:
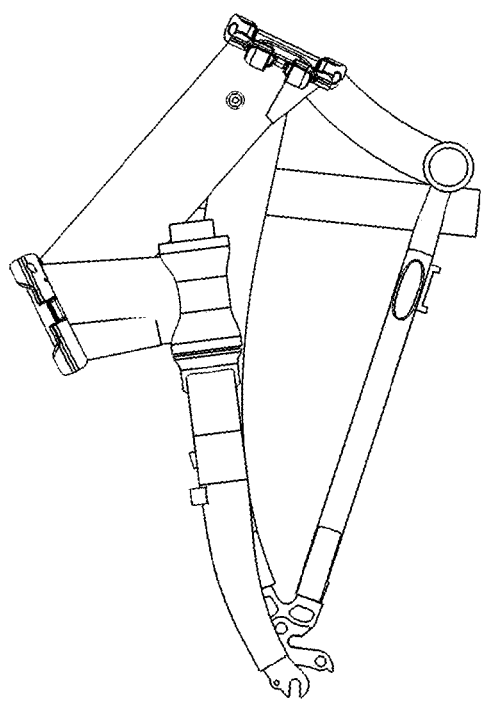
FIG. 20D shows a side view of a 20" CWr version of a trifold bicycle frame, folded with rear axle disposed forward of the front axle to decrease the Z dimension of the folded package.
Figure 20E:
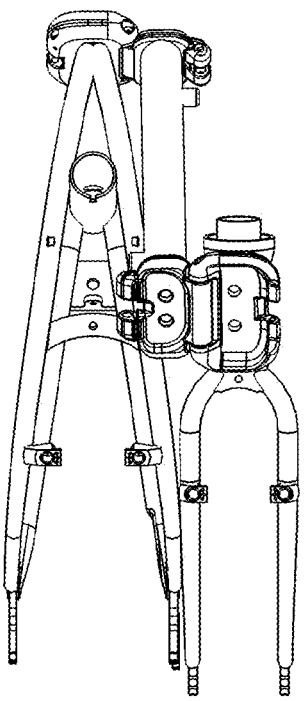
FIG. 20E shows a top view of a 20" CWr version of a trifold bicycle frame, folded with rear axle disposed forward of the front axle to decrease the Z dimension of the folded package.

FIG. 18 shows the result of Design Variables selected to produce a folded package shape with the Y dimension of the folded mainbeam greater than the Y dimension of the wheel external diameter. A typical design goal for the smallest folded package volume is that the rear wheel diameter be the largest Y dimension measurement.

FIGS. 19A to 20F show that the folded configuration of a Trifold Design bicycle can place (i) the rear wheel axle and front wheel axle on the same Z axis, (ii) the rear axle behind the front axle in the X dimension, or (iii) the rear axle in front of the front axle in the X dimension. Positions (ii) and (iii) reduce the Z dimension of the folded package.

FIGS. 21A to 21F show various views of a 20" CWr version of a trifold bicycle frame, and bicycle, folded to maximum Z dimension with parallel track.

FIGS. 22A to 22B shows how Design Variables are measured, and the 25 Design Variables for the Trifold Design in FIGS. 22A and 22B are recited in Table 1.

FIGS. 23A to 23E show the steps used to fold a trifold bicycle. To fold an unfolded trifold bicycle of the invention (FIG. 23A), the seat post clamp is released and the seat post lowered (FIG. 23B), the rear mainbeam joint is folded (FIG. 23C) (after releasing a rear joint unfolded fixing means on bicycles so equipped), the front mainbeam joint is folded (FIG. 23D) (after releasing a front joint unfolded fixing means on bicycles so equipped), and the handlepost joint is folded (FIG. 23E) (after releasing a handlepost joint unfolded fixing means on bicycles so equipped). If the trifold bicycle is equipped with a folded fixing means, the folded fixing means is engaged after completing the step in FIG. 23E.

Figure 24B:
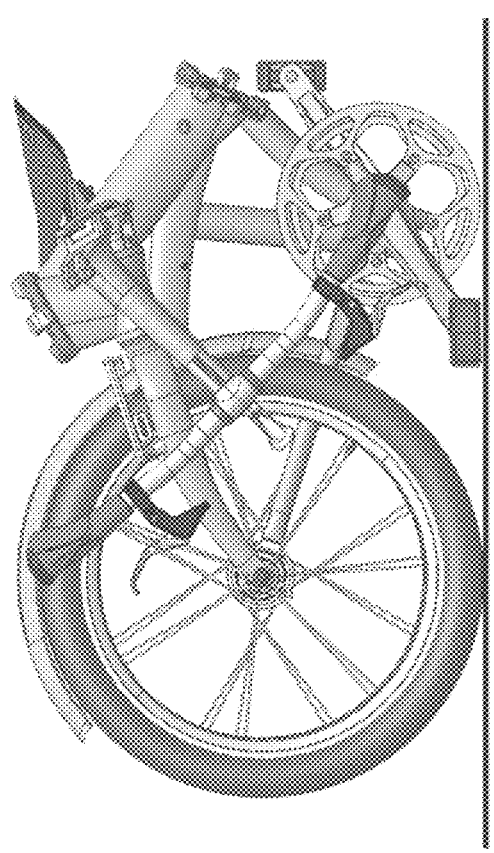
FIG. 24B shows a trifold bicycle folded with a non-reversed fork.
Figure 24A:
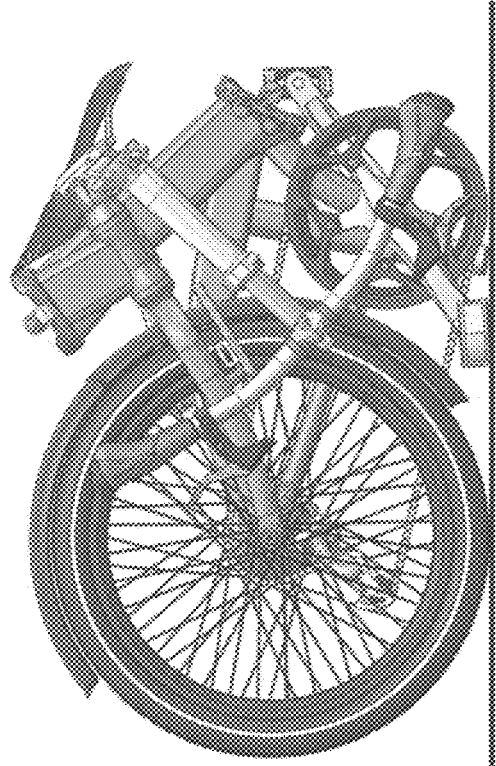
FIG. 24A shows a trifold bicycle folded with a reversed fork.

FIG. 24A shows a trifold bicycle folded after the fork is reversed from its position in an unfolded trifold bicycle. FIG. 24B shows a trifold bicycle folded with a non-reversed fork (not rotated 180 degrees from its position in an unfolded trifold bicycle). Folding with a reversed fork provides a design option, especially for Trifold Designs with large fork offsets.

The Trifold Design can be applied to design folding bicycles in which the front wheel and rear wheels are different sizes. The Trifold Design can be applied to design folding bicycles with pedal drive systems, motorized drive systems, or combined pedal and motorized drive systems. A Trifold Design folding bicycle is preferably equipped with an unfolded fixing means on each joint, and one or more folded fixing means, including the mating elements that engage such unfolded fixing means and folded fixing means.

A Trifold Design bicycle may have cargo attachment points, which cargo attachment points may optionally be part of the folded fixing means. The folded fixing means may be detachable or non-detachable from a Trifold design frame, and may provide a fixed Z distance of separation of the wheels of a folded Trifold Design bicycle, in parallel or near-parallel track, or provide selection of various Z distances of separation of the wheels of a folded Trifold Design bicycle, in parallel or near-parallel track. A Trifold Design folding bicycle to be checked as baggage on an airline has a folded package volume no greater than airline legal volume, and achieving such airline legal volume of the folded package does not require disassembly of the bicycle (other than folding of folding pedals, detaching quick-release pedals, or folding of a folding crank arm). A CWr fold protects the rear derailleur on Trifold Design bicycles equipped with a rear derailleur. A CCWr fold avoids possible conflicts with the chain ring in designs in which the rear mainbeam joint is close to the seat tube.

Selection of the Design Variables determines the folded package volume and dimensions, which folded package volume for wheel sizes greater than 20" are typically greater than airline legal volume. In a Trifold Design bicycle frame, the front hinge axis and the rear hinge axis always intersect in a side view of the frame.

In summary, the Trifold Design provides (i) a folding bicycle frame wherein a rear mainbeam joint folds in the direction opposite from the direction in which a front mainbeam joint folds, (ii) a folding bicycle wherein the height of the folded package can be equal to or greater than the wheel external diameter, (iii) a folding bicycle frame wherein the hinge pin of a rear mainbeam joint is on the opposite side of the mainbeam from the hinge pin of a front mainbeam joint, (iv) a folding bicycle with 20" or smaller wheel size that folds to a folded package volume not greater than airline legal volume, (v) a folding bicycle frame comprising at least two joints in the mainbeam, wherein each joint comprises a hinge, and the hinge axes alternate on each side of the mainbeam, and the wheels of the folded bicycle roll in parallel track, and (vi) a folding bicycle wherein a rear mainbeam joint folds in the direction opposite from the direction in which a front mainbeam joint folds, wherein the front and rear wheel diameters can be the same or different.

FIGS. 25A to 25E show a Trifold design version 09a in both folded (FIGS. 25A to 25D) and unfolded (FIG. 25E) configurations. The folded package area, or "box area", of a fully folded Trifold design version 09a can be computed using the Design Variables and either Equation A or Equation B shown in FIG. 47. FIG. 25A shows a perspective view of a fully folded Trifold Design version v09a with dashed lines delimiting minimum folded package volume. FIGS. 25B to 25D show a bottom, side, and rear views of a fully folded Trifold Design version v09a with dashed lines delimiting area of the fully folded bicycle.

As shown in FIG. 47, the minimum box area ("X*Y" dimensions, in side view) of a fully folded Trifold Design bicycle is described mathematically by Equation A (28.6% of versions in Tables 3A and 3B) and Equation B (62.9% of versions in Tables 3A and 3B). Equations A and B use different trigonometric approaches to calculate the box area, and produce very similar results. Minimum folded volume is the minimum box area multiplied by the sum of (RAW+FAW). As noted above, the mainbeam joints allow the front axle to be placed forward or aft of the rear axles when a Trifold Design bicycle is folded, which can reduce the overall width of the folded package without increasing the box area. FAW and RAW are not necessary to compute the box area.

The equations in FIGS. 26 to 47 were derived by analysis of v09a of the Trifold Design shown in FIGS. 25A to 25E, as such derivation is shown in FIGS. 26 to 46, and then confirmed by analysis of the other versions of the Trifold Design listed in Tables 3A and 3B. The data banner shown with FIGS. 25A to 25E provides specific Design Variables, as also recited in row 27 of Tables 3A and 3B hereof for Version v09a. Version v09a is a 24" CWr embodiment of the invention as shown in FIGS. 10 to 12G of this application. Design Variable variability as a function of wheel size is shown in FIG. 48.

The greatest X and Y dimensions of a fully folded Trifold Design bicycle are used to calculate the box area of the bicycle when folded. The X-dimension is congruent with the wheelbase, while the Y-dimension is congruent with the folded position and angles of the front and rear mainbeam hinges. Optional components, such as fenders, can increase the overall x-dimension.

The analysis of the Design Variables and Trifold Design versions in Tables 3A and 3B focused on those that determine the minimum box area of a fully folded Trifold Design bicycle. Derivation of the Equations A and B disclosed that the following Design Variables are necessary to produce a folded bicycle of Trifold Design with wheels in parallel track and with minimal box area: BB, CS, FAW, FCHD, FHA, FHD, FHH, FL, FO, FS, HTA, HTH, RAW, RHA, RHAD, RHD, RHH, STH, WB, and WEX. FAW and RAW are necessary Design Variables for determining width (Z dimension) of a folded bicycle of Trifold Design, and the maximum width occurs when the front and rear axles are aligned inline on the same Z axis. FAW includes the Z dimension of the handlebar assembly when the handlepost joint is fully folded. The handlebar of a Trifold design folding bicycle typically has a quick release that can be unlocked to rotate the handlebar to minimize the Z-axis dimension of the folded package volume.

The STH Design Variable includes the Y dimension of the lower half the handlepost joint; the upper half of a handlepost joint folds with handlepost and handlebar assembly. Of the Design Variables that determine box area, five are constant (FD, HTH, RHAD, RHW, and STH) for a given folding direction, and three are nearly constant (HTA, CS, and FCHD) with standard deviations of 1%, 6%, and 7%, respectively. In most cases, the constant Design Variables do not contribute to the overall rectilinear "X*Y" or "box area" of a folded Trifold Design bicycle; in some cases, STH may not be an element of the Y dimension of the box area. Of the three parameters that are nearly constant, both CS and FCHD will restrict minimizing the box area of the bicycle.

As shown in FIG. 48 (showing standard deviations of the Design Variables for the 35 designs presented in the '574 application), the highest design flexibilities, in order of the largest standard deviation as a function of the wheel size, are as follows: (i) 16 inch wheel: FHD, FS, MS, and RHD; (ii) 20 inch wheel: FHD, RHD, FHH, RHH, MS, RS, and FS; (iii) 24 inch wheel: FHD, MS, FS, FHH, RHD, and RHH, and (iv) 28 inch wheel: MS, FS, FHH, and RHH.

Derivation of Equations A and B based Trifold Design version v09a, shown in FIGS. 25A to 25E, was as follows: the (0,0,0,) primary datum was assigned to the center of the rear dropout, as shown in FIG. 26.

FIGS. 27 to 28 show the computation of fork measurements and angles and projections thereof on the baseline, and corresponding Equation Nos. 1 to 2. The steps in FIGS. 27 to 28 determine the location of the front dropout relative to the rear dropout when the rear and front mainbeam hinges are folded. In FIG. 27, $\theta_3$ is the angle between the head tube and the front fork (front fork offset angle). Using the fork angle and length, the location of the front dropout is determined relative to the rear dropout when rear and front hinges are fully folded. The projection in front of the fork is a factor in the Y-dimension of the box area. In FIG. 28, $\theta_1$ is the angle of the front hinge relative to the head tube.

FIGS. 29 to 33 show the computation of front and rear hinge angles and projections thereof on the baseline, and corresponding Equation Nos. 3 to 5. The steps in FIGS. 29 to 33 determine the projection of the front and rear mainbeam hinges, the projection of the front mainbeam segment on the baseline, the resultant angle when the rear hinge is folded, and the location of the front hinge when the both the rear and front hinges are folded.

Figures 30, 30A:
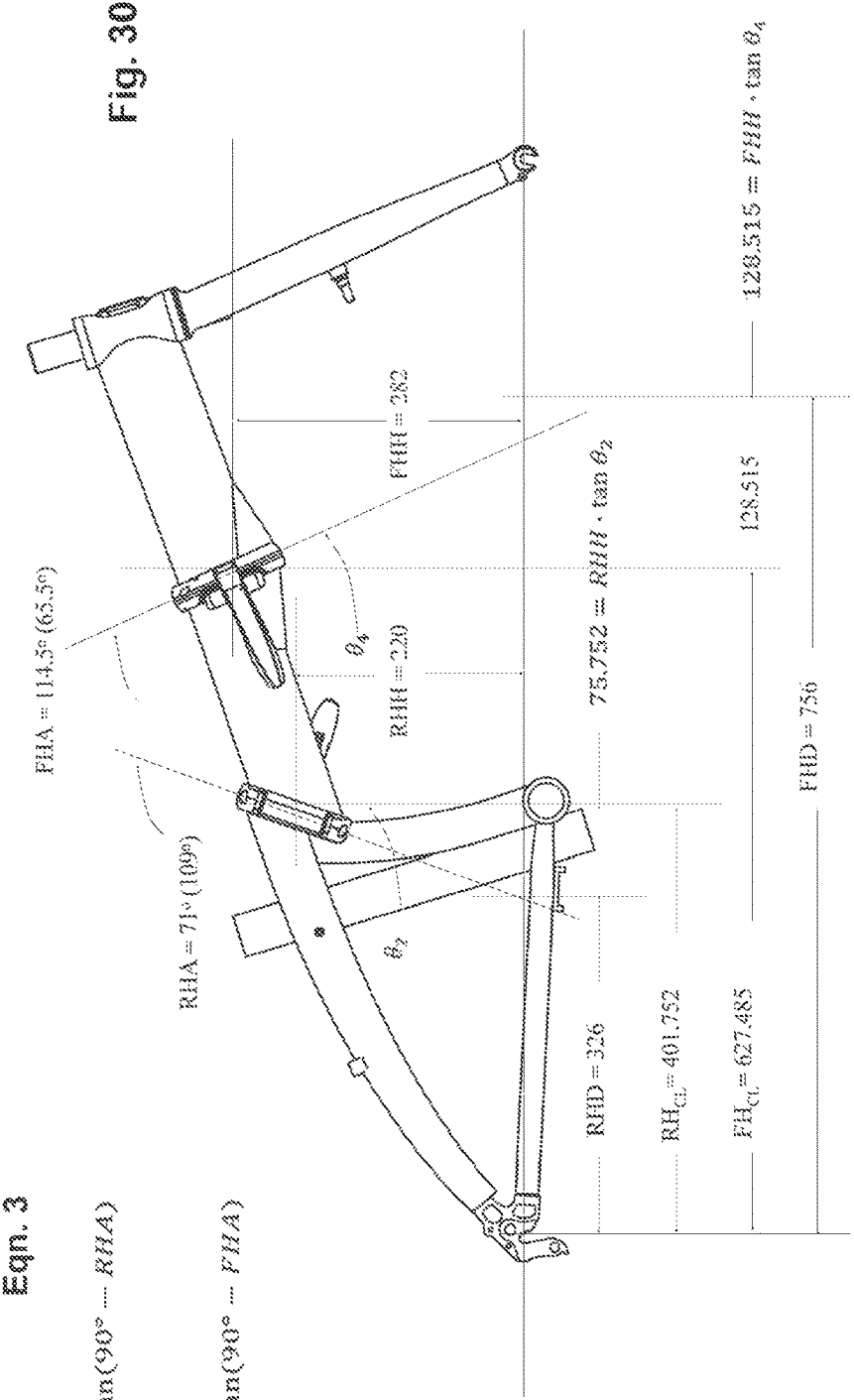
FIG. 30 shows a side view of an unfolded Trifold Design version v09a, with computation using Equation 3 of measurements and angles of the projections on the baseline of the front and rear hinges.
FIG. 30A shows Equation 3 with computation of measurements and angles of the projections on the baseline of the front and rear hinges of the unfolded Trifold Design version v09a shown in FIG. 30.

In FIG. 30, the front hinge projection and the head tube to front hub length are determined. $\theta_2$ is the angle of the rear hinge projection; $\theta_4$ is the angle of the front hinge projection; $RH_{CL}$ is the distance from the datum to the rear hinge, when projected; and $FH_{CL}$ is the distance from the datum to the front hinge, when projected.

In FIG. 32, the front segment length and angles are used to determine the resultant angles when the front hinge is fully folded. $\theta_5$ is the angle between the front hub and the front hinge.

FIGS. 34 to 42 show the computation, using Equation Nos. 6 to 15, of the resultant angles after fully folding the front and rear hinges. In FIGS. 34 and 35, dimensions are calculated that are required to resolve (i) the resultant angle, and (ii) the location of the front hinge, when the rear hinge is fully folded. In FIGS. 35 to 39, $\phi 1$ is the angle of the rear hinge when fully folded. In FIG. 36, $\alpha 2$ is the angle of the front hinge when the rear hinge has been fully folded.

In FIG. 37, $y_{FH}$ is the y-dimension distance from the front hinge centerline to the datum when the frame is fully folded; $x_{FH}$-offset is the distance from the front hinge centerline to the rear hinge centerline when the frame is fully folded; $x_{FH}$ is the x-dimension distance from the front hinge centerline to the datum when the frame is fully folded. In FIG. 37, $RH_{CL}$ is synonymous with (i.e., equivalent to) RS.

FIG. 38 shows the location of the MMS when the frame in fully folded. In FIG. 38, $\phi_1$ is the angle of the rear hinge when the frame is fully folded; $\alpha_1$ is the projection angle of the rear hinge when the frame is fully folded.

FIG. 39 shows the location of the MMS, FMS, and front dropout when the frame is fully folded. In FIG. 39, $\phi_1$ is the angle of the rear hinge when folded; $\phi_2$ is the angle of the front hinge when folded.

FIG. 40 shows the location of the MMS, FMS, and front dropout, and the dimension of $y_{RH}$, when the frame is fully folded. In FIG. 40 and higher Figure numbers, "hub" is synonymous with "front dropout". Hub Offset$_x$ is the x-dimension distance from the datum (rear dropout centerline) to the front dropout centerline in a fully folded frame. A positive x-dimension offset value indicates the front dropout is forward of the rear dropout; a negative x-dimension offset value indicates the front dropout is to the rear of the rear dropout. Hub Offset$_y$ is the y-dimension distance from the datum (rear dropout centerline) to the front dropout centerline in a fully folded frame. A positive y-dimension value indicates the front dropout is above the rear dropout; a negative y-dimension value indicates the front dropout is below the rear dropout. Eqn. 15 calculates the values for Hub Offset$_x$ and Hub Offset$_y$.

FIG. 41 shows the location of the MMS, FMS, and front dropout, and the x and y dimension offsets of the front dropout vs. the datum when the frame is fully folded. In FIG. 41, $\phi_1$ is the angle of the rear hinge when folded.

FIG. 42 shows a fully folded Trifold design frame overlaid on an unfolded Trifold design frame.

The box area, or folded package area, can be computed using alternate sets of x and y dimensions. A first set of equations, used to compute box area 1, is based on the vertical plane originally defined by baseline between the front and rear dropouts, i.e., along the vertical center plane. A second set of equations, used to compute box area 2, is based on the rear hinge when folded relative to the middle mainbeam segment angle, along with the perpendicular axis, which basically corresponds to the angle of the front and middle mainbeam segments (or the angle between the front and rear hinges prior to hinge folding). The solutions for box area using Equations A and B are very close, and are used as crosschecks during the Trifold design process.

The steps in FIGS. 35 to 42 determine location of the front dropout when the both the rear and front hinges are folded, and derive the variables and values required to compute box area 1 using Equation A, and to compute box area 2 using Equation B.

FIGS. 43 to 44 show the computation of the x and y dimensions of the box area of a fully folded Trifold frame using a first trigonometric approach shown in Equation A of FIG. 47. Equation A computes a first value of box area, i.e., box area 1. In Eqn. 16 in FIG. 43, "Offset" is the absolute distance of the front dropout relative to the datum. In FIG. 43, the 411.037 value was calculated in FIG. 33. The Design Variables are those recited in Table 2.

FIGS. 45 to 46 show the computation of the x and y dimensions of the box area of a fully folded Trifold frame using a second trigonometric approach shown in Equation B. Equation B of FIG. 47 computes an alternate value of box area, i.e., box area 2.

FIG. 47 presents two alternate equations, Equation A and Equation B, that compute minimum box area using alternate trigonometric analyses derived in the preceding Figures.

FIG. 48 is a histogram of Design Variable variability as a function of wheel size. Note that the greatest design variability in 24" and smaller frames is the location of the front hinge (distance from the rear dropout to the projection of the front hinge on the baseline), while the greatest design variability in 28" frames is the middle mainbeam segment length.

FIG. 49 shows a stud and latched receiver embodiment of a folded fixing means (rear mainbeam and front fork locations after a Trifold design bicycle frame is folded). In this embodiment, the receiver is integrally formed in the rear mainbeam (left element in FIG. 49) and the stud is affixed to a fork leg.

FIG. 50A shows a sliding disc and latched receiver embodiment of a folded fixing means. FIGS. 50B to 50E show operation of the sliding disc and latched receiver folded fixing means. The receiver is typically affixed on the rear mainbeam near the rear dropout closest to the fork after folding of a Trifold design folding bicycle, and the sliding disc is affixed to a fork leg.

FIG. 51A shows two magnetic folded fixing means on a single frame (rear mainbeam and front fork after a Trifold design bicycle frame is folded). FIG. 51B shows operation of a single magnetic folded fixing means (isolated view). After folding of a Trifold design folding bicycle, a magnet affixed on the rear mainbeam near the rear dropout closest to the fork after folding of a Trifold design folding mates with a magnet affixed to a fork leg.

FIG. 52 shows location on a Trifold design bicycle frame of the corresponding halves of a single magnetic folded fixing means.

FIG. 53A shows a strap and latch snowboard folded fixing means before insertion of the strap into the latch. FIG. 53B shows a strap and latch snowboard folded fixing means after insertion of the strap into the latch. The strap is typically anchored on the mainbeam and the latch is affixed to a fork leg. The strap is rigid enough to maintain a user-selected separation of the front and rear wheels when a Trifold design bicycle is folded and rolled.

FIG. 54 shows a perforated strap and stud folded fixing means after a stud on the head tube of a Trifold design bicycle has been inserted through a hole in the perforated strap of a folded Trifold design bicycle frame. The strap is typically anchored on the mainbeam and the stud is affixed to the head tube.

FIG. 55A shows a rear view of a sliding disc and non-latching receiver embodiment of a folded fixing means affixed to the axles of a Trifold design folding bicycle. FIGS. 55B to 55C show operation of the sliding disc and receiver folded fixing means. The sliding disc and non-latching receiver can be magnetic, in which case the disc and receiver couple both physically and magnetically.

Further modifications will also suggest themselves to those skilled in this art, and such are considered to fall within the spirit and scope of the invention as defined in the appended claims.

I claim:
1. A foldable bicycle, comprising:
a front section having a front mainbeam comprising a front rear end and a front end, opposite the front rear end, wherein the front end comprises a head tube having a handlebar assembly installed to a front fork therethrough, the handlebar assembly comprising a handlepost locking hinge and the front fork comprising a front dropout, whereby a front wheel having a front wheel axle is installed to the front dropout;

a rear section having a rear mainbeam comprising a rear end having a rear dropout, a rear front end, opposite the rear end, a seat tube having a seat assembly installed thereto, and a bottom bracket, whereby a rear wheel having a rear wheel axle is installed to the rear dropout and a drive system is installed to at least the bottom bracket and rear wheel, respectively, wherein the rear wheel is the same size as the front wheel;

a middle section having a middle mainbeam comprising a middle front end and a middle rear end, opposite the middle front end, wherein the middle front end and front rear end form a front locking hinge having a front hinge angle and a first rotation and the middle rear end and rear front end form a rear locking hinge having a rear hinge angle and a second rotation, whereby the first rotation direction is the same as the second rotation direction, and wherein a baseline plane is formed between the front and rear dropouts, whereby the front hinge angle is an angle measured clockwise from the baseline plane to the angle of the front hinge and the rear hinge angle is an angle measured clockwise from the baseline plane to the angle of the rear hinge, and wherein the front hinge angle is between a front hinge angle range having a difference of 3° to 7° degrees, and the rear hinge angle is between a rear hinge angle range having a difference of between 1° to 3° degrees, wherein the angle range differences is the differences between the largest and smallest angle degrees, respectively, and between the angle range difference is inclusive of the largest and smallest angle degrees, and the front and rear wheels comprise at least one of at least two wheel sizes, whereby when the handlepost, rear, and front locking hinges are folded, the front and rear dropouts are aligned, the front and rear wheel axles or front and rear wheel dropouts, configured for fixing, are fixed, whereby the front and rear wheels stably rotate, and an x or y dimension of a quadrilateral box area encompassing the folded foldable bicycle and flush with outer points thereof from a sideview is equal to a diameter size of the at least one of at least two wheel sizes.

2. The foldable bicycle of claim 1, wherein the front hinge angle range having a difference of between 3° to 7° degrees is 53° to 56° degrees, inclusive, the rear hinge angle range having a difference of between 1° to 3° degrees is 88.8 to 91.1 degrees, inclusive, and the at least one of the at least two wheel sizes is one of a 16" or 20" inch wheel size.

3. The foldable bicycle of claim 1, wherein the front hinge angle range having a difference of between 3° to 7° degrees is 60° to 67° degrees, inclusive, the rear hinge angle range having a difference of between 1° to 3° degrees is 91.9 to 93.6 degrees, inclusive, and the at least one of the at least two wheel sizes is one of a 16" or 20" inch wheel size.

4. The foldable bicycle of claim 1, wherein the front hinge angle range having a difference of between 3° to 7° degrees is 60° to 64° degrees, inclusive, the rear hinge angle range having a difference of between 1° to 3° degrees is 95.1 to 97.8 degrees, inclusive, and the one of the at least two wheel sizes is one of a 20", 24", or 28" inch wheel size.

5. The foldable bicycle of claim 1, wherein the front hinge angle range having a difference of between 3° to 7° degrees is 59° to 64° degrees, inclusive, the rear hinge angle range having a difference of between 1° to 3° degrees is 120.1 to 121.8 degrees, inclusive, and the at least one of the at least two wheel sizes is one of a 20" or 24" inch wheel size.

6. The foldable bicycle of claim 1, wherein the foldable bicycle further comprises a sliding disc affixed to one of the front or rear wheel axles and a non-latching receiver affixed to the other one of the front or rear wheel axles, configured for fixing, whereby when the handlepost, rear, and front locking hinges are folded, the sliding disc rotates to fixedly slide into and be received by the non-latching receiver, whereby the front and rear wheels stably rotate.

7. The foldable bicycle of claim 1, wherein the foldable bicycle further comprises at least one magnet near to the rear dropout and at least one attractive magnet near to the front dropout, configured for fixing, whereby when the handlepost, rear, and front locking hinges are folded, the at least one magnet rotates to fixedly correspond to the at least one attractive magnet, whereby the front and rear wheels stably rotate.

* * * * *